(12) United States Patent
Saito et al.

(10) Patent No.: US 10,797,550 B2
(45) Date of Patent: Oct. 6, 2020

(54) ROTARY ELECTRIC MACHINE AND VEHICLE PROVIDED WITH THE SAME

(71) Applicant: Hitachi Automotive Systems, Ltd., Hitachinaka-shi, Ibaraki (JP)

(72) Inventors: Yasuyuki Saito, Hitachinaka (JP); Yuji Kanoh, Hitachinaka (JP); Toshio Ishikawa, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 511 days.

(21) Appl. No.: 15/539,505

(22) PCT Filed: Dec. 16, 2015

(86) PCT No.: PCT/JP2015/085132
§ 371 (c)(1),
(2) Date: Jun. 23, 2017

(87) PCT Pub. No.: WO2016/104262
PCT Pub. Date: Jun. 30, 2016

(65) Prior Publication Data
US 2017/0353071 A1    Dec. 7, 2017

(30) Foreign Application Priority Data

Dec. 26, 2014 (JP) .................. 2014-264680

(51) Int. Cl.
*H02K 3/28* (2006.01)
*B60L 50/51* (2019.01)
*H02K 3/12* (2006.01)

(52) U.S. Cl.
CPC ............... *H02K 3/28* (2013.01); *B60L 50/51* (2019.02); *H02K 3/12* (2013.01); *Y02T 10/641* (2013.01); *Y02T 10/7005* (2013.01)

(58) Field of Classification Search
CPC .. H02K 3/28; H02K 3/12; B60L 50/51; Y02T 10/641; Y02T 10/7005
See application file for complete search history.

(56) References Cited

U.S. PATENT DOCUMENTS 5,483,111 A * 1/1996 Kuznetsov ............ B60L 15/005
                                                        104/292
6,268,678 B1 * 7/2001 Asao ........................ H02K 1/16
                                                        310/180

(Continued)

FOREIGN PATENT DOCUMENTS

JP    2004-364464 A    12/2004
JP    2012-29370 A      2/2012

OTHER PUBLICATIONS

Partial Supplementary European Search Report issued in counterpart European Application No. 15872831.1 dated Jul. 18, 2018 (11 pages).

(Continued)

*Primary Examiner* — Mohamad A Musleh
(74) *Attorney, Agent, or Firm* — Crowell & Moring LLP

(57) ABSTRACT

Provided is a high-torque low-noise rotary electric machine. In a rotary electric machine, a jumper conductor having a normal slot pitch connects slot conductors by striding slots with a slot pitch "Np=N(=6)" in one of coil ends and striding slots with a slot pitch "Np=N(=6)" in the other coil end, assuming that the number of slots per pole is set to "N(=6)." The jumper conductor having an irregular slot pitch connects the slot conductors by striding slots with a slot pitch "Np=N+1(=7)" in one of the coil ends and striding slots with a slot pitch "Np=N-1(=5)" in the other coil end, assuming that the number of slots per pole is set to "N(=6)." The stator winding has a plurality of slot conductor groups consisting of a plurality of slot conductors having the same phase.

12 Claims, 58 Drawing Sheets

(56) References Cited

U.S. PATENT DOCUMENTS

| | | | |
|---|---|---|---|
| 6,894,417 B2* | 5/2005 | Cai | H02K 3/12 |
| | | | 310/198 |
| 7,005,772 B1 | 2/2006 | Frederick et al. | |
| 2002/0092152 A1* | 7/2002 | Asao | H02K 1/16 |
| | | | 29/596 |
| 2003/0214196 A1 | 11/2003 | Cai et al. | |
| 2003/0230949 A1* | 12/2003 | Ogawa | H02K 3/12 |
| | | | 310/180 |
| 2004/0061400 A1* | 4/2004 | Fukushima | H02K 3/28 |
| | | | 310/184 |
| 2005/0212372 A1* | 9/2005 | Akita | H02K 3/28 |
| | | | 310/180 |
| 2009/0276997 A1* | 11/2009 | Akimoto | H02K 3/28 |
| | | | 29/596 |
| 2011/0012466 A1* | 1/2011 | Blissenbach | H02K 3/28 |
| | | | 310/195 |
| 2011/0012467 A1* | 1/2011 | Blissenbach | H02K 3/28 |
| | | | 310/195 |
| 2011/0025164 A1* | 2/2011 | Tanaka | H02K 3/12 |
| | | | 310/206 |
| 2012/0274171 A1* | 11/2012 | Ishikawa | H02K 3/12 |
| | | | 310/198 |
| 2013/0113330 A1* | 5/2013 | Saito | H02K 3/28 |
| | | | 310/207 |

OTHER PUBLICATIONS

Japanese-language Office Action issued in counterpart Japanese Application No. 2016-566143 dated Feb. 27, 2018 with English translation (nine (9) pages).

International Search Report (PCT/ISA/210) issued in PCT Application No. PCT/JP2015/085132 dated Apr. 19, 2016 with English-language translation (four (4) pages).

Japanese-language Written Opinion (PCT/ISA/237) issued in PCT Application No. PCT/JP2015/085132 dated Apr. 19, 2016 (five (5) pages).

* cited by examiner

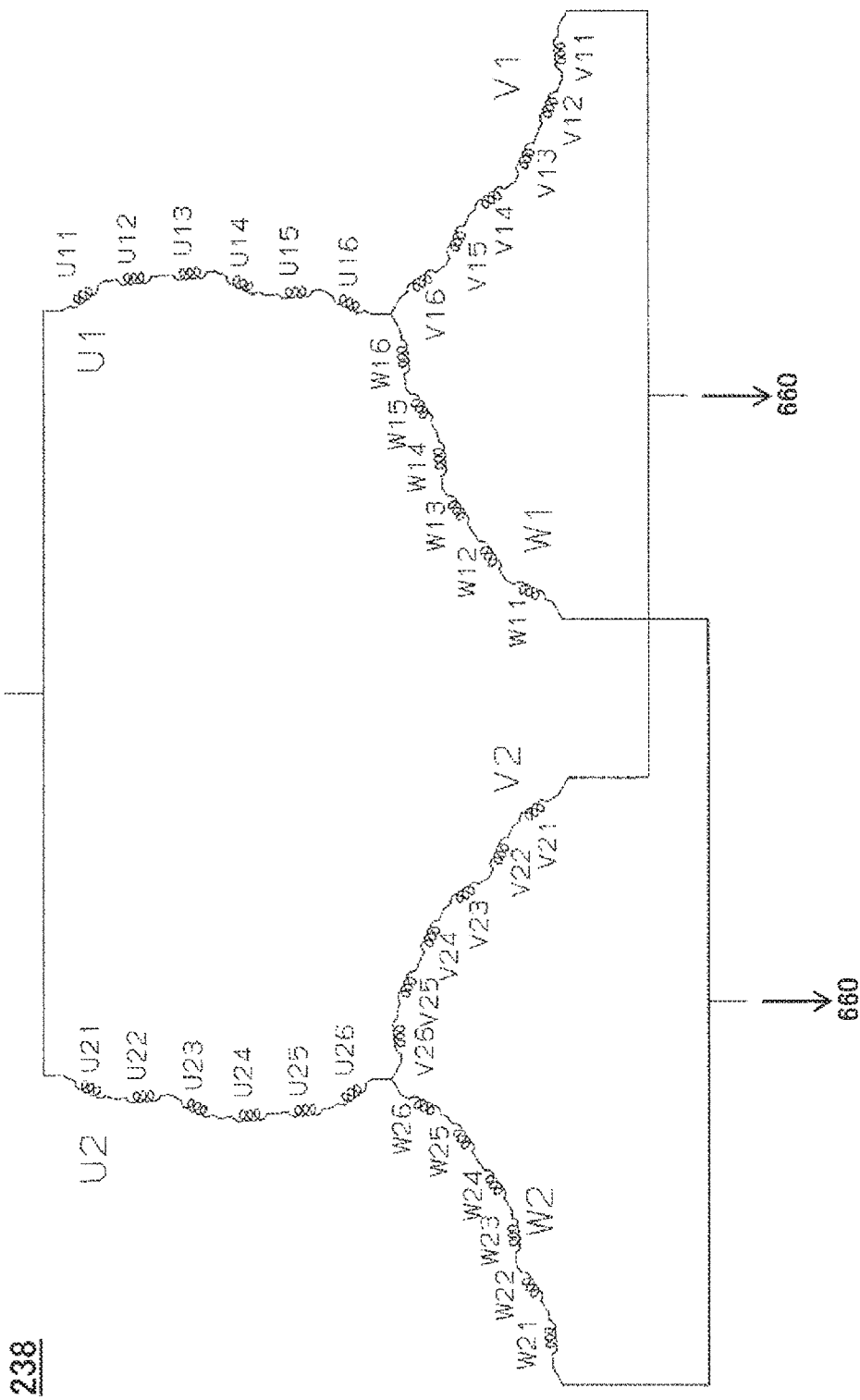

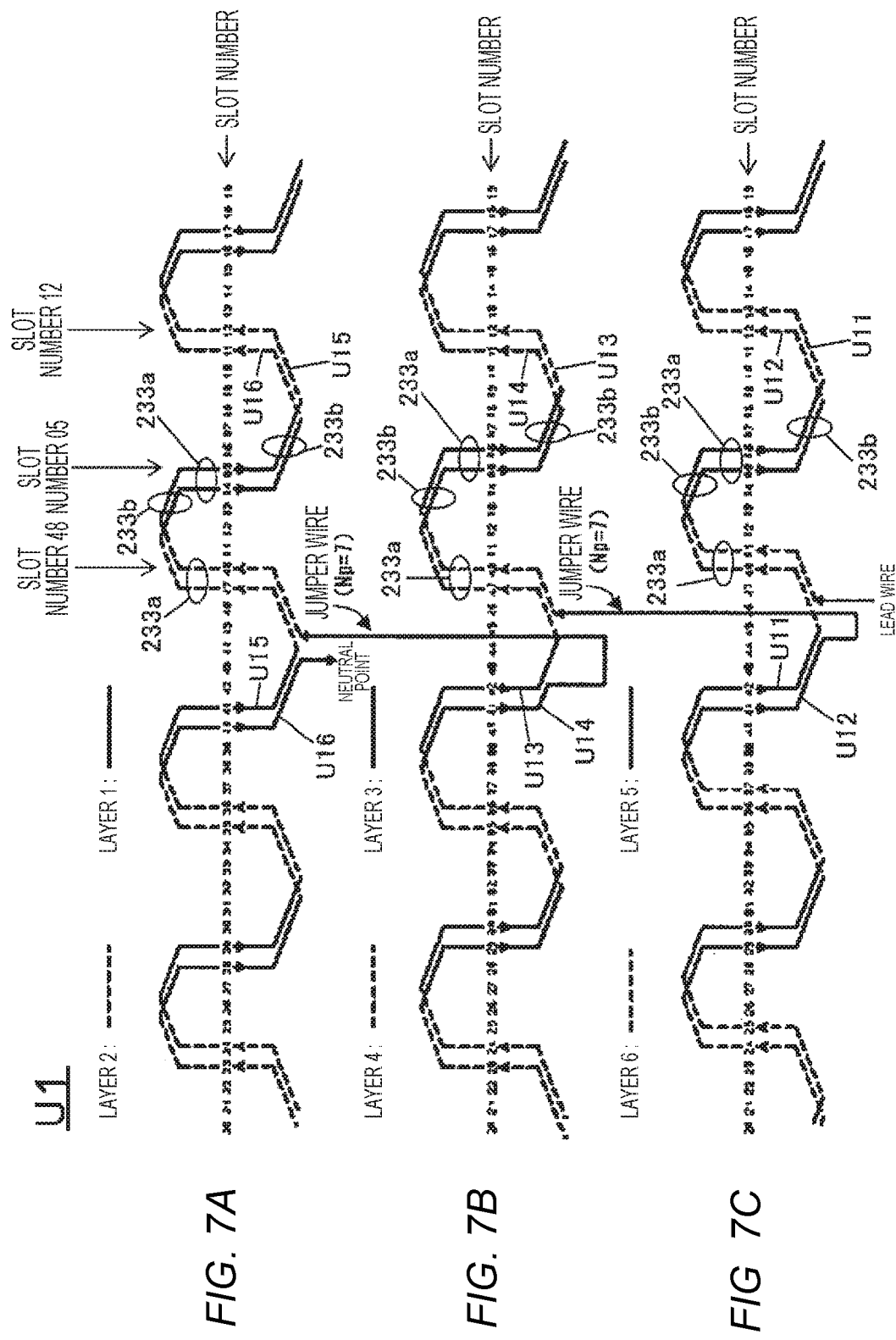

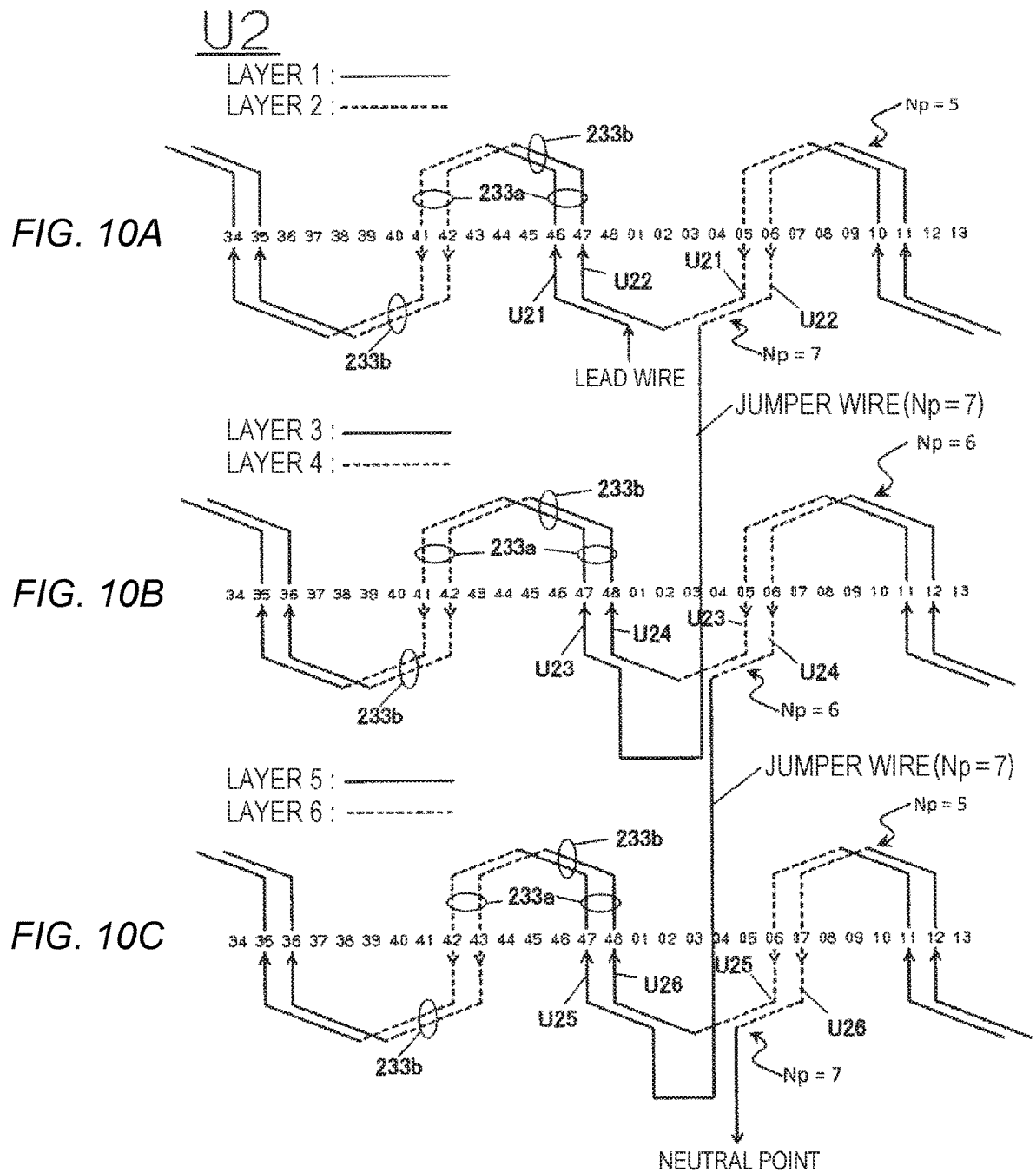

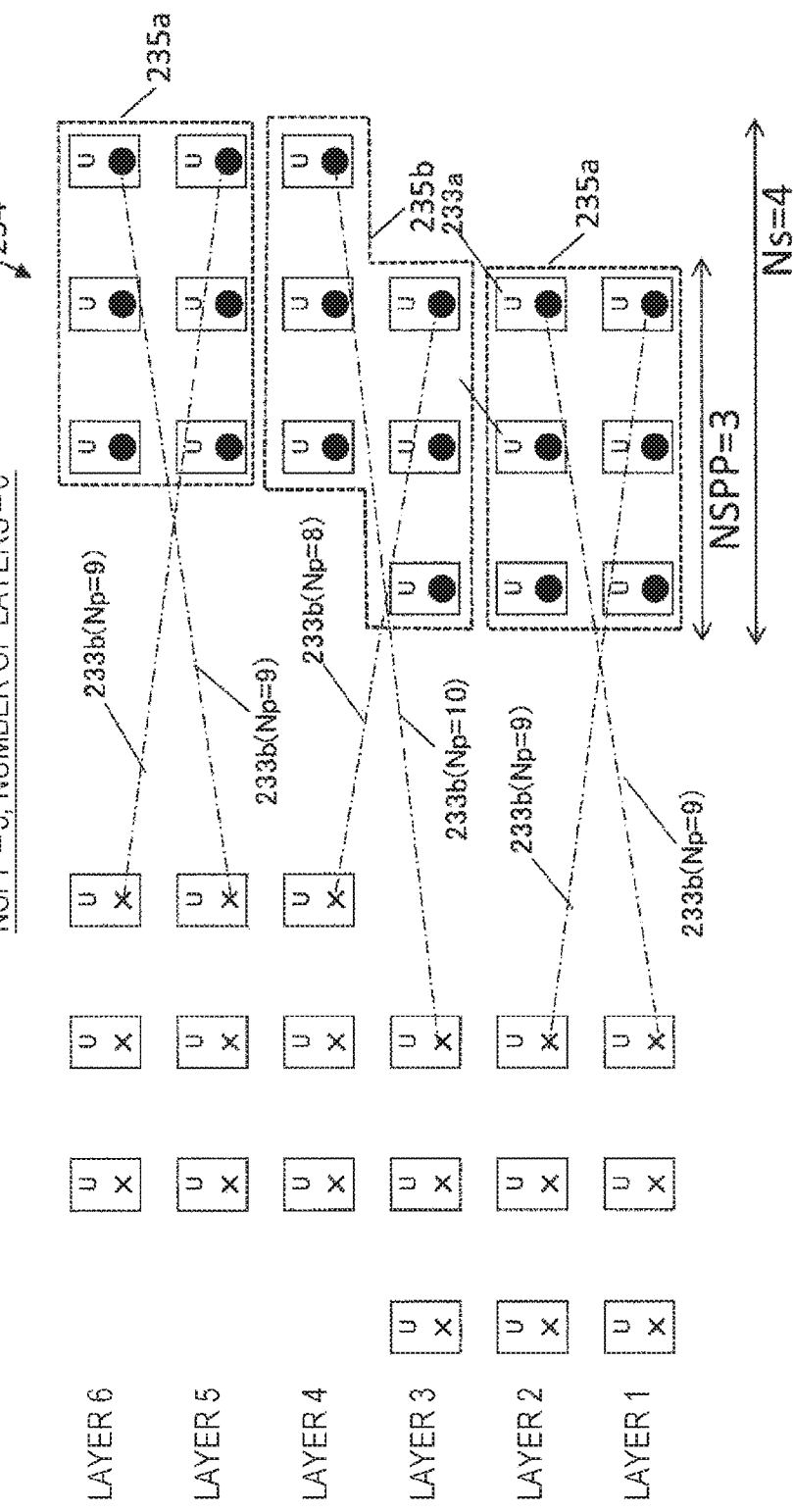

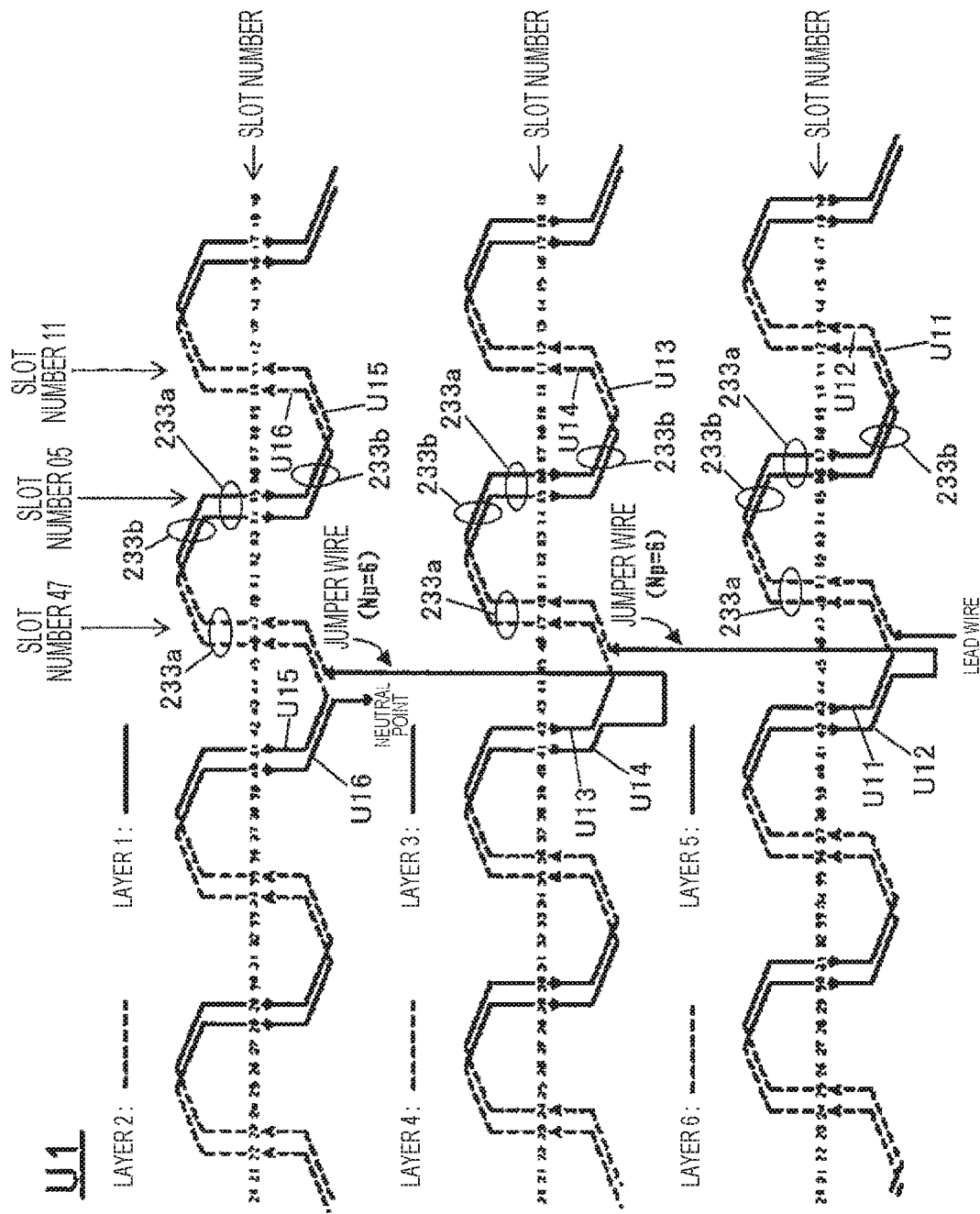

ROTARY ELECTRIC MACHINE AND VEHICLE PROVIDED WITH THE SAME

TECHNICAL FIELD

The present invention relates to a rotary electric machine and a vehicle provided with the same.

BACKGROUND ART

As a technology for windings of a rotary electric machine used to drive a vehicle, there is known a technique discussed in PTL 1.

CITATION LIST

Patent Literature

PTL 1: Japanese Unexamined Patent Application No. 2012-29370

SUMMARY OF INVENTION

Technical Problem

However, the rotary electric machine mounted on an electric vehicle or the like is demanded to provide a high torque and a low noise. For this reason, the present invention aims to provide a high-torque low-noise rotary electric machine.

Solution to Problem (1) A rotary electric machine according to a first preferable aspect of the present invention includes: a stator core provided with a plurality of slots; stator windings of a plurality of phases provided with a plurality of wave-wound winding coils, each having a slot conductor inserted into each slot of the stator core and included in any one of a plurality of layers and a jumper conductor that connects the same side ends of the slot conductors inserted into different slots to form a coil end; and a rotor rotatably supported to the stator core by interposing a vacancy, wherein the winding coils include a first winding coil having a first jumper conductor as the jumper conductor and a second winding coil having a second jumper conductor as the jumper conductor, the first jumper conductor connects the slot conductors to each other by striding the slots with a slot pitch of "Np=N" in one of the coil ends and striding the slots with a slot pitch of "Np=N" in the other coil end, where "N" denotes the number of slots per pole, the second jumper conductor connects the slot conductors to each other by striding the slots with a slot pitch of "Np=N+1" in one of the coil ends and striding the slots with a slot pitch of "Np=N−1" in the other coil end, where "N" denotes the number of slots per pole, and the stator winding has a plurality of slot conductor groups having a plurality of slot conductors of the same phase.

(2) A rotary electric machine according to a second preferable aspect of the present invention includes: a stator core provided with a plurality of slots; stator windings of a plurality of phases provided with a plurality of wave-wound winding coils, each having a slot conductor inserted into each slot of the stator core and included in any one of six or more even-numbered layers and a jumper conductor that connects the same side ends of the slot conductors inserted into different slots to form a coil end; and a rotor rotatably supported to the stator core by interposing a vacancy, wherein the jumper conductor connects the slot conductors to each other by striding the slots with a slot pitch of "Np=N" in one of the coil ends and striding the slots with a slot pitch of "Np=N" in the other coil end, where "N" denotes the number of slots per pole, the stator winding has a plurality of slot conductor groups having a plurality of slot conductors of the same phase, the plurality of slot conductors of the slot conductor group are inserted into a predetermined number (Ns) of slots continuously arranged in a circumferential direction of the stator core such that the slot and the layer are adjacent to each other, and the predetermined number (Ns) is set to "Ns=NSPP+NL1−1," where "NSPP" denotes the number of slots per pole per phase, and the number of layers is set to "2×NL1."

(3) A rotary electric machine according to a third preferable aspect of the present invention includes: a stator core provided with a plurality of slots; stator windings of a plurality of phases provided with a plurality of wave-wound winding coils, each having a slot conductor inserted into each slot of the stator core and included in any one of six or more even-numbered layers and a jumper conductor that connects the same side ends of the slot conductors inserted into different slots to form a coil end; and a rotor rotatably supported to the stator core by interposing a vacancy, wherein the jumper conductor connects the slot conductors to each other by striding the slots with a slot pitch of "Np=N+1" in one of the coil ends and striding the slots with a slot pitch of "Np=N−1" in the other coil end, where "N" denotes the number of slots per pole, the stator winding has a plurality of slot conductor groups having a plurality of slot conductors of the same phase, the plurality of slot conductors of the slot conductor group are inserted into a predetermined number (Ns) of slots continuously arranged in a circumferential direction of the stator core such that the slot and the layer are adjacent to each other, and the predetermined number (Ns) is set to "Ns=NSPP+1," where "NSPP" denotes the number of slots per pole per phase.

(4) A vehicle according to any one of first to third preferable aspects of the present invention includes a rotary electric machine, a battery that provides DC power, and a converter that converts the DC power of the battery into AC power and supplies the AC power to the rotary electric machine, wherein a torque of the rotary electric machine is used as a driving force.

Advantageous Effects of Invention

According to the present invention, it is possible to facilitate a high torque and a low noise in a rotary electric machine and a vehicle provided with the rotary electric machine.

BRIEF DESCRIPTION OF DRAWINGS

FIG. 6 is a wiring diagram illustrating a stator winding 238.

FIGS. 7A to 7C are diagrams illustrating a U1-phase winding group according to a first embodiment.

FIGS. 10A to 10C are partial enlarged views illustrating the U2-phase winding group according to the first embodiment.

FIG. 26 is a schematic diagram illustrating a layout of the slot conductor 233a according to a modification (Modification 6) of the first embodiment.

FIGS. 27A to 27C are diagrams illustrating a U1-phase winding group according to a second embodiment.

DESCRIPTION OF EMBODIMENTS

The rotary electric machine according to the present invention may be applied to a genuine electric vehicle operated only by the rotary electric machine or a hybrid type electric vehicle operated by both an engine and the rotary electric machine. In the following description, it is assumed that the rotary electric machine according to the present invention is applied to a hybrid type electric vehicle.

First Embodiment

Figure 1:
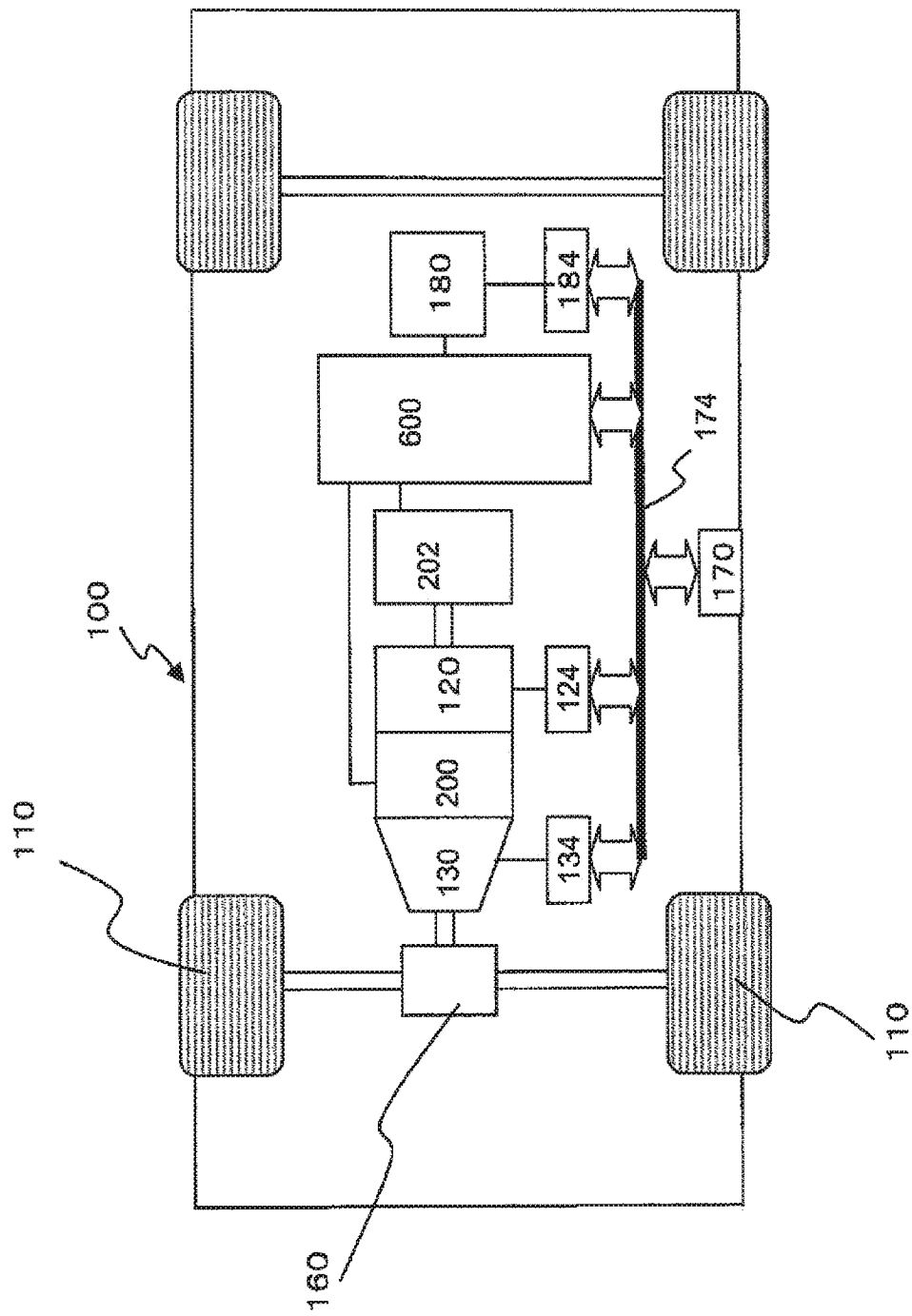
FIG. 1 is a diagram illustrating a schematic configuration of a hybrid electric vehicle.

FIG. 1 is a diagram illustrating a schematic diagram illustrating a hybrid type electric vehicle mounted with a rotary electric machine according to an embodiment of the present invention. A vehicle 100 is mounted with an engine 120, a first rotary electric machine 200, a second rotary electric machine 202, and a battery 180. If driving forces of the rotary electric machines 200 and 202 are necessary, the battery 180 supplies DC power to the rotary electric machines 200 and 202 through a power converter 600. In a regenerative operation, the battery 180 receives DC power from the rotary electric machines 200 and 202. Transmission of DC power between the battery 180 and the rotary electric machines 200 and 202 is performed through the power converter 600. In addition, although not shown in the drawings, the vehicle is mounted with a battery capable of supplying low-voltage power (for example, power of 14 V) to supply DC power to a control circuit described below.

A rotation torque generated by the engine 120 and the rotary electric machines 200 and 202 is transmitted to front wheels 110 through a transmission 130 and a differential gear 160. The transmission 130 is controlled by a transmission control device 134, and the engine 120 is controlled by an engine control device 124. The battery 180 is controlled by a battery control device 184. The transmission control device 134, the engine control device 124, the battery control device 184, the power converter 600, and the integrated control device 170 are connected to each other through a communication line 174.

The integrated control device 170 is an upper-layer control device of the transmission control device 134, the engine control device 124, the power converter 600, and the battery control device 184 and receives information representing each state of the transmission control device 134, the engine control device 124, the power converter 600, and the battery control device 184 through the communication line 174. The integrated control device 170 computes a control command for each control device on the basis of such obtained information. The computed control command is transmitted to each control device through the communication line 174.

The high-voltage battery 180 constituted by a secondary battery such as a lithium ion battery or a nickel hydrogen battery and outputs DC power of a high voltage of 250 V to 600 V or higher. The battery control device 184 outputs a charge/discharge status of the battery 180 or conditions of each unit cell of the battery 180 to the integrated control device 170 through the communication line 174.

If it is determined that charging of the battery 180 is necessary on the basis of the information from the battery control device 184, the integrated control device 170 instructs the power converter 600 to perform a generative operation. In addition, the integrated control device 170 predominantly performs management of the output torques of the engine 120 and the rotary electric machines 200 and 202 and computation for a total torque or a torque allocation ratio of the output torque of the engine 120 and the output torques of the rotary electric machines 200 and 202, and transmits a control command obtained on the basis of a result of the computation to the transmission control device 134, the engine control device 124, and the power converter 600. The power converter 600 controls the rotary electric machines 200 and 202 on the basis of a torque command from the integrated control device 170 so as to generate a torque output or generative power corresponding to the command.

The power converter 600 is provided with a power semiconductor included in an inverter for driving the rotary electric machines 200 and 202. The power converter 600 controls a switching operation of the power semiconductor on the basis of the command from the integrated control device 170. The rotary electric machines 200 and 202 are driven as a motor or a generator through a switching operation of this power semiconductor.

If the rotary electric machines 200 and 202 are driven as a motor, the DC power from the high-voltage battery 180 is supplied to a DC terminal of the inverter of the power converter 600. The power converter 600 controls a switching operation of the power semiconductor to convert the supplied DC power to the three-phase AC power and supplies the converted AC power to the rotary electric machines 200 and 202. Meanwhile, if the rotary electric machines 200 and 202 are driven as a generator, the rotors of the rotary electric machines 200 and 202 are rotationally driven by a rotation torque applied from the outside so that three-phase AC power is generated in the stator windings of the rotary electric machines 200 and 202. The generated three-phase AC power is converted into DC power by the power converter 600, and the DC power is supplied to the high-voltage battery 180, so as to charge the battery 180.

Figure 2:
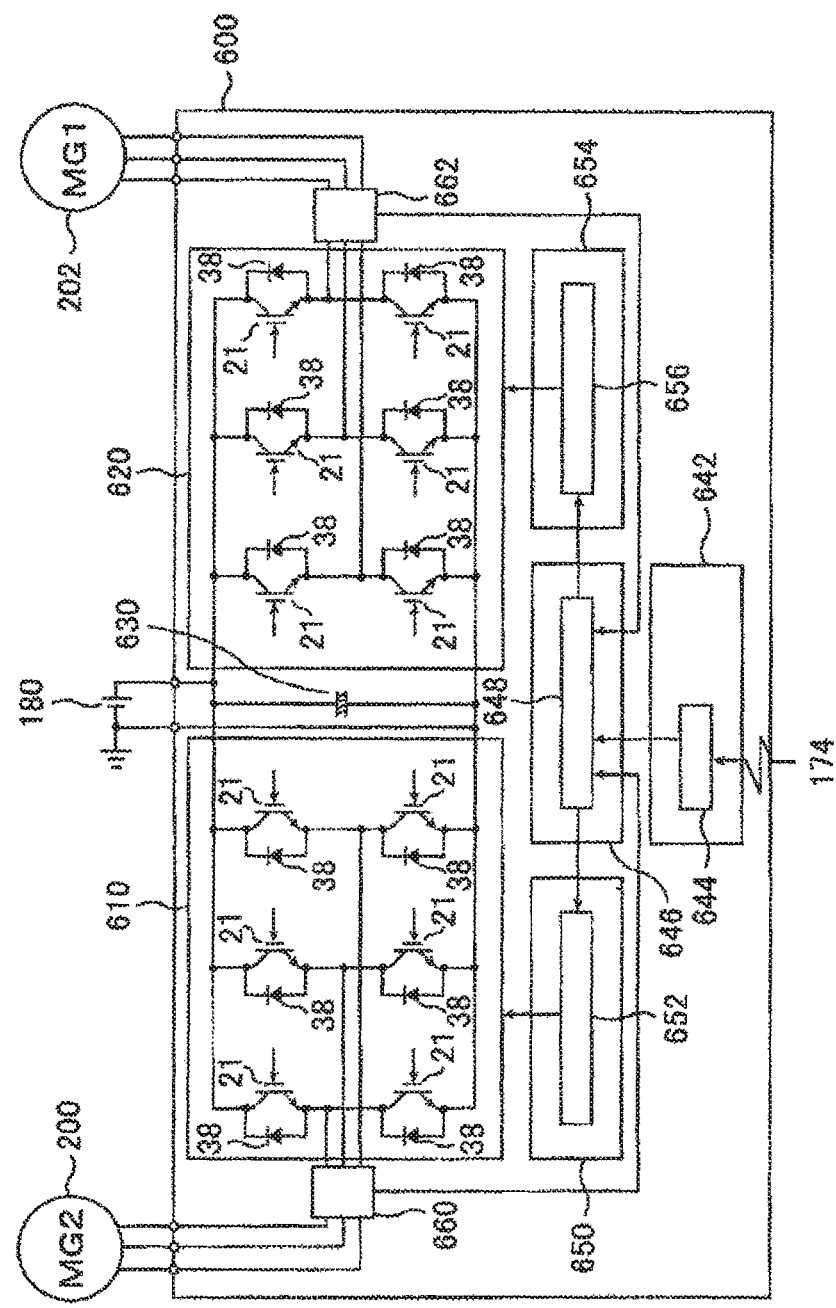
FIG. 2 is a circuit diagram illustrating a power converter 600.

FIG. 2 is a circuit diagram illustrating the power converter 600 of FIG. 1. The power converter 600 is provided with a first inverter device for the rotary electric machine 200 and a second inverter device for the rotary electric machine 202. The first inverter device is provided with a power module 610, a first driving circuit 652 that controls a switching operation of each power semiconductor 21 of the power module 610, and a current sensor 660 that detects an electric current of the rotary electric machine 200. The driving circuit 652 is provided on a driving circuit board 650.

Meanwhile, the second inverter device is provided with a power module 620, a second driving circuit 656 that controls a switching operation of each power semiconductor 21 of the power module 620, and a current sensor 662 that detects an electric current of the rotary electric machine 202. The driving circuit 656 is provided on a driving circuit board 654. A control circuit 648 provided on a control circuit board 646, a capacitor module 630, and a transmit/receive circuit 644 mounted on a connector board 642 are shared between the first and second inverter devices.

The power modules 610 and 620 are operated by driving signals output from respective driving circuits 652 and 656. The power modules 610 and 620 converts the DC power supplied from each battery 180 into three-phase AC power and supplies the converted power to stator windings as armature windings of the respective rotary electric machines 200 and 202. In addition, the power modules 610 and 620 convert the AC power generated in the stator windings of the rotary electric machines 200 and 202 into DC power and supply the DC power to the high-voltage battery 180.

The power modules 610 and 620 have the three-phase bridge circuit as illustrated in FIG. 2, and series circuits corresponding to three phases are electrically connected between positive and negative electrode sides of each battery 180 in parallel. Each series circuit has a power semiconductor 21 included in an upper arm and a power semiconductor 21 included in a lower arm, and such power semiconductors 21 are connected in series. The power modules 610 and 620 have almost the same circuit configuration as illustrated in FIG. 2, and the power module 610 will be described representatively herein.

According to this embodiment, an insulated gate bipolar transistor (IGBT) 21 is used as the switching power semiconductor device. The IGBT 21 has three electrodes including a collector electrode, an emitter electrode, and a gate electrode. A diode 38 is electrically connected between the collector electrode and the emitter electrode of the IGBT 21. The diode 38 has two electrodes including a cathode and an anode. The cathode and the anode are electrically connected to the collector electrode and the emitter electrode, respectively, of the IGBT 21, such that a direction from the emitter electrode to the collector electrode of the IGBT 21 becomes a forward direction.

Note that a metal oxide semiconductor field effect transistor (MOSFET) may also be employed as the switching power semiconductor device. The MOSFET has three electrodes including a drain electrode, a source electrode, and a gate electrode. In the case of the MOSFET, a parasitic diode is provided between the source and drain electrodes such that a direction from the drain electrode to the source electrode becomes a forward direction. Therefore, there is no need to provide the diode 38 of FIG. 2.

The arms of each phase are formed by electrically connecting the emitter electrode and the collector electrode of the IGBT 21 in series. Note that, although only one IGBT is illustrated for each of the upper and lower arms of each phase in this embodiment, a plurality of IGBTs are electrically connected in parallel in practice because a current capacity to be controlled is large. In the following description, for simplicity purposes, it is assumed that a single power semiconductor is provided.

In the example of FIG. 2, each of the upper and lower arms of each phase includes three IGBTs. The collector electrode of the IGBT 21 of each upper arm of each phase is electrically connected to the positive electrode side of the battery 180, and the source electrode of the IGBT 21 of each lower arm of each phase is electrically connected to the negative electrode side of the battery 180. A midpoint of each arm of each phase (a coupling portion between an emitter electrode of the IGBT of the upper arm side and the collector electrode of the IGBT of the lower arm side) is electrically connected to an armature winding (stator winding) of the corresponding phase of the corresponding rotary electric machines 200 and 202.

The driving circuits 652 and 656 constitute a driving unit for controlling the corresponding inverter devices 610 and 620 and generate a driving signal for driving the IGBT 21 on the basis of the control signal output from the control circuit 648. The driving signals generated from each of the driving circuits 652 and 656 are output to the respective gates of each power semiconductor device of the corresponding power modules 610 and 620. Each of the driving circuits 652 and 656 is provided with six integrated circuits for generating driving signals supplied to the gates of each of the upper and lower arms of each phase, and the six integrated circuits constitute a single block.

The control circuit 648 serves as a control unit of each inverter device 610 and 620 and includes a microcomputer that computes a control signal (control value) for operating (turning on or off) a plurality of switching power semiconductor devices. The control circuit 648 receives a torque command signal (torque command value) from an upper-layer control device, sensor outputs of the current sensors 660 and 662, and sensor outputs of the rotation sensors of the rotary electric machines 200 and 202. The control circuit 648 computes a control value on the basis of such input signals and outputs a control signal for controlling switching timings of the driving circuits 652 and 656.

The transmit/receive circuit 644 mounted on the connector board 642 is to electrically connect the power converter 600 and an external control device and performs information transmit/receive operation with other devices through the communication line 174 of FIG. 1. The capacitor module 630 serves as a smoothing circuit for suppressing fluctuation of the DC voltage generated by a switching operation of the IGBT 21 and is electrically connected to a DC side terminal of the first or second power module 610 or 620 in parallel.

Figure 3:
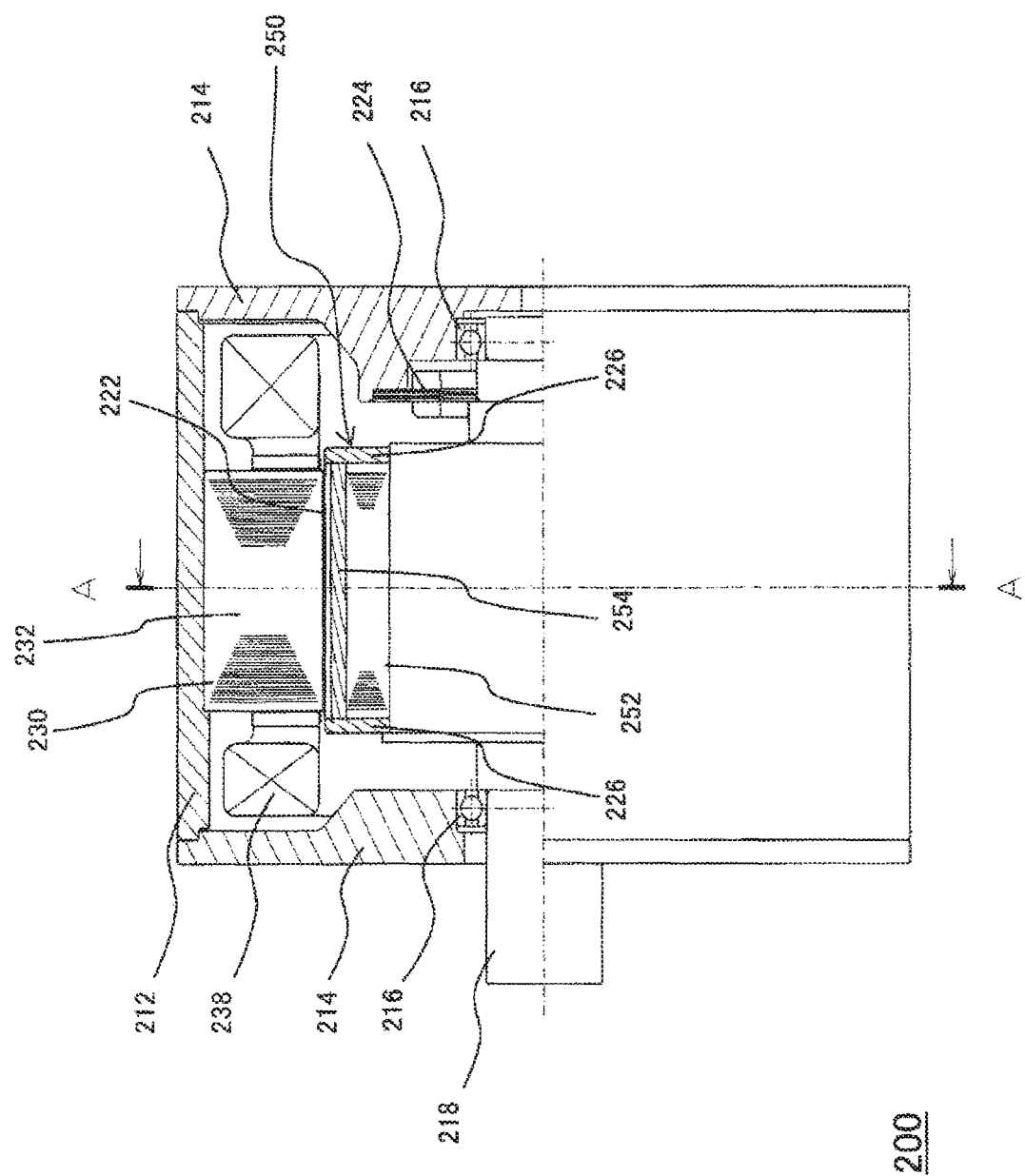
FIG. 3 is a cross-sectional view illustrating a rotary electric machine 200.

FIG. 3 is a cross-sectional view illustrating the rotary electric machine 200 of FIG. 1. Note that the rotary electric machines 200 and 202 have nearly the same structure, and in the following description, the structure of the rotary electric machine 200 will be described representatively. However, the following structure is not necessarily employed in both the rotary electric machines 200 and 202 and may be employed in only one of the rotary electric machines 200 and 202.

A stator 230 is housed in a housing 212, and the stator 230 has a stator core 232 and a stator winding 238. A rotor 250 is rotatably held in the inner circumference side of the stator core 232 by interposing a vacancy 222. The rotor 250 has a rotor core 252 fixed to a shaft 218, a permanent magnet 254, and a non-magnetic cover plate 226. The housing 212 has a pair of end brackets 214 provided with a bearing 216, and the shaft 218 is rotatably held by this bearing 216.

The shaft 218 is provided with a resolver 224 that detects a pole position or a rotational speed of the rotor 250. The output from this resolver 224 is input to the control circuit 648 of FIG. 2. The control circuit 648 outputs the control signal to the driving circuit 652 on the basis of the received output. The driving circuit 652 outputs a driving signal based on this control signal to the power module 610. The power module 610 performs a switching operation on the basis of the control signal to convert the DC power supplied from the battery 180 into three-phase AC power. This three-phase AC power is supplied to the stator winding 238 of FIG. 3 to generate a rotating magnetic field in the stator 230. A frequency of a three-phase AC current is controlled on the basis of the output value of the resolver 224, and a phase of the three-phase AC current for the rotor 250 is also controlled on the basis of the output value of the resolver 224.

Figure 4:
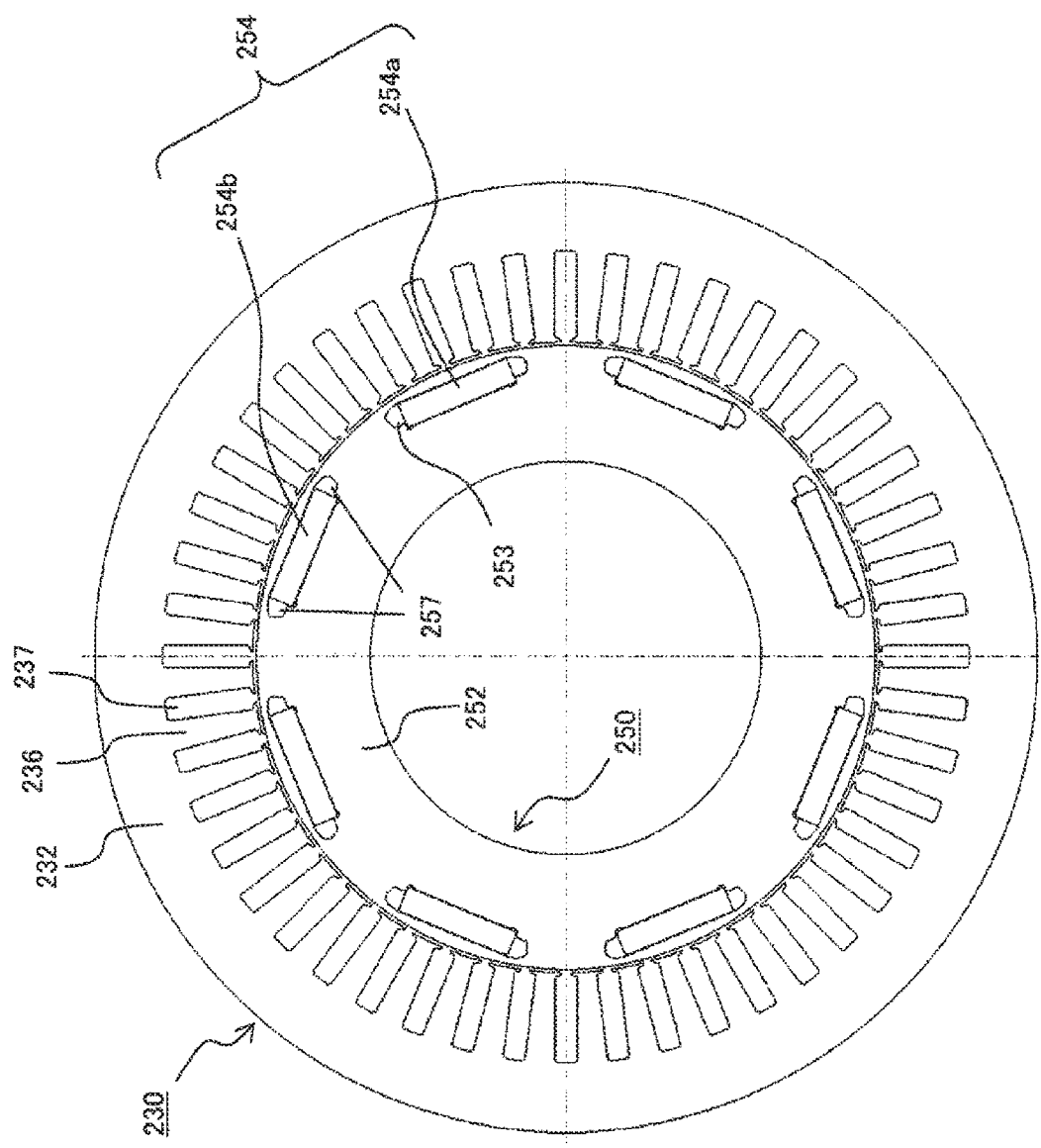
FIG. 4 is a cross-sectional view illustrating a stator 230 and a rotor 250.

FIG. 4 is a diagram illustrating cross sections of the stator 230 and the rotor 250 taken along the line A-A of FIG. 3. Note that, in FIG. 4, the housing 212, the shaft 218, and the stator winding 238 are not illustrated. A plurality of slots 237 and a plurality of teeth 236 are arranged in the inner circumference side of the stator core 232 uniformly across the entire circumference. In FIG. 4, reference numerals are not given for all of the slots and the teeth, but are given for a part of the teeth and the slots representatively. A slot insulation material (not shown) is provided inside the slot 237, and a plurality of phase coils for a U-phase, a V-phase, and a W-phase included in the stator winding 238 of FIG. 3 are installed in the slot 237. According to this embodiment, the forty eight slots 237 are formed at equal intervals.

A plurality of holes 253, in this example, eight holes 253 where rectangular magnets are inserted are arranged along a circumferential direction in the vicinity of the outer circumference of the rotor core 252. Each hole 253 is formed along an axial direction, and a permanent magnet 254 is buried in each hole 253 and is fixed using an adhesive or the like. A circumferential width of the hole 253 is set to be larger than a circumferential width of the permanent magnet 254 (254a and 254b). Cavities 257 in both sides of the permanent magnet 254 serve as magnetic cavities. This cavity 257 may be buried with an adhesive or may be fixed with a molding resin integrally with the permanent magnet 254. The permanent magnet 254 serves as a magnetic field pole of the rotor 250. In this embodiment, an eight-pole configuration is employed.

A magnetization direction of the permanent magnet 254 is set in a radial direction, and a magnetization direction is inverted for each magnetic field pole. That is, assuming that a stator side surface of the permanent magnet 254a is set as an N-pole, and an axial side surface is set as an S-pole, the stator side surface of the neighboring permanent magnet 254b becomes the S-pole, and the axial side surface becomes the N-pole. In addition, these permanent magnets 254a and 254b are alternately arranged along the circumferential direction.

The permanent magnet 254 may be inserted into the hole 253 after magnetization. Alternatively, the permanent magnet 254 may be magnetized by applying a strong magnetic field after insertion into the hole 253 of the rotor core 252. However, the permanent magnet 254 subjected to magnetization becomes a strong magnet. Therefore, if the magnetization is performed before the permanent magnet 254 is fixed to the rotor 250, a strong attracting force may be generated to the rotor core 252 during a fixing work of the permanent magnet 254, and this would hinder a mounting work. In addition, due to a strong attracting force of the permanent magnet 254, a dirt such as iron particles may be attached to the permanent magnet 254. For this reason, considering productivity of the rotary electric machine, it is preferable that the permanent magnet 254 be magnetized after insertion into the rotor core 252.

Note that the permanent magnet 254 may be formed of a neodymium based or samarium-based sintered magnet, a ferrite magnet, a neodymium-based bonded magnet, or the like. The permanent magnet 254 has a residual magnetic flux density of approximately 0.4 to 1.4 T.

If a rotating magnetic field is generated in the stator 230 by flowing a three-phase AC current through the stator winding 238, this rotating magnetic field is applied to the permanent magnets 254a and 254b of the rotor 250 to generate a torque. This torque is expressed as a product of a component crossing each phase coil out of the magnetic flux emitting from the permanent magnet 254 and a component perpendicular to the crossing magnetic flux of the AC current flowing through each phase coil. Here, since the AC current is controlled to have a sinusoidal waveform, a product of a fundamental wave component of the crossing magnetic flux and a fundamental wave component of the AC current becomes a time average component of the torque, and a product of a harmonic component of the crossing magnetic flux and a fundamental wave component of the AC current becomes a torque ripple as a harmonic component of the torque. That is, in order to reduce the torque ripple, it is desirable to reduce a harmonic component of the crossing magnetic flux. In other words, since a product of the crossing magnetic flux and an angular velocity of the rotating rotor is the induced voltage, reduction of the harmonic component of the crossing magnetic flux is equivalent to reduction of the harmonic component of the induced voltage.

Figure 5:
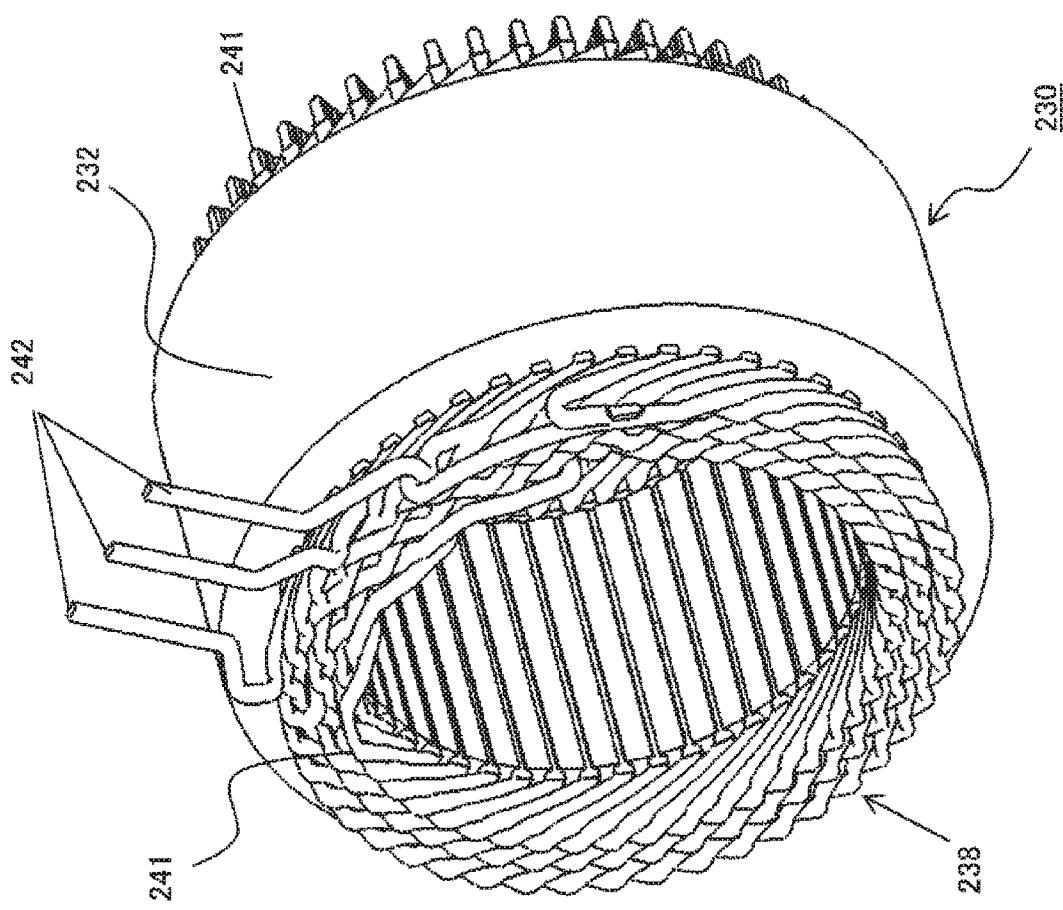
FIG. 5 is a perspective view illustrating a stator 230.

FIG. 5 is a perspective view illustrating the stator 230. According to this embodiment, the stator winding 238 is wound around the stator core 232 in a wave winding shape. Coil ends 241 of the stator winding 238 are formed on both end surfaces of the stator core 232. In addition, a lead wire 242 of the stator winding 238 is extracted from one of the end surface sides of the stator core 232. The lead wire 242 is extracted to match the U-phase, the V-phase, and the W-phase.

FIG. 6 is a wiring diagram of the stator winding 238 illustrating a wiring method and an electric phase relationship of each phase coil. The stator winding 238 according to this embodiment employs double star connection in which a first star connection including a U1-phase winding group, a V1-phase winding group, and a W1-phase winding group and a second star connection including a U2-phase winding group, a V2-phase winding group, and a W2-phase winding group are connected in parallel. Each of the U1, V1, and W1 phase winding groups and the U2, V2, and W2 phase winding groups consists of six winding coils. The U1-phase winding group has winding coils U11 to U16. The V1-phase winding group has winding coils V11 to V16. The W1-phase winding group has winding coils W11 to W16. The U2-phase winding group has winding coils U21 to U26. The V2-phase winding group has winding coils V21 to V26. The W2-phase winding group has winding coils W21 to W26. As illustrated in FIG. 6, in the first and second star connections, the U-phases are electrically connected to each other, the V-phases are electrically connected to each other, and the W-phases are electrically connected to each other. Their connection parts are connected to the current sensor 660.

As illustrated in FIG. 6, the V-phase and W-phase have nearly the same configuration as that of the U-phase, and are arranged so that the phases of the induced voltages are deviated by 120° in an electric angle. In addition, an angle of each winding coil is expressed as a relative phase. As illustrated in FIG. 6, according to this embodiment, a double star connection (2Y) connected in parallel is employed in the stator winding 238. However, a single star connection (1Y) may also be employed by connecting the wiring coils in series depending on a driving voltage of the rotary electric machine.

FIGS. 7(a) to 7(c) and FIGS. 8(a) to 8(c) are diagrams illustrating a specific connection of the U-phase coil of the stator winding 238. As described above, forty eight slots 237 are provided in the stator core 232 (refer to FIG. 4), and the reference numerals 01, 02, . . . , 47, and 48 shown in FIGS. 7(a) to 7(c) and FIGS. 8(a) to 8(c) denote the slot numbers.

FIG. 7(a) illustrates winding coils U15 and U16 of the U1-phase winding group. FIG. 7(b) illustrates winding coils U13 and U14 of the U1-phase winding group. FIG. 7(c) illustrates winding coils U11 and 12 of the U1-phase winding group.

Figures 8A, 8B, 8C:
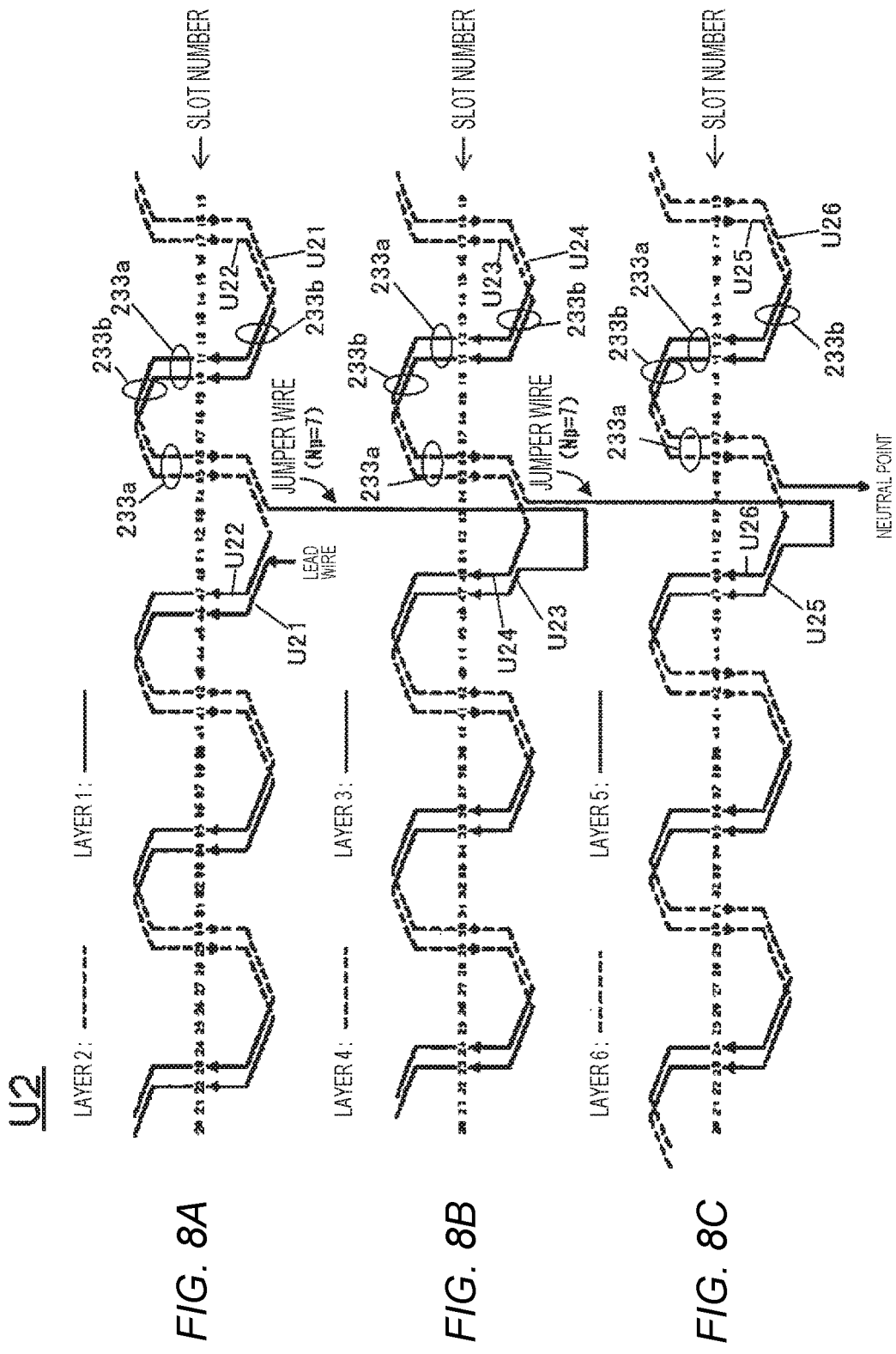
FIGS. 8A to 8C are diagrams illustrating a U2-phase winding group according to the first embodiment.

FIG. 8(a) illustrates winding coils U21 and 22 of the U2-phase winding group. FIG. 8(b) illustrates winding coils U23 and U24 of the U2-phase winding group. FIG. 8(c) illustrates winding coils U25 and U26 of the U2-phase winding group.

As illustrated in FIGS. 7(a) to 7(c) and FIGS. 8(a) to 8(c), each winding coil U11 to U26 includes a slot conductor 233a inserted into a slot and a jumper conductor 233b that connects the same side ends of the slot conductors 233a inserted into different slots to each other to form a coil end 241 (refer to FIG. 5). For example, in the case of the slot conductor 233a inserted into the slot 237 of the slot number 05 illustrated in FIG. 7(a), the upper end in the drawing is connected to the upper end of the slot conductor 233a inserted into the slot 237 of the slot number 48 through the jumper conductor 233b that forms an upper coil end. Reversely, the lower end is connected to the lower end of the slot conductor 233a inserted into the slot 237 of the slot number 12 through the jumper conductor 233b that forms a lower coil end. In this manner, the slot conductors 233a are connected to each other through the jumper conductor 233b to form a wave-wound winding coil.

As described below, according to this embodiment, six slot conductors 233a are inserted side by side into a single slot from the inner circumference side to the outer circumference side, and they will be referred to as layers 1, 2, 3, 4, 5, and 6 in order from the inner circumference side. In FIGS. 7(a) to 7(c) and FIGS. 8(a) to 8(c), the solid line portions of the winding coils U15, U16, U21, and U22 belong to the layer 1, and the dashed line portions belong to the layer 2. The solid line portions of the winding coils U13, U14, U23, and U24 belong to the layer 3, and the dashed line portions belong to the layer 4. The solid line portions of the winding coils U11, U12, U25, and U26 belong to the layer 5, and the dashed line portions belong to the layer 6.

Although not shown in FIGS. 7(a) to 7(c) and FIGS. 8(a) to 8(c), the winding coils U15 and U16 of FIG. 7(a), the winding coils U11 and U12 of FIG. 7(c), the winding coils U21 and 22 of FIG. 8(a), and the winding coils U25 and U26 of FIG. 8(c) are wound in a wave winding shape having an irregular slot pitch as described below. The winding coils U13 and U14 of FIG. 7(b) and the winding coils U23 and U24 of FIG. 8(b) are wound in a wave winding shape having a normal slot pitch as described below. The irregular slot pitch and the normal slot pitch will be described below in conjunction with FIGS. 9(a) to 9(c) and 10A to 10C.

Note that the winding coils U11 to U26 may be formed as a continuous conductor or may be formed to connect the segment coils by welding or the like after the segment coil is inserted into the slot. If the segment coils are used, the coil ends 241 positioned in both axial ends of the ends of the stator core 232 can be formed in advance before the segment coil is inserted into the slot 237, so that it is possible to easily provide an appropriate insulation interval between different phases or between the same phases. As a result, it is possible to suppress a partial discharge caused by a surge voltage generated by a switching operation of the IGBT 21, and this is effective in insulation.

The conductor used in the winding coil may have a plurality of shapes such as a rectangular shape, a circular shape, or a narrow shape. However, in order to increase a space factor for high output power and high efficiency, the rectangular shape is desirable.

Figure 9A:
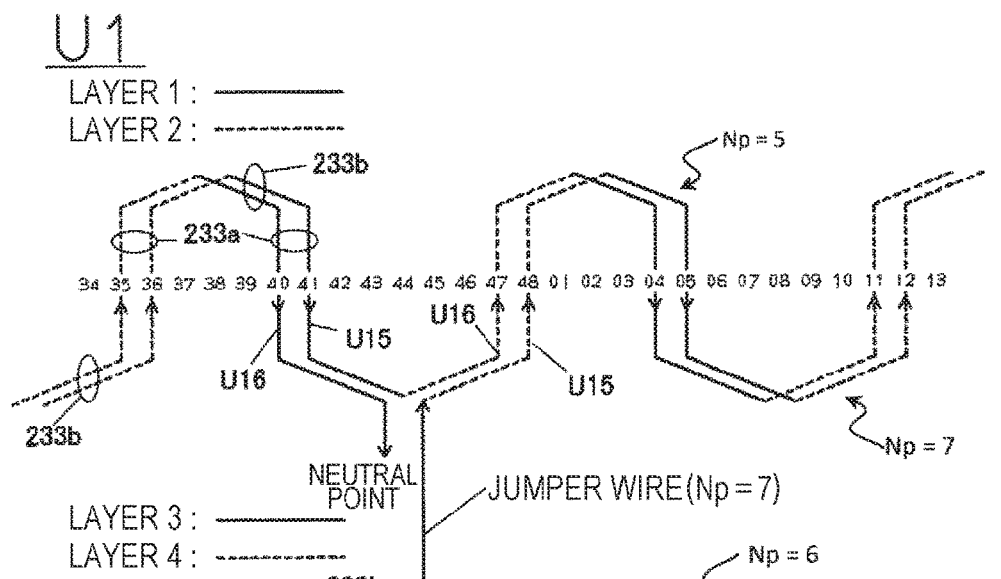
FIGS. 9A to 9C are partial enlarged views illustrating the U1-phase winding group according to the first embodiment.
Figure 9B:
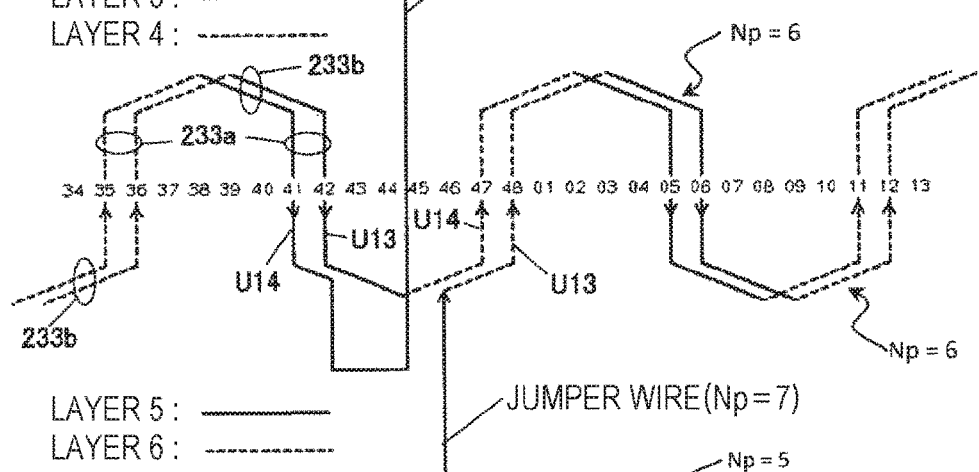
Figure 9C:
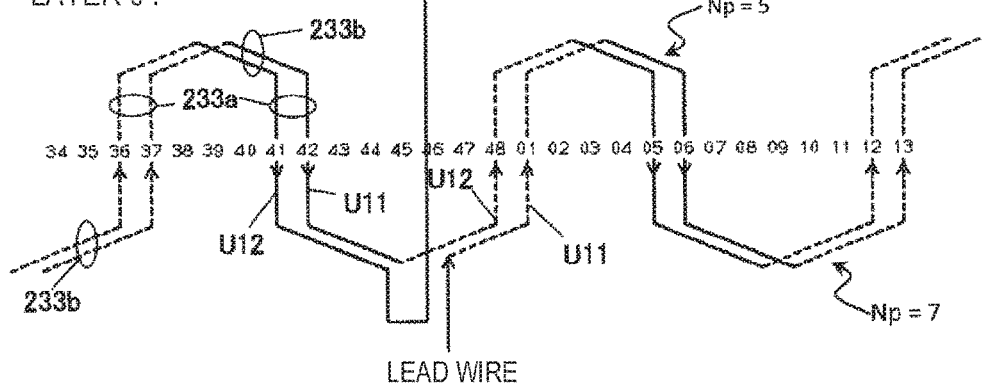

FIGS. 9(a) to 9(c) are partial enlarged views illustrating the U1-phase winding group of FIGS. 7(a) to 7(c). FIGS. 10A to 10C are partial enlarged views illustrating the U2-phase winding group of FIGS. 8(a) to 8(c). In FIGS. 9(a) to 9(c) and 10A to 10C, a part of the phase winding groups corresponding to four poles including the jumper wire are illustrated. Hereinafter, a method of winding the U1-phase winding group will be described with reference to FIGS. 9(a) to 9(c), and a method of winding the U2-phase winding group will be described with reference to FIGS. 10A to 10C.

As illustrated in FIG. 9(c), the stator winding group U1 enters the layer 6 of the slot number 01 from the lead wire and strides over five slots through the jumper conductor 233b, and the slot conductor 233a then enters the layer 5 of the slot number 06. Then, the slot conductor 233a strides over seven slots from the layer 5 of the slot number 06 and enters the layer 6 of the slot number 13.

In this manner, the stator winding is wound around the stator core 232 by a single turn in a wave winding shape up to the layer 5 of the slot number 42, such that a striding span of the jumper conductor 233b in the coil end side (lower side in the drawing) where the lead wire is extracted becomes a slot pitch "Np=7," and a striding span of the jumper conductor 233b in the opposite coil end side (upper side in the drawing) becomes a slot pitch "Np=5." This wave winding will be referred to as a "wave winding of an irregular slot pitch." The stator winding corresponding to an approximately single turn up to here is the winding coil U11 of FIG. 6.

Then, the stator winding extracted from the layer 5 of the slot number 42 enters the layer 6 of the slot number 48 by striding over six slots. The winding from the layer 6 of the slot number 48 corresponds to the winding coil U12 of FIG. 6. Similar to the winding coil U11, the winding coil U12 is wound in a wave winding shape having an irregular slot pitch. That is, the striding span of the jumper conductor 233b is set to a slot pitch "Np=7" on the lead wire side, and is set to a slot pitch "Np=5" on the opposite side, so that the stator winding is wound around the stator core 232 by a single turn up to the layer 5 of the slot number 41 in a wave winding shape. The stator winding corresponding to an approximately single turn up to here is the winding coil U12.

Note that, since the winding coil U12 is wound to deviate by a single slot pitch from the winding coil U11, a phase difference of an electric angle corresponding to a single slot pitch is generated. In this embodiment, a single slot pitch corresponds to an electric angle of 30°. Referring to FIG. 6, there is a deviation of 30° between the winding coils U11 and U12.

As illustrated in FIGS. 9(b) and 9(c), the stator winding extracted from the layer 5 of the slot number 41 enters the layer 4 of the slot number 48 through a jumper wire striding over seven slots. The winding from the layer 4 of the slot number 48 corresponds to the winding coil U13 of FIG. 6. In the winding coil U13, the striding span of the jumper conductor 233b is set to a slot pitch "Np=6" on both the lead wire side and the opposite side, so that the stator winding is wound around the stator core 232 by a single turn up to the layer 3 of the slot number 42 in a wave winding shape. Such a wave winding is referred to as a "wave winding having a normal slot pitch." The stator winding up to here for an approximately single turn is the winding coil U13.

Then, the stator winding extracted from the layer 3 of the slot number 42 enters the layer 4 of the slot number 47 by striding over five slots. The winding from the layer 4 of the slot number 47 corresponds to the winding coil U14 of FIG. 6. Similar to the winding coil U13, the winding coil U14 is also wound in a wave winding shape having a normal slot pitch. That is, the striding span of the jumper conductor 233b is set to a slot pitch Np=6 in both the lead wire side and the opposite side, so that the stator winding is wound around the stator core 232 by a single turn up to the layer 3 of the slot number 41 in a wave winding shape. The stator winding up to here for an approximately single turn is the winding coil U14.

Note that, since the winding coil U14 is wound to deviate by a single slot pitch from the winding coil U13, a phase difference of an electric angle corresponding to a single slot pitch is generated. In this embodiment, a single slot pitch corresponds to an electric angle of 30°. Referring to FIG. 6, there is a deviation of 30° between the winding coils U13 and U14.

As illustrated in FIGS. 9(a) and 9(b), the stator winding extracted from the layer 3 of the slot number 41 enters the layer 2 of the slot number 48 through a jumper wire striding over seven slots. The winding from the layer 2 of the slot number 48 corresponds to the winding coil U15 of FIG. 6. Similar to the winding coil U11, the winding coil U15 is also wound in a wave winding shape having an irregular slot pitch. That is, the striding span of the jumper conductor 233b is set to a slot pitch "Np=7" in the lead wire side and is set to a slot pitch "Np=5" in the opposite side, so that the stator winding is wound around the stator core 232 by a single turn up to the layer 1 of the slot number 41 in a wave winding shape. The stator winding up to here for an approximately single turn is the winding coil U15.

Then, the stator winding extracted from the layer 1 of the slot number 41 enters the layer 2 of the slot number 47 by striding over six slots. The winding from the layer 2 of the slot number 47 corresponds to the winding coil U16 of FIG. 6. Similar to the winding coil U15, the winding coil U16 is also wound in a wave winding shape having an irregular slot pitch. The striding span of the jumper conductor 233b is set to a slot pitch "Np=7" in the lead wire side and is set to a slot pitch "Np=5" in the opposite side, so that the stator winding is wound around the stator core 232 by a single turn up to the layer 1 of the slot number 40 in a wave winding shape. The stator winding up to here for an approximately single turn is the winding coil U16.

Note that, since the winding coil U16 is wound to deviate by a single slot pitch from the winding coil U15, a phase difference of an electric angle corresponding to a single slot pitch is generated. In this embodiment, a single slot pitch corresponds to an electric angle of 30°. Referring to FIG. 6, there is a deviation of 30° between the winding coils U15 and U16.

Since the striding span of the jumper conductor 233b is different between the winding coils U13 and U14 and the winding coils U11, U12, U15, and U16, a crossing magnetic flux amount is also different.

The stator winding group U2 of FIGS. 10A to 10C is also wound with the same striding span as that of each layer of the stator winding group U1. The winding coil U21 is wound in a wave winding shape having an irregular slot pitch from the layer 1 of the slot number 46 to the layer 2 of the slot number 05, and the winding coil U22 is wound in a wave winding shape having an irregular slot pitch from the layer 1 of the slot number 47 up to the layer 2 of the slot number 06. Then, the stator winding enters the layer 3 of the slot number 47 from the layer 2 of the slot number 06 through the jumper wire and is wound as the winding coil U23 in a wave winding shape having a normal slot pitch up to the layer 4 of the slot number 05. Then, the stator winding is wound in a wave winding shape having a normal slot pitch from the layer 3 of the slot number 48 up to the layer 4 of the slot number 06, so that the winding coil U24 is formed. Then, the stator winding enters the layer 5 of the slot number 47 from the layer 4 of the slot number 06 through the jumper wire and is wound as a winding coil U25 in a wave winding shape having an irregular slot pitch up to the layer 6 of the slot number 06. Then, the stator winding is wound in a wave winding shape having an irregular slot pitch from the layer 5 of the slot number 48 up to the layer 6 of the slot number 07, so that a winding coil U26 is formed.

As described above, the stator winding group U1 includes the winding coils U11, U12, U13, U14, U15, and U16, and a voltage obtained by synthesizing each phase is induced in the stator winding group U1. Similarly, in the stator winding group U2, a voltage obtained by synthesizing phases of the winding coils U21, U22, U23, U24, U25, and U26 is induced. While the stator winding group U1 is connected to the stator winding group U2 in parallel as illustrated in FIG. 6, there is no phase difference between the voltages induced from the stator winding groups U1 and U2, and there is no worry about an imbalance current such as a circulation current even in the parallel connection. Naturally, there is no problem in a series connection.

Figure 11:
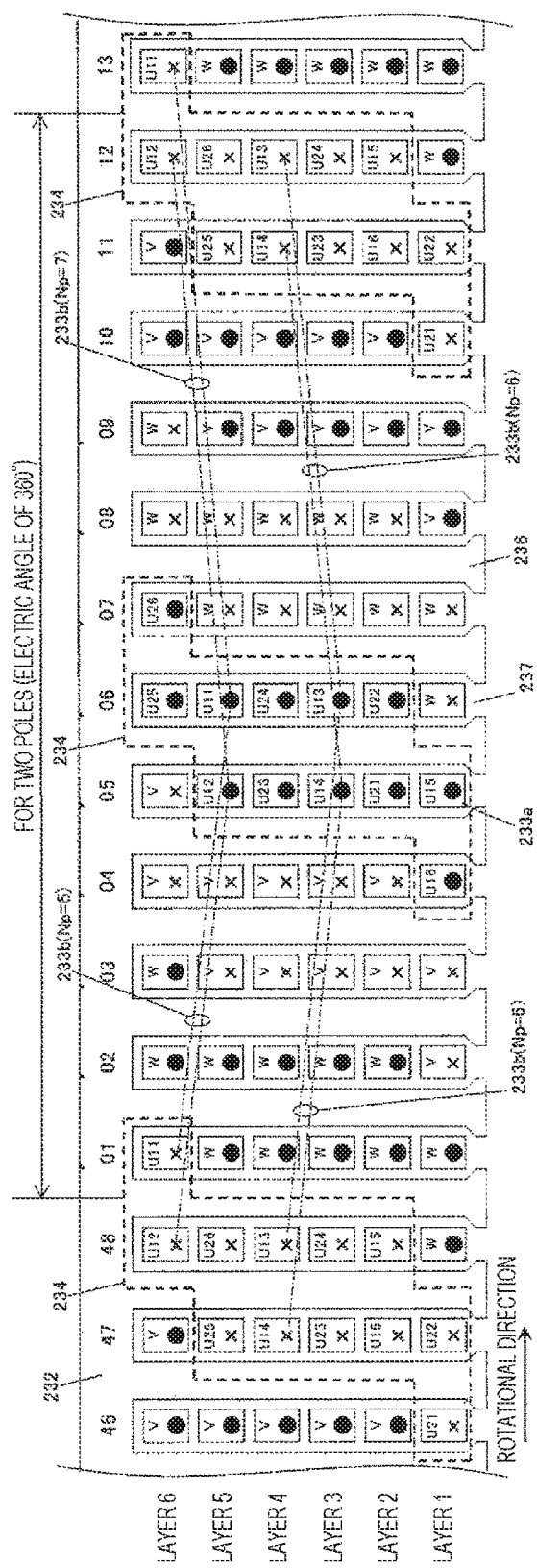
FIG. 11 is a layout diagram of a slot conductor 233a according to the first embodiment.

FIG. 11 is a diagram generally illustrating a layout of the slot conductor 233a in the stator core 232 for the slot numbers 46 to 13 of FIGS. 7 to 10C. Note that a rotational direction of the rotor is directed from the left to the right in the drawing. According to this embodiment, twelve slots 237 are arranged for two poles, that is, at an electric angle of 360°. For example, the slot conductors 233a of the slot numbers 01 to 12 in FIG. 11 correspond to two poles. For this reason, the number of slots per pole N is "6," and the number of slots per pole per phase NSPP is "2" (=6/3). Six slot conductors 233a of the stator winding 238 are inserted into each slot 237.

While each slot conductor 233a is illustrated as a rectangular shape, the reference signs U11 to U26, V, and W inside the rectangle refer to the U-phase, V-phase, and W-phase, respectively, a cross mark "x" denotes a direction from the lead wire side to the opposite side, and a black circle mark "●" denotes a direction opposite thereto. In addition, the slot conductor 233a positioned in the innermost circumference side of the slot 237 (in the slot opening side) will be referred to as the layer 1, and the slot conductors 233a will be referred to as the layers 2, 3, 4, 5, an 6 in order toward the outer circumference side (in the slot bottom side). Furthermore, the reference numerals 01 to 12 denote the slot numbers as in FIGS. 7 to 10C. Note that only the slot conductors 233a of the U-phase are denoted by reference signs "U11 to U26" that represent the winding coils, and the slot conductors 233a of the V-phase and the W-phase are denoted by reference signs "V" and "W" that represent the phases.

In FIG. 11, all of twelve slot conductors 233a surrounded by the dashed line 234 belong to the slot conductor group 234 consisting of the U-phase slot conductors 233a. Hereinafter, a specific example will be described. For example, the slot conductor group 234 in the center includes the slot conductors 233a of the winding coils U25 and U26 arranged in the layer 6 of the slot numbers 06 and 07, the slot conductors 233a of the winding coils U12, U11, U23, U24, U14, U13, U21, and U22 arranged from the layer 5 to the layer 2 of the slot numbers 05 and 06, and the slot conductors 233a of the winding coils U16 and U15 arranged in the layer 1 of the slot numbers 04 and 05.

Figure 12:
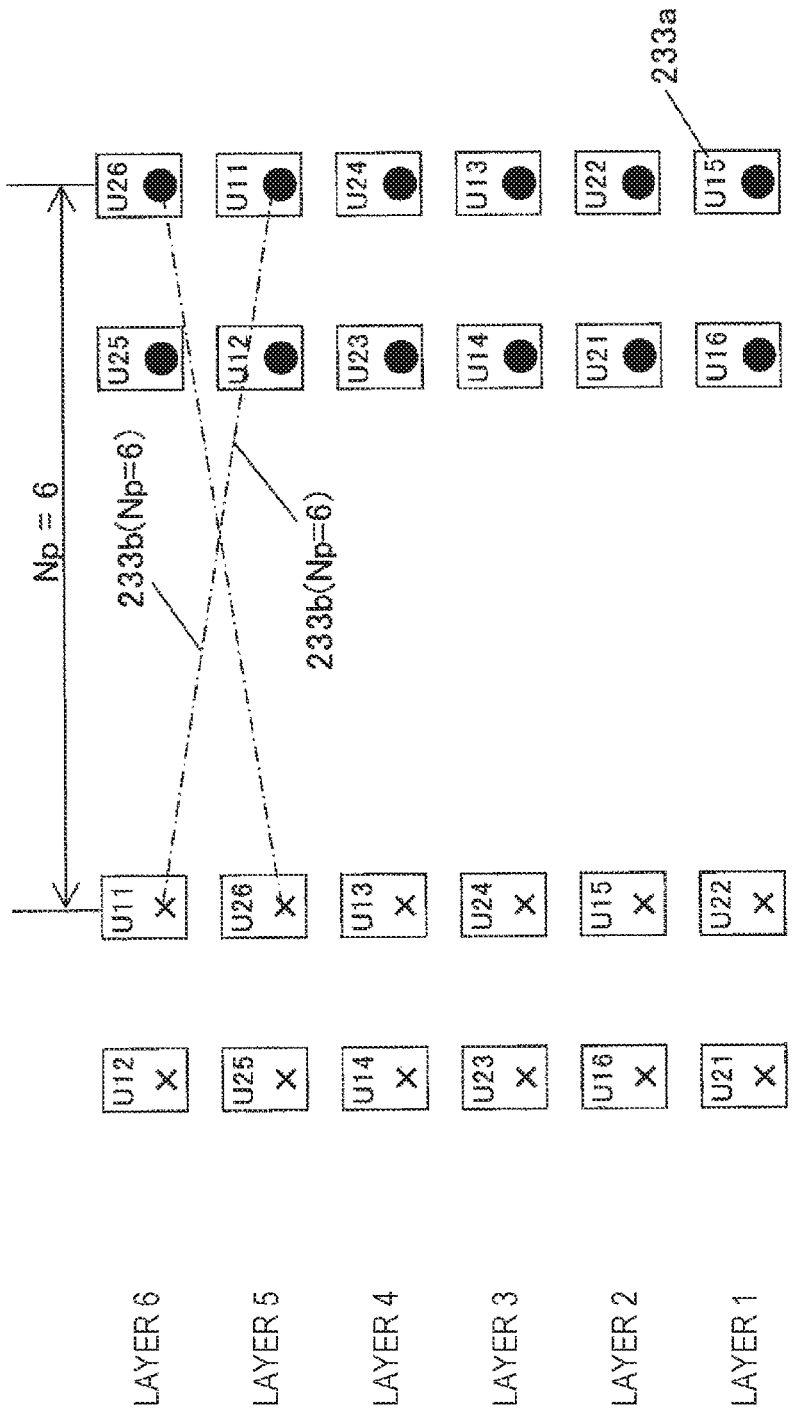
FIG. 12 is a schematic diagram illustrating a layout of general slot conductors (Comparative Example 1).

In general, if the number of slots per pole N is set to "6," the number of slots per pole per phase NSPP is set to "2," and the number of the layers of the slot conductors 233a in the slot 237 is set to "6," a configuration of arranging the U-phase slot conductors 233a is employed in many cases as illustrated in FIG. 12 (this similarly applies to the V-phase and the W-phase). In this case, an interval between the left slot conductor group and the right slot conductor group in the drawing becomes a slot pitch of "6" (Np=6), that is, the normal slot pitch when the number of slots per pole N is set to "6." Meanwhile, the winding coils of the same phase are arranged not to deviate in the circumferential direction of the stator core 232.

Figure 13:
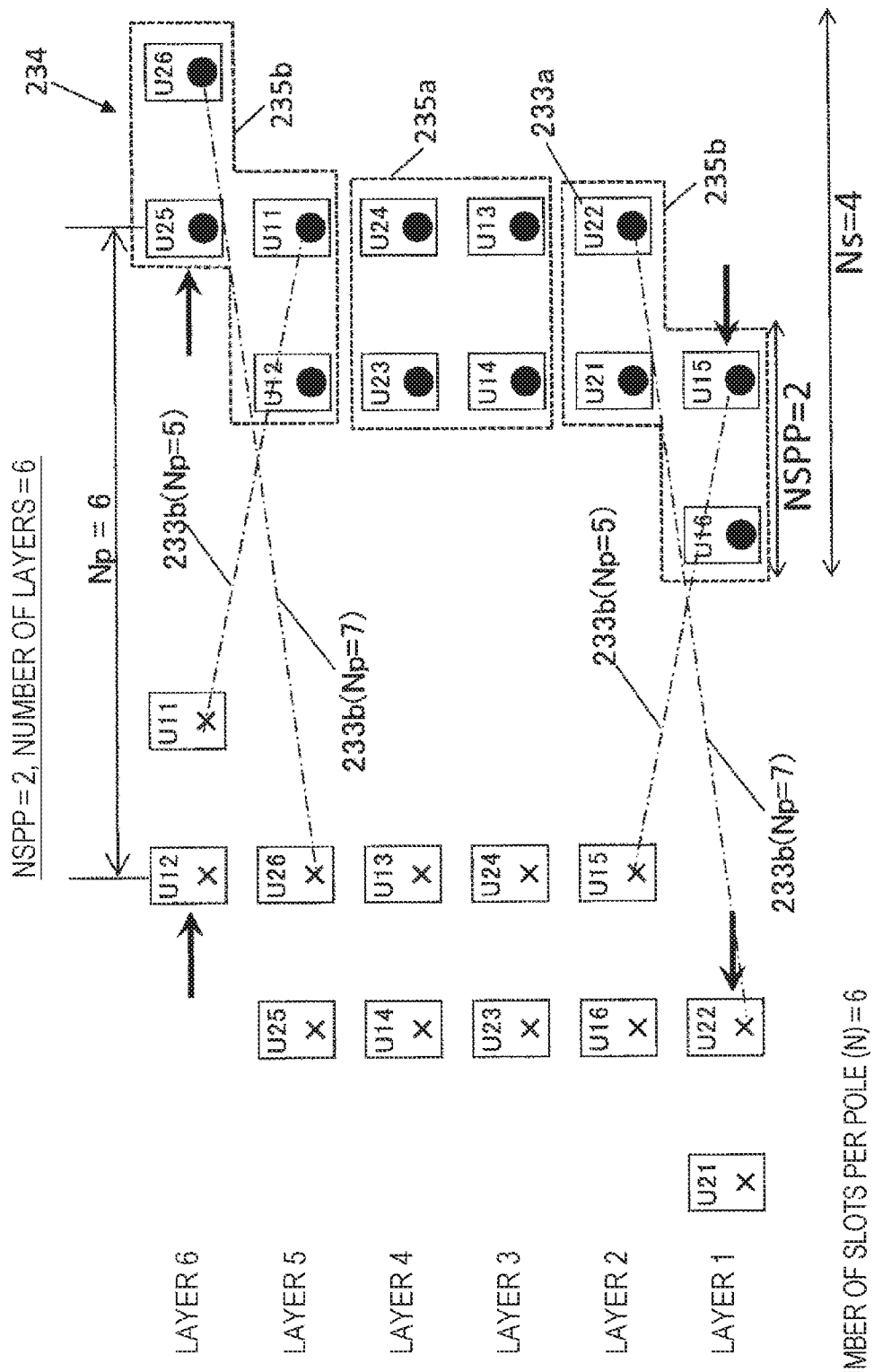
FIG. 13 is a schematic diagram illustrating a layout of a slot conductor 233a according to the first embodiment.

Meanwhile, in the configuration according to this embodiment, as illustrated in FIG. 13, two slot conductors 233a of the layer 1 of FIG. 12 are deviated by a single slot pitch oppositely to the rotational direction of the rotor (in the left direction of the drawing), and two slot conductors 233a of the layer 6 are deviated by a single slot pitch in the rotational direction (in the right direction of the drawing). For this reason, as illustrated in FIG. 13, a striding span of the jumper conductor 233b used to connect the slot conductors 233a of the winding coils U11 of the layers 6 and 5 becomes a slot pitch of "5" (Np=5), and a striding span of the jumper conductor 233b used to connect the winding coils U26 of the layers 5 and 6 becomes a slot pitch of "7" (Np=7). In addition, a striding span of the jumper conductor 233b used to connect the slot conductors 233a of the winding coils U15 of the layers 2 and 1 becomes a slot pitch of "5" (Np=5), and a striding span of the jumper conductor 233b used to connect the winding coils U22 of the layers 1 and 2 becomes a slot pitch of "7" (Np=7). Similarly, the winding coils U12, U25, U16, and U21 are also winding coils having an irregular slot pitch in which the slot conductors 233a are connected by striding slots with a slot pitch of "7" (Np=7) in one coil end and with a slot pitch of "5" in the other coil end.

In this case, each slot conductor 233a corresponding to the V-phase and the W-phase as well as the U-phase is deviated similarly by a single slot pitch. Therefore, as illustrated in FIG. 11, slot conductor groups 234 having the same shape are formed for each of the U-phase, the V-phase, and the W-phase. That is, a slot conductor group consisting of the U-phase slot conductors 233a indicated by the cross marks, a slot conductor group consisting of the W-phase slot conductors 233a indicated by the black circle marks, a slot conductor group consisting of the V-phase slot conductors 233a indicated by the cross marks, a slot conductor group consisting of the U-phase slot conductors 233a indicated by the black circle marks, a slot conductor group consisting of the W-phase slot conductors 233a indicated by the cross marks, and a slot conductor group consisting of the V-phase slot conductors 233a indicated by the black circle marks are arranged in order in the rotational direction of the rotor.

According to this embodiment, as illustrated in FIG. 11, assuming that the number of slots per pole is set to "N(=6)," the winding coils includes a winding coil having an irregular slot pitch in which the slot conductors 233a are connected such that the jumper conductor 233b strides slots with a slot pitch "Np=N+1 (=7)" in one of the coil ends and strides slots with a slot pitch "Np=N−1 (=5)" in the other coil end, and a winding coil having a normal slot pitch in which the slot conductors 233a are connected such that the jumper conductor 233b strides slots with a slot pitch "Np=N(=6)" in both coil ends.

As described above, the stator winding of each phase includes a slot conductor group 234 consisting of a plurality of slot conductors 233a inserted into a predetermined number (Ns) of slots continuously arranged along the circumferential direction of the stator core, and a jumper conductor 233b that connects the coil end sides of a plurality of slot conductors 233a. The slot conductors 233a are inserted into the respective slots 237 such that the slot and the layer are adjacent to each other. The predetermined number of slots Ns is set to "Ns=NSPP+NL2," where "NSPP" denotes the number of slots per pole per phase, and the number of layers relating to the winding coil having an irregular slot pitch is set to "2×NL2." According to this embodiment, as illustrated in FIG. 13, since the number of slots per pole per phase is set to "NSPP=2," and the number of layers is set to "NL2=2," the number of slots becomes "Ns=4."

Note that, for convenient description purposes, the number of layers of the winding coil having a normal slot pitch is defined as "2×NL1." As a result, the number of overall layers becomes "2×(NL1+NL2)." According to this embodiment, since NL1=1, and NL2=2, a total number of layers becomes "2×(1+2)=6." Therefore, it is recognized that this number is equal to the number of layers of the slots 237 (that is, "6" for the layers 1 to 6).

The slot conductor group 234 according to this embodiment will be further described with reference to FIG. 13. The slot conductor group 234 can be divided into slot conductor sub-groups 235 (235a and 235b) as indicated by the dashed lines in FIG. 13. The slot conductor sub-group 235 includes an inner circumferential layer and an outer circumferential layer that neighbor to each other in a radial direction of the stator core 232 and are connected to the jumper conductor 233b.

The slot conductor sub-group 235 provided with the jumper conductor 233b having a normal slot pitch is defined as a first slot conductor sub-group 235a. An inner circumferential layer of the first slot conductor sub-group 235a will be referred to as a first inner circumferential layer, and an outer circumferential layer of the first slot conductor sub-group 235a will be referred to as a first outer circumferential layer. According to this embodiment, the layer 3 (first inner circumferential layer) and the layer 4 (first outer circumferential layer) constitute a single first slot conductor sub-group 235a (NL1=1).

The slot conductor sub-group 235 provided with the jumper conductor 233b having an irregular slot pitch is defined as a second slot conductor sub-group 235b. An inner circumferential layer of the second slot conductor sub-group 235b will be referred to as a second inner circumferential layer, and an outer circumferential layer of the second slot conductor sub-group 235b will be referred to as a second outer circumferential layer. According to this embodiment, the layer 1 (second inner circumferential layer) and the layer 2 (second outer circumferential layer) constitute a single second slot conductor sub-group 235b. In addition, the layer 5 (second inner circumferential layer) and the layer 6 (second outer circumferential layer) constitute another single second slot conductor sub-group 235b. Therefore, as described above, the slot conductor group 234 has a total of two second slot conductor sub-groups 235b (NL2=2).

The slot conductor 233a of the first inner circumferential layer and the slot conductor 233a of the first outer circumferential layer are arranged such that both circumferential ends of the stator core 232 are aligned with each other. That is, specifically, they are arranged as follows. A specific configuration of the first slot conductor sub-group 235a will be described for the first slot conductor sub-group 235a including the layers 3 and 4 in FIG. 13. The left-end slot conductor 233a (U14) out of the slot conductors 233a (U14 and U13) of the first inner circumferential layer (layer 3) is arranged in the same slot as that of the left-end slot conductor 233a (U23) out of the slot conductors 233a (U23 and U24) of the first outer circumferential layer (layer 4). The right-end slot conductors 233a (U13 and U24) are arranged in a similar positional relationship.

The slot conductor 233a of the second inner circumferential layer and the slot conductor 233a of the second outer circumferential layer comply with a rule that they are arranged to deviate from each other by a single slot pitch in the circumferential direction of the stator core. Specifically, they are arranged as follows. A specific configuration of the second slot conductor sub-group 235b including the layers 1 and 2 of FIG. 13 will be described. The left-end slot conductor 233a (U16) out of the slot conductors 233a (U16 and U15) of the second inner circumferential layer (layer 1) and the left-end slot conductor 233a (U21) out of the slot conductors 233a (U21 and U22) of the second outer circumferential layer (layer 2) are arranged to deviate from each other by a single slot pitch. The right-end slot conductors 233a (U15 and U22) are arranged in a similar positional relationship.

The slot conductor sub-groups 235 neighboring in the radial direction of the stator core 232 are arranged such that both circumferential ends of the adjacent stator cores 232 are aligned with each other. This will be referred to as a rule A.

The rule A will be described specifically with reference to FIG. 13. It is recognized that, while the second slot conductor sub-group 235b including the layers 1 and 2 and the first slot conductor sub-group 235a including the layers 3 and 4 are adjacent to each other in a vertical direction (in the radial direction of the stator core 232), they are arranged such that their ends are aligned with each other. That is, the left-end slot conductor 233a (U21) and the left-end slot conductor 233a (U14) are arranged in the same slot. The right-end slot conductors are aligned as in the left-end arrangement. That is, both circumferential ends of the stator core are aligned with each other. The first slot conductor sub-group 235a including the layers 3 and 4 and the second slot conductor sub-group 235b including the layers 5 and 6 are also arranged to follow the rule A. Note that, while the first slot conductor sub-group 235a and the second slot conductor sub-group 235b are adjacent to each other in FIG. 13, the rule A is essentially applied to both a case where the first slot conductor sub-groups 235a are adjacent to each other and a case where the second slot conductor sub-groups 235b are adjacent to each other. If a plurality of slot conductor sub-groups 235 comply with this rule A, the aforementioned relationship "Ns=NSPP+NL2" is satisfied.

Here, functional effects of the rotary electric machine according to this embodiment illustrated in FIG. 11 or the like will be described in comparison with the functional effects of the rotary electric machine obtained by using the winding method of FIG. 12 (hereinafter, referred to as Comparative Example 1) and the functional effects of the rotary electric machine obtained by using the winding method of FIG. 22(a) described in PTL 1 (Japanese Unexamined Patent Application No. 2012-29370) (hereinafter, referred to as Comparative Example 2). Note that, in Comparative Example 2, a deviating direction of the slot conductors of the winding coil relating to the irregular slot pitch is reversed to that of the rotary electric machine of this embodiment. However, this relationship depends on definition, and the deviating direction may also be the same in both cases.

FIGS. 14 to 17 illustrate the functional effects of the rotary electric machine according to this embodiment in comparison with the functional effects of Comparative Example 1.

Figure 14:
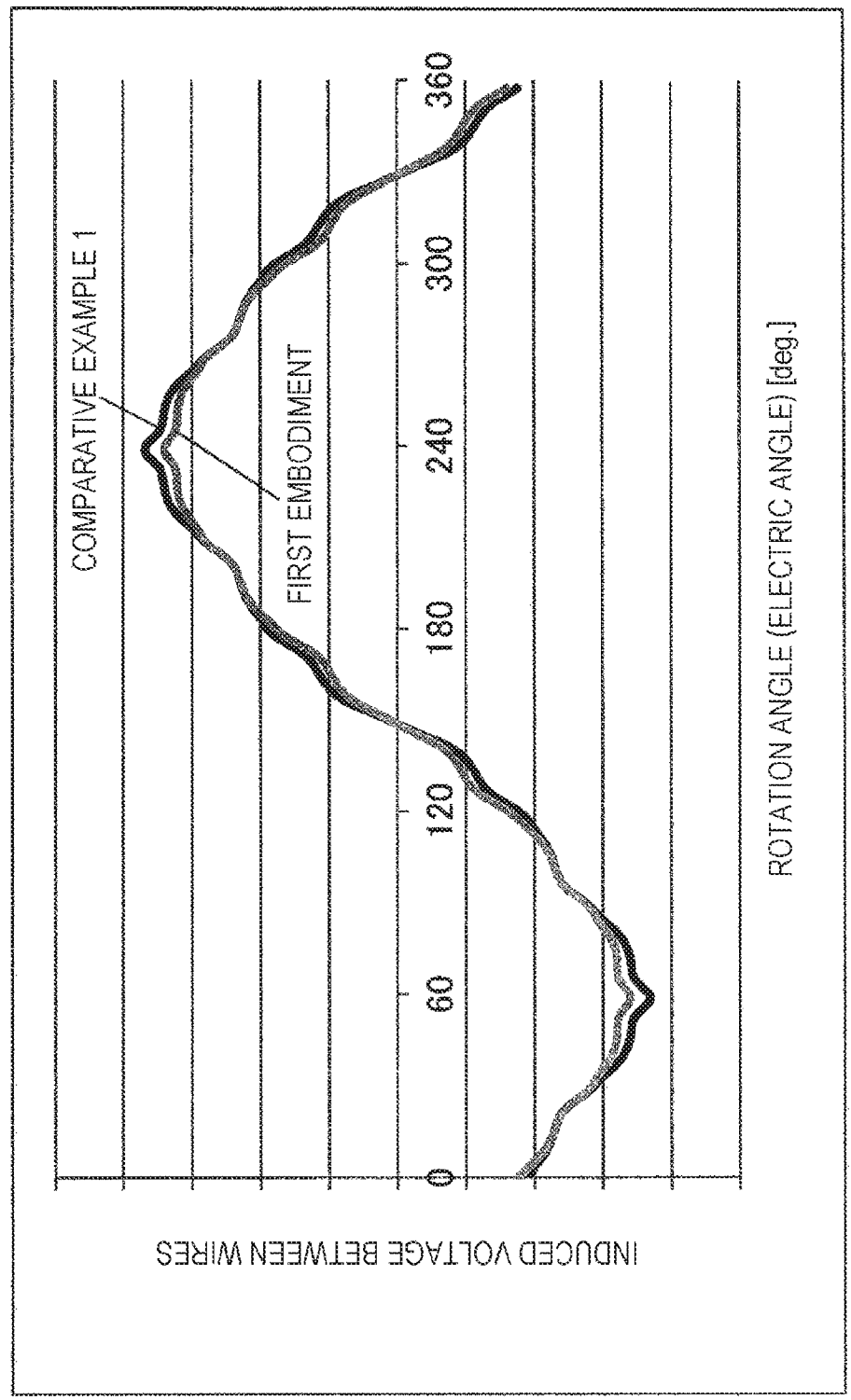
FIG. 14 is a diagram illustrating induced voltage waveforms of Comparative Example 1 and the first embodiment.
Figure 15:
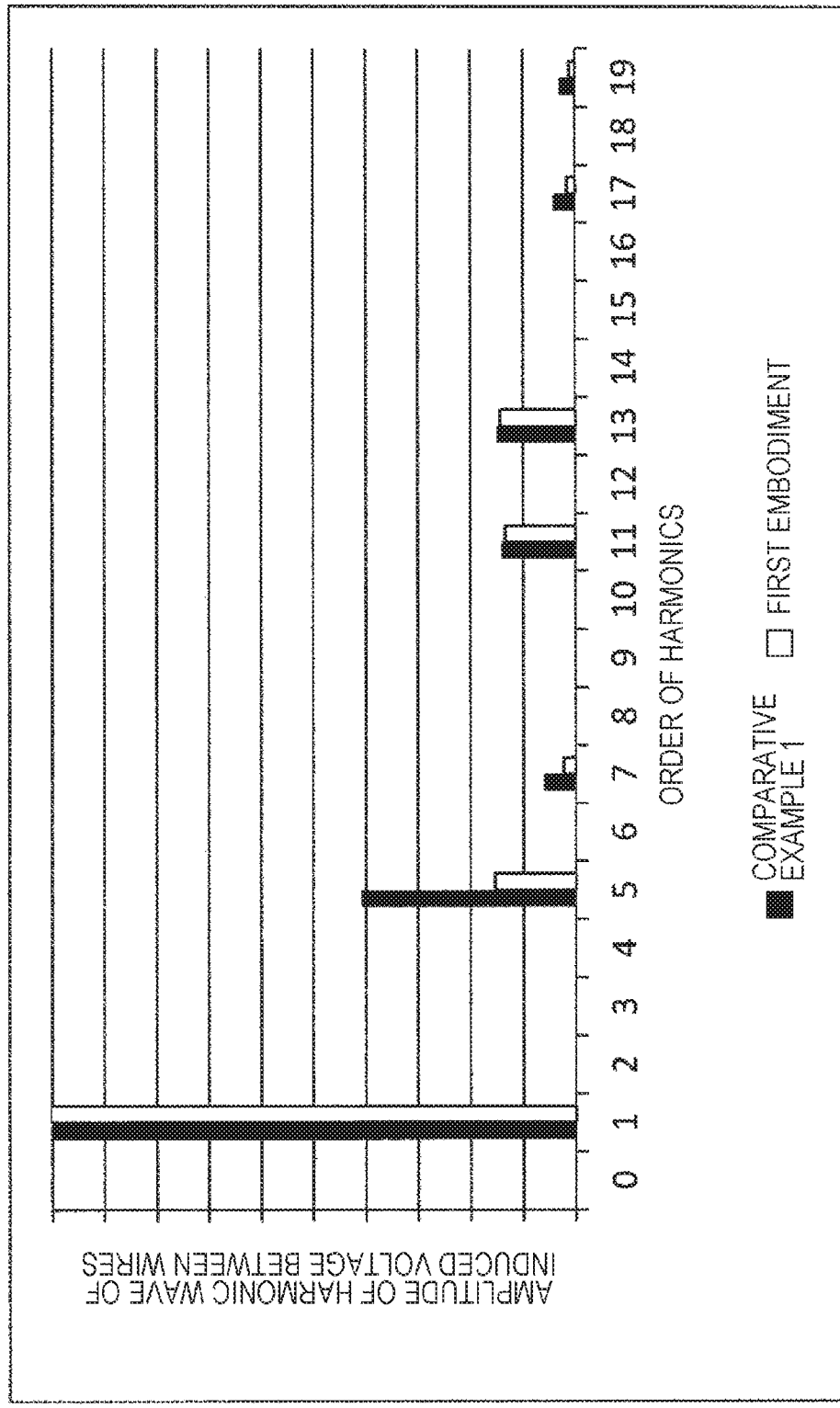
FIG. 15 is a diagram illustrating a harmonic analysis result for the induced voltage waveforms of the first embodiment and Comparative Example 1.

FIG. 14 is a diagram illustrating an induced voltage waveform of the rotary electric machine according to this embodiment and an induced voltage waveform of the rotary electric machine of Comparative Example 1. In addition, FIG. 15 illustrates a harmonic analysis result for each induced voltage waveform of FIG. 14.

As illustrated in FIG. 14, it is recognized that the induced voltage waveform of the rotary electric machine according to this embodiment is close to a sinusoidal wave, compared to the induced voltage waveform of the rotary electric machine of Comparative Example 1. In addition, as illustrated in the harmonic analysis result of FIG. 15, it is recognized that, according to this embodiment, it is possible to reduce, particularly, the fifth and seventh harmonic components, compared to Comparative Example 1.

Figure 16:
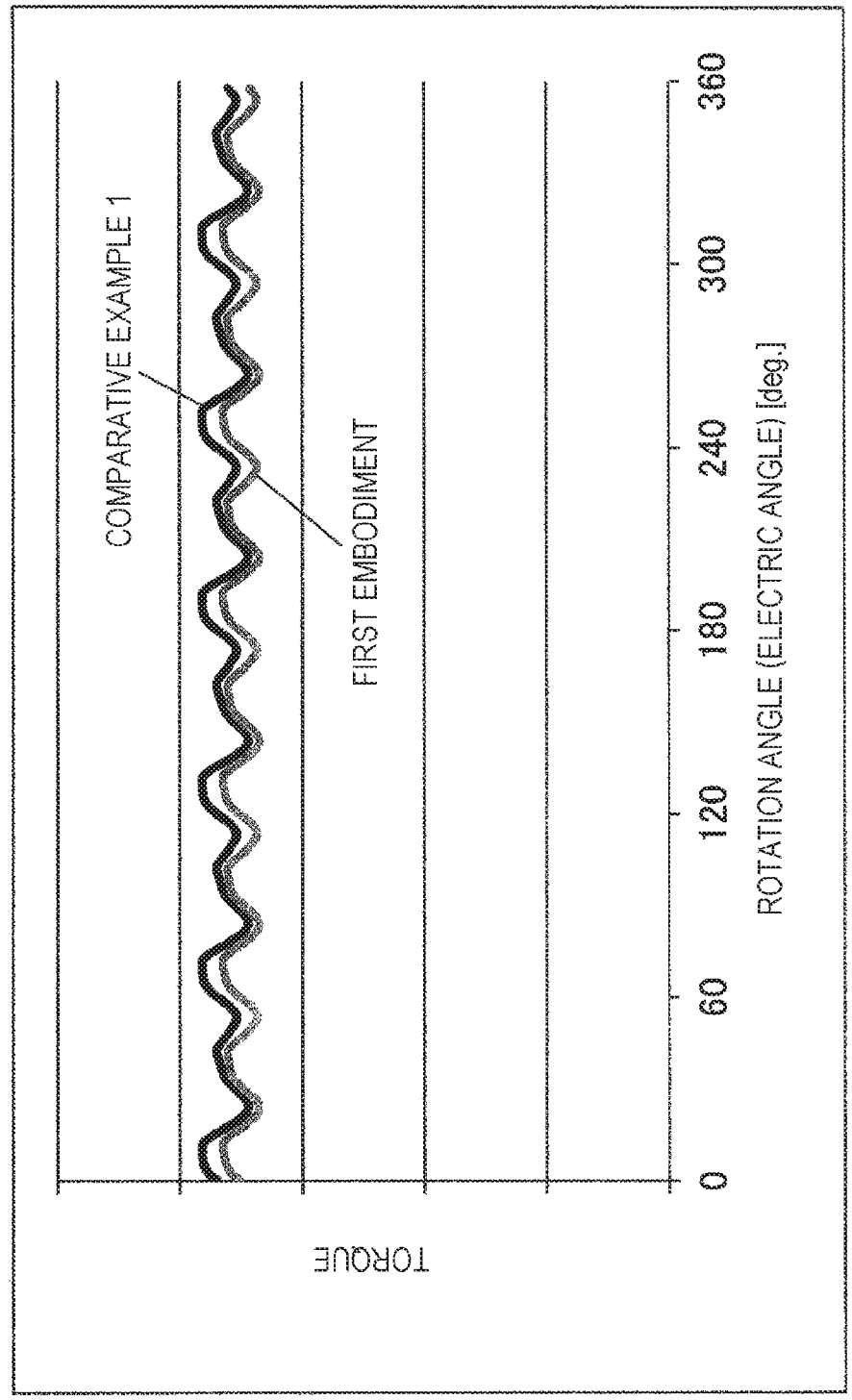
FIG. 16 is a diagram illustrating torque waveforms of the first embodiment and Comparative Example 1.
Figure 17:
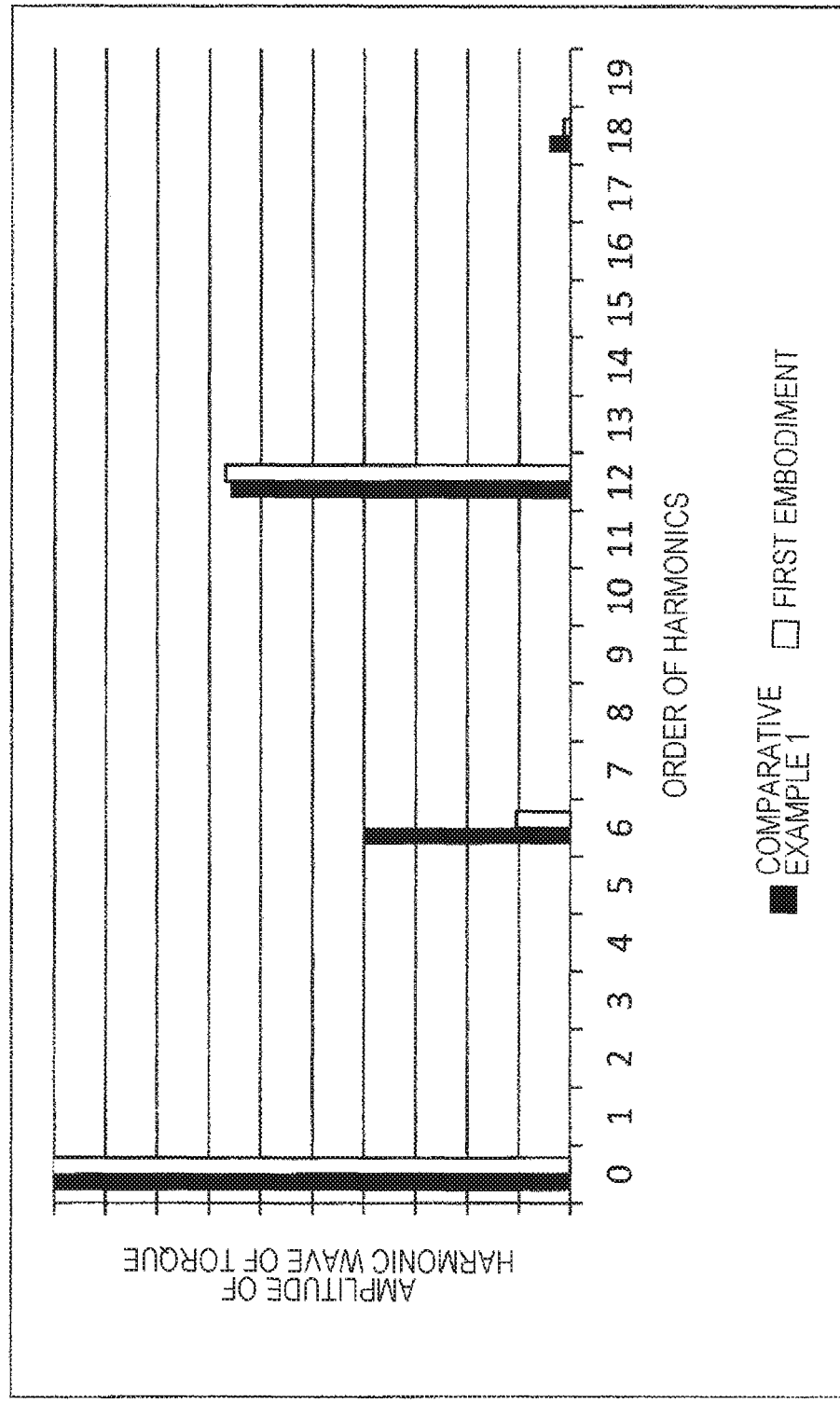
FIG. 17 is a diagram illustrating a harmonic analysis result for the torque waveforms of the first embodiment and Comparative Example 1.

FIG. 16 illustrates torque waveforms of the rotary electric machine according to this embodiment and the rotary electric machine of Comparative Example 1 when an AC current flows. In addition, FIG. 17 illustrates a harmonic analysis result of each torque waveform of FIG. 16. As illustrated in the harmonic analysis result of FIG. 17, it is recognized that, particularly, a torque ripple in the sixth harmonic component can be reduced. This means that the induced voltage, that is, the fifth and seventh components of the crossing magnetic flux are reduced by arranging the coils as illustrated in FIGS. 7 to 11.

Figure 18:
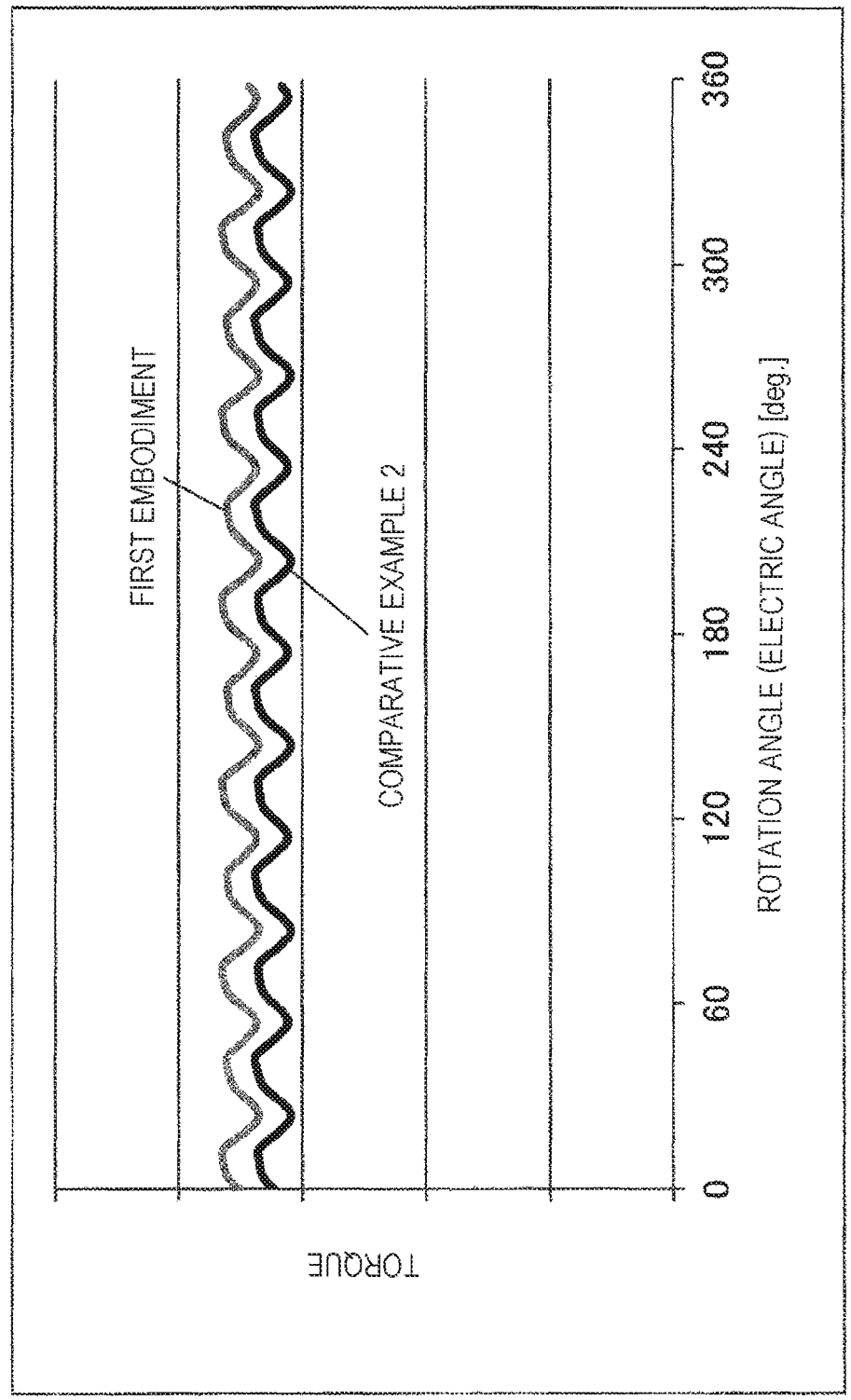
FIG. 18 is a diagram illustrating torque waveforms of the first embodiment and Comparative Example 2.
Figure 19:
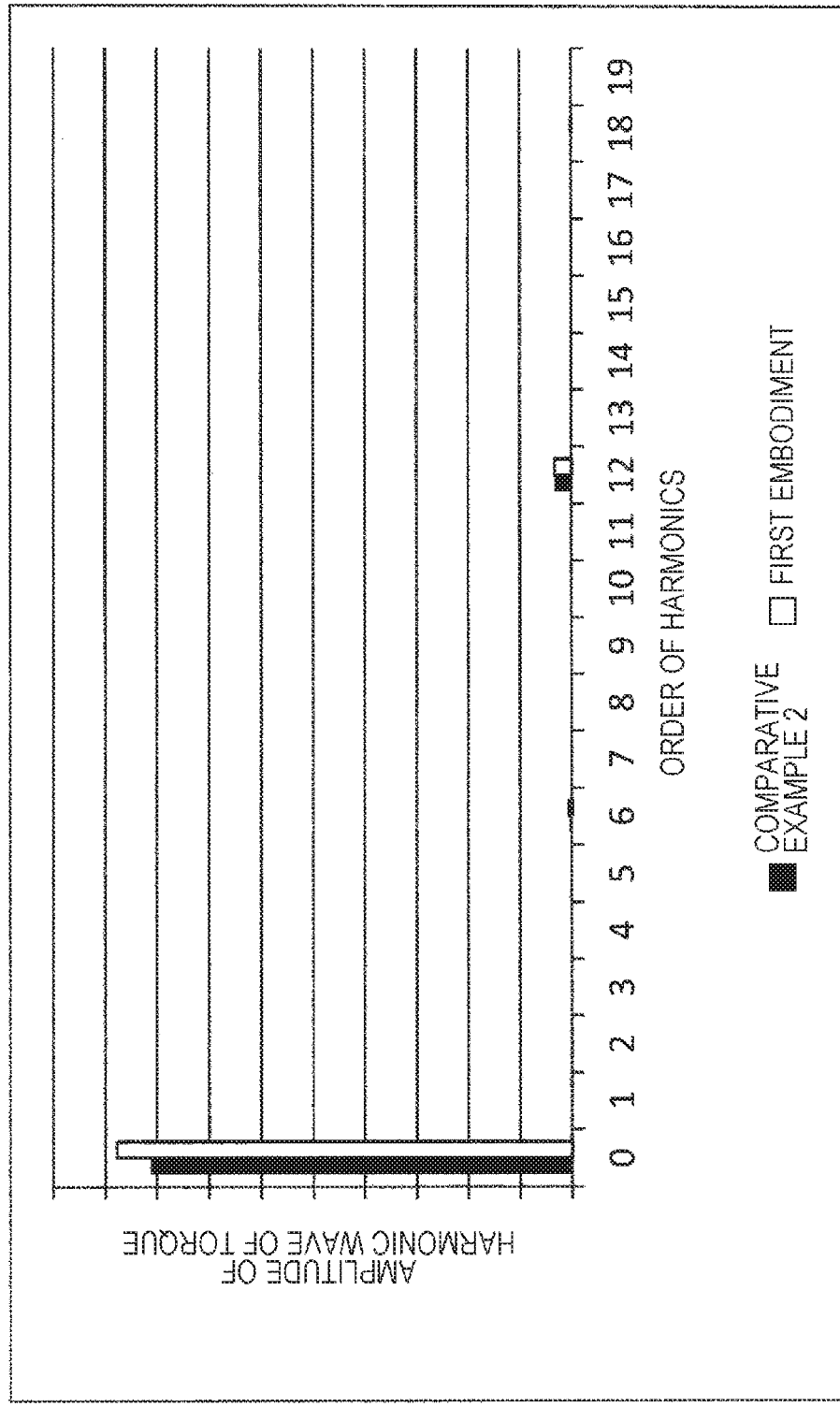
FIG. 19 is a diagram illustrating a harmonic analysis result for the torque waveforms of the first embodiment and Comparative Example 2.

FIGS. 18 and 19 illustrate the functional effects of this embodiment in comparison with the functional effects of Comparative Example 2.

FIG. 18 illustrates torque waveforms of the rotary electric machine according to this embodiment and the rotary electric machine of Comparative Example 2 when an AC current flows. In addition, FIG. 19 illustrates a harmonic analysis result of each torque waveform of FIG. 18. As illustrated in FIGS. 18 and 19, it is recognized that, according to this embodiment, an average torque is higher than that of Comparative Example 2.

As described above in relation to the functional effects, according to this embodiment, it is possible to obtain a rotary electric machine having a smaller torque ripple and a lower noise relative to Comparative Example 1 and a higher average torque relative to Comparative Example 2. In this sense, using the rotary electric machine according to this embodiment, it is possible to obtain a high-torque low-noise rotary electric machine. Furthermore, a vehicle provided with such a rotary electric machine can provide a high torque and a low noise.

The rotary electric machine according to the first embodiment has the following configurations and the following functional effects.

(1) The stator winding of each phase of the rotary electric machine 200 includes a plurality of slot conductors 233a inserted into a plurality of slots 237 and a jumper conductor 233b that connects both ends of the slot conductors 233a in the coil end 241 (this similarly applies to the rotary electric machine 202). In addition, as illustrated in FIGS. 9, 10, and the like, the slot conductors 233a inserted into the layers 1, 2, 5, and 6 of the slots 237 are connected to each other with the jumper conductor 233b having an irregular slot pitch. Furthermore, as illustrated in FIGS. 9, 10, and the like, the slot conductors 233a inserted into the layers 3 and 4 of the slots 237 are connected to each other with the jumper conductor 233b having a normal slot pitch.

The jumper conductor 233b having a normal slot pitch (first jumper conductor) connects the slot conductors 233a such that, assuming that the number of slots per pole is set to "N(=6)", the jumper conductor 233b strides the slots 237 with a slot pitch "Np=N(=6)" in one of the coil ends 241, and strides the slots 237 with a slot pitch "Np=N(=6)" in the other coil end 241.

Assuming that the number of slots per pole is set to "N(=6)," the jumper conductor 233b having an irregular slot pitch (second jumper conductor) connects the slot conductors 233a to each other by striding the slots 237 with a slot pitch "Np=N+1 (=7)" in one of the coil ends 241 and striding the slots 237 with a slot pitch "Np=N−1 (=5)" in the other coil end 241.

The stator winding 238 has a plurality of slot conductor groups 234 consisting of a plurality of slot conductors 233a having the same phase.

As a result, according to this embodiment, it is possible to obtain a high-torque low-noise rotary electric machine. In addition, a vehicle provided with such a rotary electric machine can provide a high torque and a low noise.

(2) Furthermore, specifically, the following configuration may be possible. Specifically, a plurality of slot conductors 233a of the slot conductor group 234 are inserted into a predetermined number "Ns (=4)" of slots 237 arranged continuously in the circumferential direction of the stator core 232 such that the slot 237 and the layer are adjacent to each other.

The predetermined number "Ns (=4)" is set to "Ns=NSPP+NL2 (=4)," where "NSPP (=2)" denotes the number of slots per pole per phase, and the number of layers relating to the second winding coil having the jumper conductor 233b having an irregular slot pitch is set to "2×NL2 (NL2=2)."

For example, using the specific configuration (2) described above, according to this embodiment, it is possible to obtain a high-torque low-noise rotary electric machine. In addition, a vehicle provided with such a rotary electric machine can provide a high torque and a low noise.

(3) A specific configuration of the slot conductor group 234 is as follows.

The slot conductor group 234 includes a plurality of slot conductor sub-groups 235. The slot conductor sub-groups 235 neighboring in the radial direction of the stator core 232 are arranged such that both circumferential ends of the stator cores 232 of the adjacent side are aligned with each other.

The slot conductor group 234 has, as the slot conductor sub-group 235, "NL1 (=1)" first slot conductor sub-groups 235a consisting of the first inner circumferential layer and the first outer circumferential layer that neighbor to each other in the radial direction of the stator core 232 and are connected to the jumper conductor 233b having a normal slot pitch (first jumper conductor). That is, the layer 3 (first inner circumferential layer) and the layer 4 (first outer circumferential layer) constitute a single first slot conductor sub-group 235a.

The slot conductor group 234 has, as the slot conductor sub-group 235, "NL2 (=2)" second slot conductor sub-groups 235b consisting of the second inner circumferential layer and the second outer circumferential layer that neighbor to each other in the radial direction of the stator core 232 and are connected to the jumper conductor 233b having an irregular slot pitch (second jumper conductor). That is, the layer 1 (second inner circumferential layer) and the layer 2 (second outer circumferential layer) constitute a single second slot conductor sub-group 235b. In addition, the layer 5 (second inner circumferential layer) and the layer 6 (second outer circumferential layer) constitute another single second slot conductor sub-group 235b. Therefore, as described above, the slot conductor group 234 has a total of two second slot conductor sub-groups 235b.

The slot conductor 233a of the first inner circumferential layer and the slot conductor 233a of the first outer circumferential layer are arranged such that both circumferential ends of the stator core 232 are aligned with each other.

The slot conductor 233a of the second inner circumferential layer and the slot conductor 233a of the second outer circumferential layer are arranged to deviate from each other by a single slot pitch in the circumferential direction of the stator core.

In the specific configuration (3) described above, according to this embodiment, it is possible to obtain a high-torque low-noise rotary electric machine. In addition, a vehicle provided with such a rotary electric machine can provide a high torque and a low noise.

Modifications of First Embodiment

Figure 20:
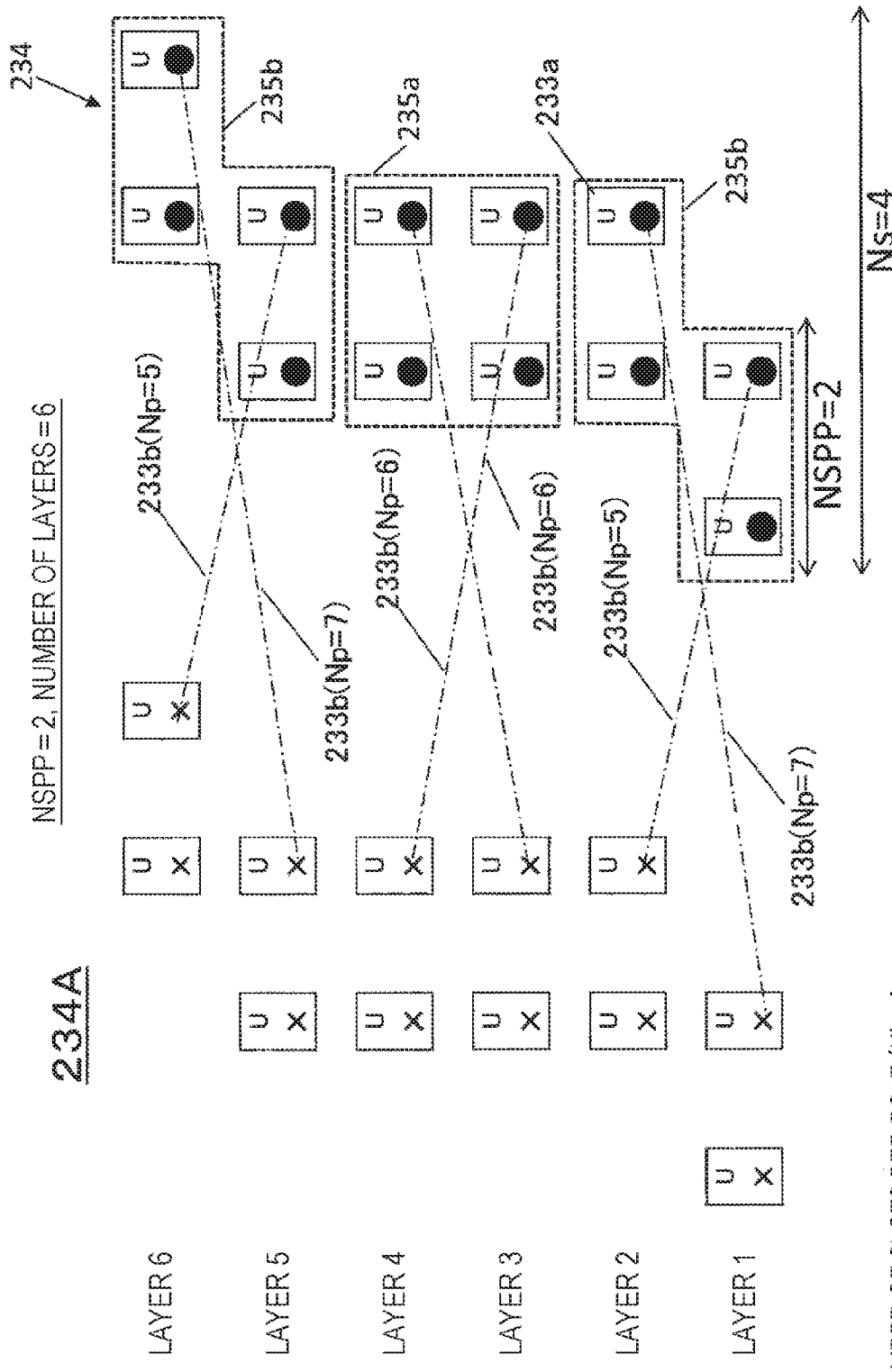
FIG. 20 is a schematic diagram illustrating a layout of the slot conductor 233a according to the first embodiment.

FIG. 20 is a diagram illustrating a slot conductor group 234 (234A) of the rotary electric machine of the first embodiment, which is similar to FIG. 13. The first embodiment may be modified as described below by way of example. A modification of the first embodiment will be described with reference to FIG. 20.

<Modification 1>

Figure 21:
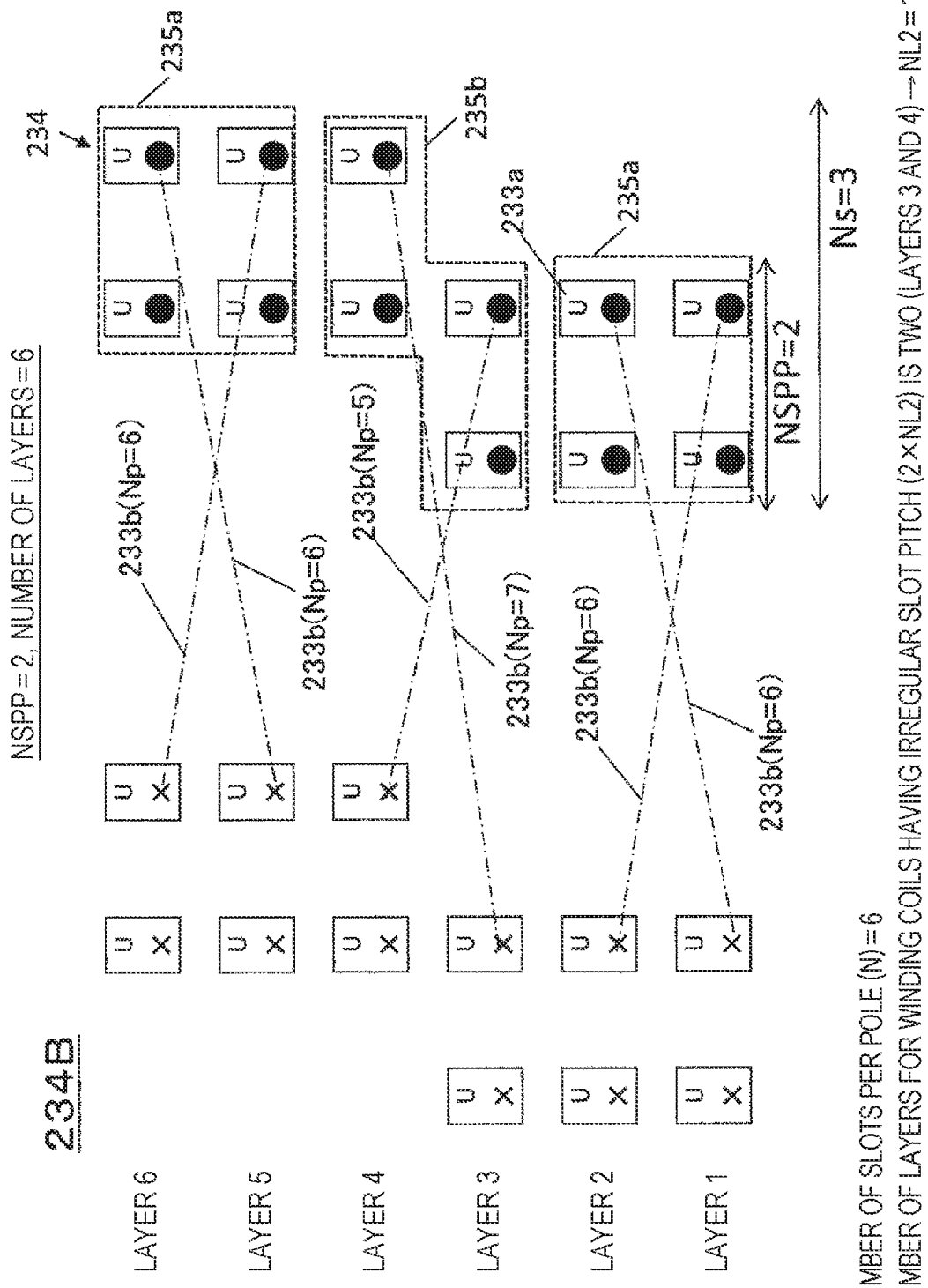
FIG. 21 is a schematic diagram illustrating a layout of the slot conductor 233a according to a modification (Modification 1) of the first embodiment.

FIG. 21 is a diagram illustrating a slot conductor group 234 (234B) of a rotary electric machine according to Modification 1. Similar to the first embodiment (FIG. 20), in Modification 1, the number of slots per pole is set to "N=6," the number of slots per phase per pole is set to "NSPP=2," and the number layers is set to "6." However, Modification 1 is different from the first embodiment in that the layers 3 and 4 are winding coils having an irregular slot pitch (NL2=1), and the layers 1, 2, 5, and 6 are winding coils having a normal slot pitch.

In this modification, in accordance with the rule A described above, the slot conductor sub-groups 235 neighboring in the radial direction of the stator core 232 are arranged such that both circumferential ends of the stator core 232 of the adjacent side are aligned with each other. For this reason, since a predetermined number (Ns=3) of slots are continuously arranged in the circumferential direction of the stator core, a relationship "Ns=NSPP+NL2" is satisfied similar to the first embodiment. Similar to the first embodiment, even in this modification, it is possible to obtain a smaller torque ripple and a lower noise relative to Comparative Example 1 and a higher average torque relative to Comparative Example 2.

<Modification 2>

Figure 22:
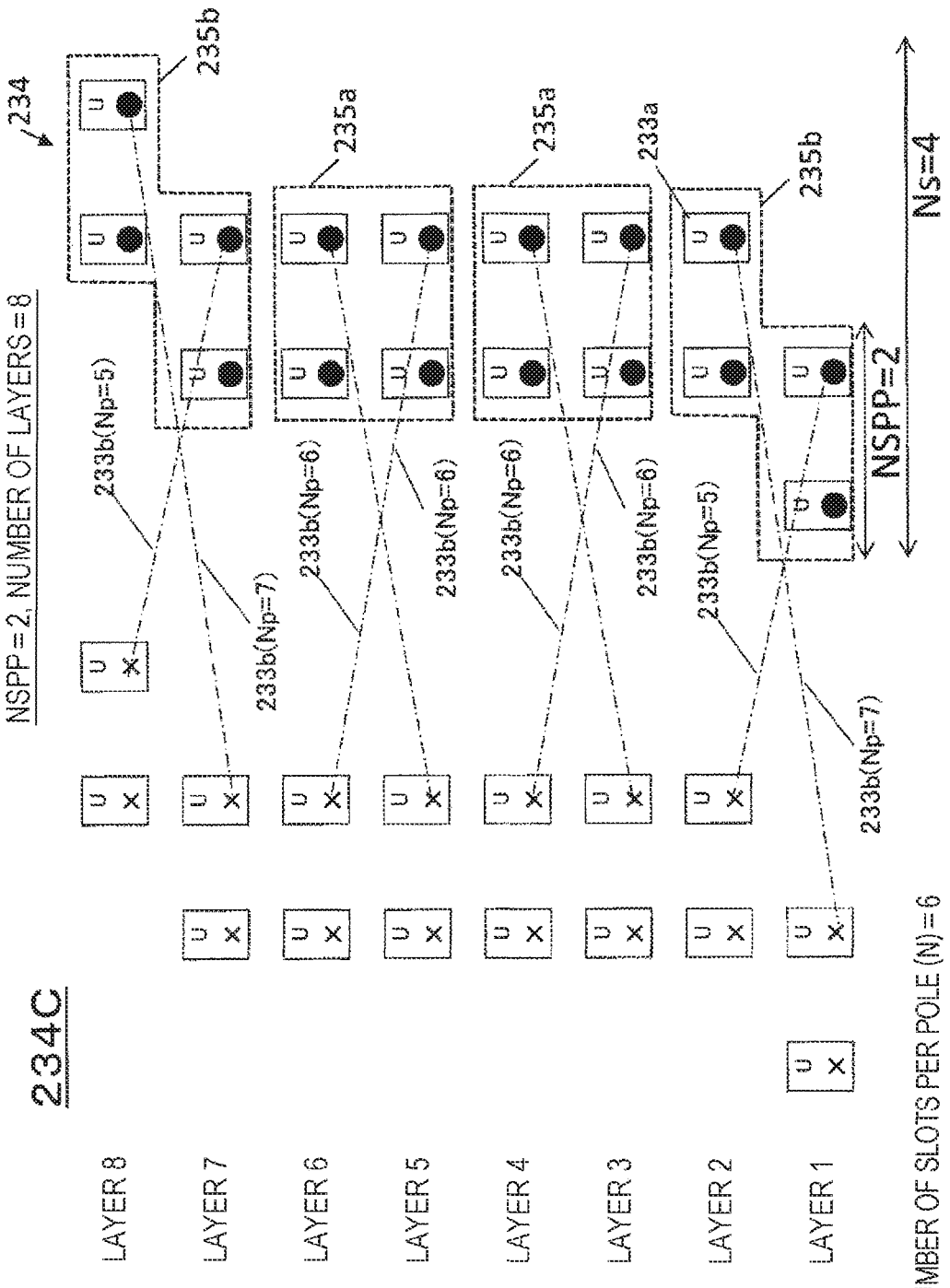
FIG. 22 is a schematic diagram illustrating a layout of the slot conductor 233a according to a modification (Modification 2) of the first embodiment.

FIG. 22 is a diagram illustrating a slot conductor group 234 (234C) of a rotary electric machine according to Modification 2. In Modification 2, the number of slots per pole is set to "N=6," the number of slots per pole per phase is set to "NSPP=2," and the number of layers is set to "8." In Modification 2, the layers 1, 2, 7, and 8 are winding coils having an irregular slot pitch (NL2=2), and the layer 3, 4, 5, and 6 are winding coils having a normal slot pitch. In this modification, in accordance with the rule A, the slot conductor sub-groups 235 neighboring to each other in the radial direction of the stator core 232 are arranged such that both circumferential ends of the stator core 232 of the adjacent side are aligned with each other. For this reason, since a predetermined number (Ns=4) of slots are continuously arranged in the circumferential direction of the stator core, a relationship "Ns=NSPP+NL2" is satisfied similar to the first embodiment. Even in this modification, by setting the number of slots per pole per phase to "NSPP=2" and setting the number of layers to "8," it is possible to obtain a smaller torque ripple and a lower noise relative to the comparative example corresponding to Comparative Example 1. In addition, by setting the number of slots per pole per phase to "NSPP=2" and setting the number of layers to "8," it is possible to obtain a higher average torque relative to the comparative example corresponding to Comparative Example 2.

<Modification 3>

Figure 23:
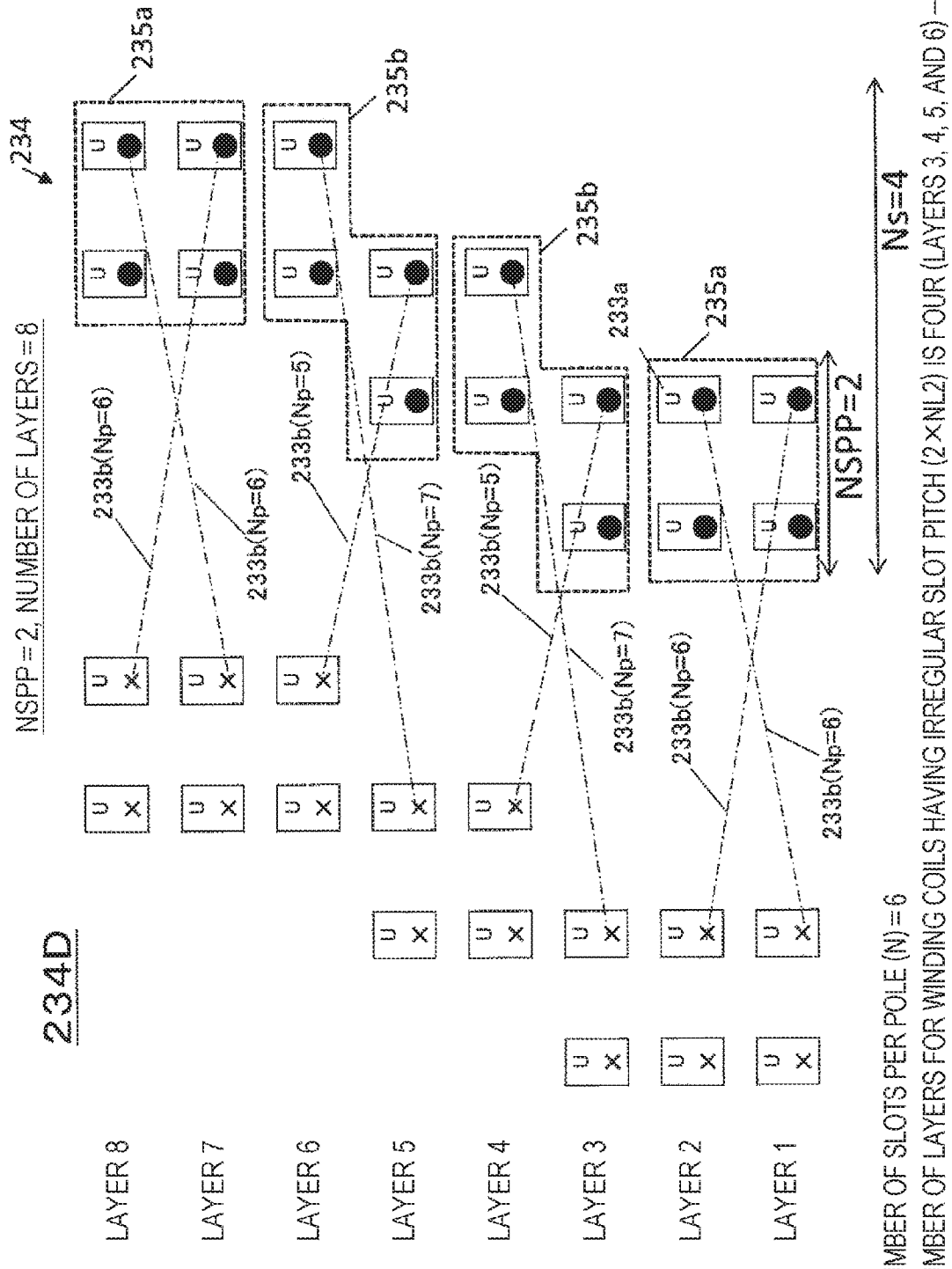
FIG. 23 is a schematic diagram illustrating a layout of the slot conductor 233a according to a modification (Modification 3) of the first embodiment.

FIG. 23 is a diagram illustrating a slot conductor group 234 (234D) of a rotary electric machine according to Modification 3. In Modification 3, the number of slots per pole is set to "N=6," the number of slots per pole per phase is set to "NSPP=2," and the number of layers is set to "8." In Modification 3, the layers 3, 4, 5, and 6 are winding coils having an irregular slot pitch (NL2=2), and the layers 1, 2, 7, and 8 are winding coils having a normal slot pitch. In this modification, in accordance with the rule A described above, the slot conductor sub-groups 235 neighboring to each other in the radial direction of the stator core 232 are arranged such that both circumferential ends of the stator core 232 of the adjacent side are aligned with each other. For this reason, since a predetermined number (Ns=4) of slots are continuously arranged in the circumferential direction of the stator core, a relationship "Ns=NSPP+NL2" is satisfied similar to the first embodiment. Even in this modification, by setting the number of slots per pole per phase to "NSPP=2" and setting the number of layers to "8," it is possible to obtain a smaller torque ripple and a lower noise relative to the comparative example corresponding to Comparative Example 1. In addition, by setting the number of slots per pole per phase to "NSPP=2" and setting the number of layers to "8," it is possible to obtain a higher average torque relative to the comparative example corresponding to Comparative Example 2.

<Modification 4>

Figure 24:
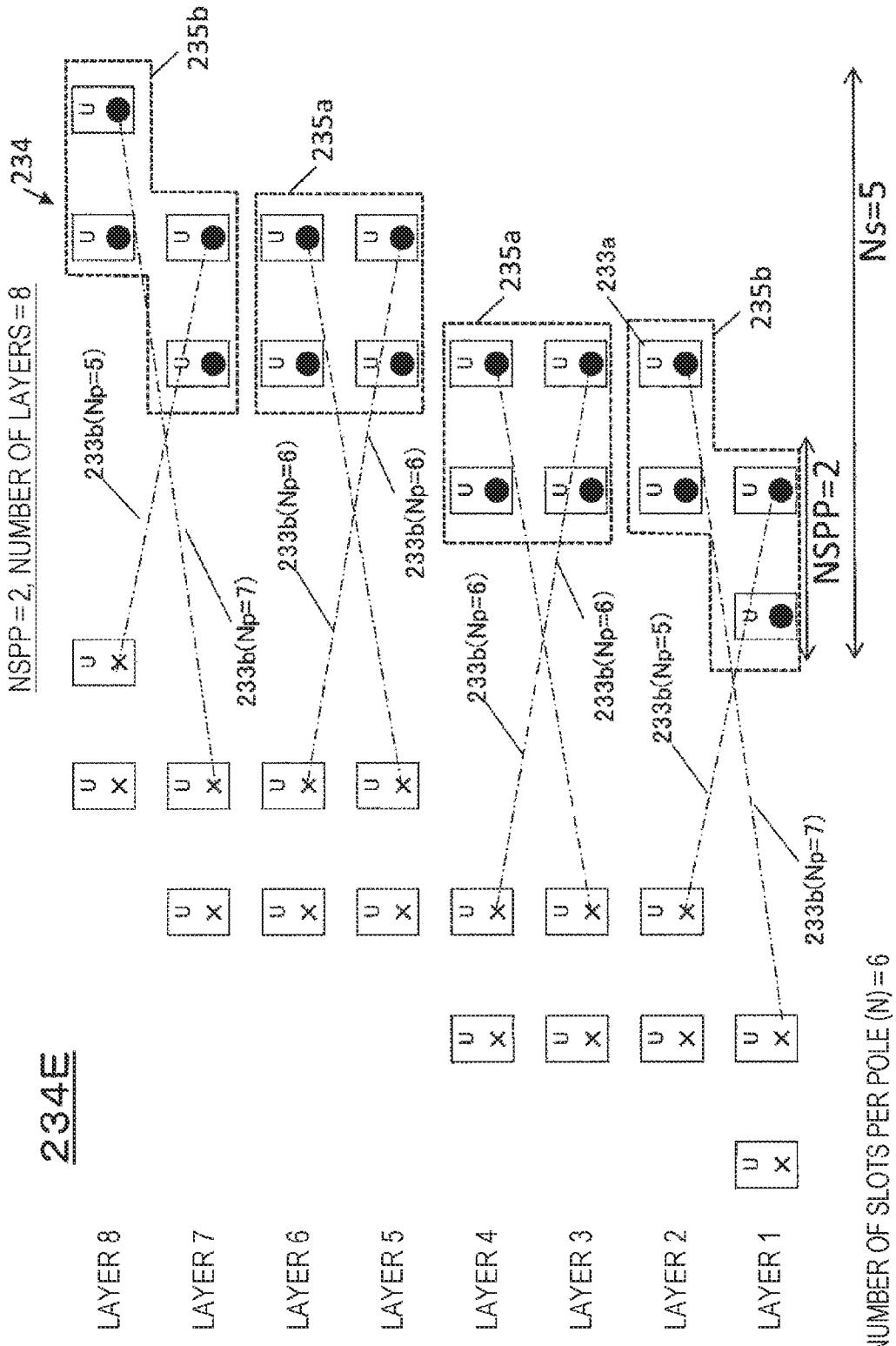
FIG. 24 is a schematic diagram illustrating a layout of the slot conductor 233a according to a modification (Modification 4) of the first embodiment.

FIG. 24 is a diagram illustrating a slot conductor group 234 (234E) of a rotary electric machine according to Modification 4. In Modification 4, the number of slots per pole is set to "N=6," the number of slots per pole per phase is set to "NSPP=2," and the number of layers is set to "8." In Modification 4, the layers 1, 2, 7, and 8 are winding coils having an irregular slot pitch (NL2=2), and the layers 3, 4, 5, and 6 are winding coils having a normal slot pitch. In this modification, the rule A described above is not satisfied. Basically, the slot conductor sub-groups 235 neighboring in the radial direction of the stator core 232 are arranged such that both circumferential ends of the stator core 232 of the adjacent side are aligned with each other. However, there is a deviation of a single slot pitch between the slot conductor sub-group 235 including the layers 3 and 4 and the slot conductor sub-group 235 including the layers 5 and 6. That is, there is a deviation of a single pitch between the layers 4 and 5. For this reason, the aforementioned relationship "Ns=NSPP+NL2" is not satisfied. Instead, another relationship is established as described below. In this modification, a predetermined number (Ns=5) of slots are continuously arranged in the circumferential direction of the stator core. Therefore, a relationship "Ns=NSPP+NL2+1" different from that of the first embodiment is established. Modification 4 is similar to Modification 2. Since the rule A is satisfied in Modification 2, such a deviation is not generated, and the relationship "Ns=NSPP+NL2" is satisfied. Meanwhile, in Modification 4, since there is a deviation of a single slot pitch between the layers 4 and 5, a relationship "Ns=NSPP+NL2+1" different from that of the first embodiment is established. However, even in this modification, by setting the number of slots per pole per phase to "NSPP=2" and setting the number of layers to "8," it is possible to obtain a smaller torque ripple and a lower noise relative to the comparative example corresponding to Comparative Example 1. By setting the number of slots per pole per phase to "NSPP=2" and setting the number of layers to "8," it is possible to obtain a higher average torque relative to the comparative example corresponding to Comparative Example 2.

<Modification 5>

Figure 25:
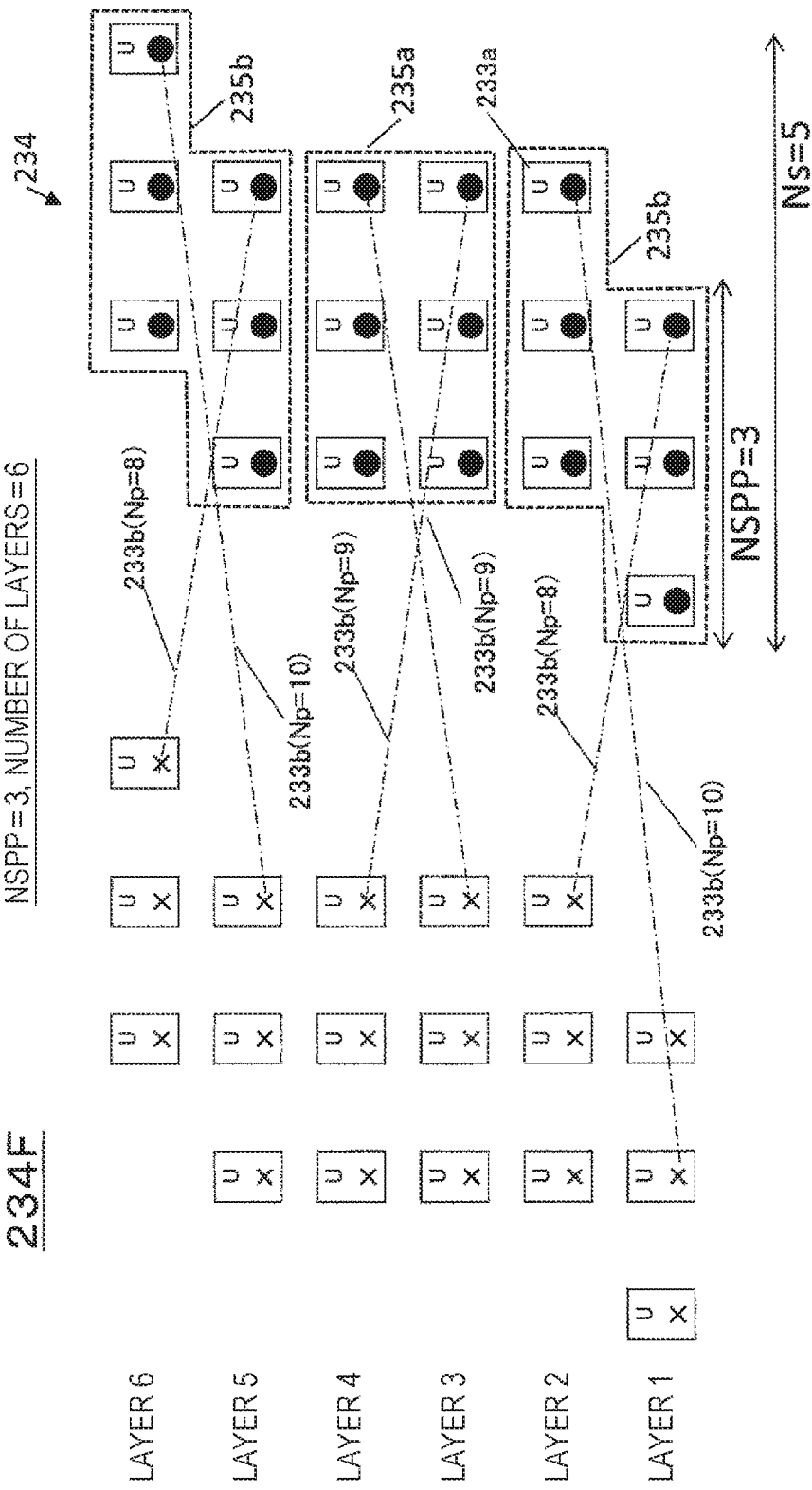
FIG. 25 is a schematic diagram illustrating a layout of the slot conductor 233a according to a modification (Modification 5) of the first embodiment.

FIG. 25 is a diagram illustrating a slot conductor group 234 (234F) of a rotary electric machine according to Modification 5. In Modification 5, the number of slots per pole is set to "N=9," the number of slots per pole per phase is set to "NSPP=3," and the number of layers is set to "6." In Modification 5, the layers 1, 2, 5, and 6 are winding coils having an irregular slot pitch (NL2=2), and the layers 3 and 4 are winding coils having a normal slot pitch. In this modification, in accordance with the rule A described above, the slot conductor sub-groups 235 neighboring in the radial direction of the stator core 232 are arranged such that both circumferential ends of the stator core 232 of the adjacent side are aligned with each other. For this reason, since a predetermined number (Ns=5) of slots are continuously arranged in the circumferential direction of the stator core, the relationship "Ns=NSPP+NL2" is satisfied similar to the first embodiment. Even in this modification, by setting the number of slots per pole per phase to "NSPP=3" and setting the number of layers to "6," it is possible to obtain a smaller torque ripple and a lower noise relative to the comparative example corresponding to Comparative Example 1. By setting the number of slots per pole per phase to "NSPP=3" and setting the number of layers to "6," it is possible to obtain a higher average torque relative to the comparative example corresponding to Comparative Example 2.

<Modification 6>

FIG. 26 is a diagram illustrating a slot conductor group 234 (234G) of a rotary electric machine according to Modification 6. In Modification 6, the number of slots per pole is set to "N=9," the number of slots per pole per phase is set to "NSPP=3," and the number of layers is set to "6." In Modification 6, the layers 3 and 4 are winding coils having an irregular slot pitch (NL2=1), and the layer 1, 2, 5, and 6 are winding coils having a normal slot pitch. In this modification, in accordance with the rule A described above, the slot conductor sub-groups 235 neighboring in the radial direction of the stator core 232 are arranged such that both circumferential ends of the stator core 232 of the adjacent side are aligned with each other. For this reason, since a predetermined number (Ns=4) of slots are continuously arranged in the circumferential direction of the stator core, the relationship "Ns=NSPP+NL2" is satisfied similar to the first embodiment. Even in this modification, by setting the number of slots per pole per phase to "NSPP=3" and setting the number of layers to "6," it is possible to obtain a smaller torque ripple and a lower noise relative to the comparative example corresponding to Comparative Example 1. By setting the number of slots per pole per phase to "NSPP=3" and setting the number of layers to "6," it is possible to obtain a higher average torque relative to the comparative example corresponding to Comparative Example 2.

Second Embodiment

A second embodiment will now be described. In the following description, elements similar to those of the first embodiment (for example, the configurations of FIGS. 1 to 6) will not be described for simplicity purposes.

FIGS. 27(a) to 27(c) and 28(a) to 28(c) are diagrams illustrating a specific connection of the U-phase coil of the stator winding 238. The stator core 232 is provided with forty eight slots 237 (refer to FIG. 4), and the reference numerals 01, 02, . . . , 47, and 48 in FIGS. 27(a) to 27(c) and 28(a) to 28(c) denote the slot numbers.

FIG. 27(a) illustrates winding coils U15 and U16 of a U1-phase winding group. FIG. 27(b) illustrates winding coils U13 and U14 of the U1-phase winding group. FIG. 7(c) illustrates winding coils U11 and 12 of the U1-phase winding group.

Figure 28A:
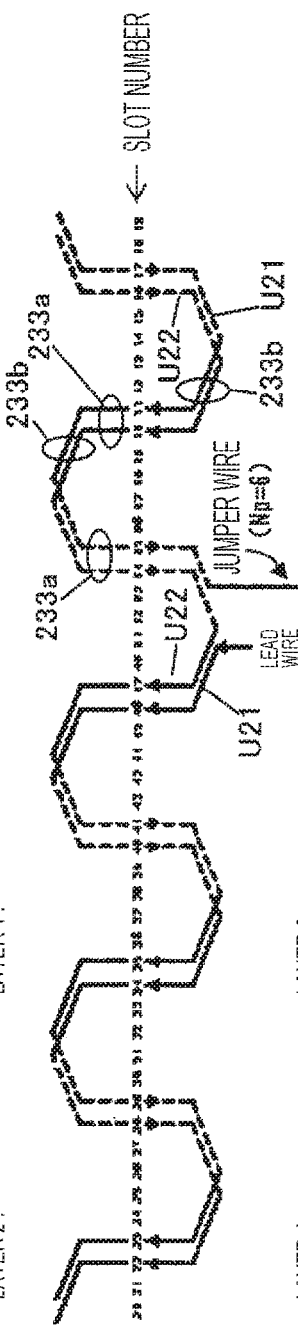
FIGS. 28A to 28C are diagrams illustrating a U2-phase winding group according to the second embodiment.
Figure 28B:
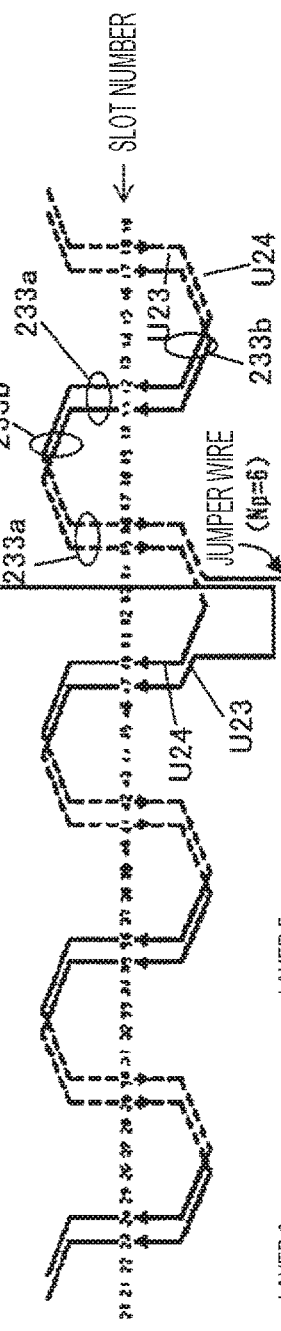
Figure 28C:
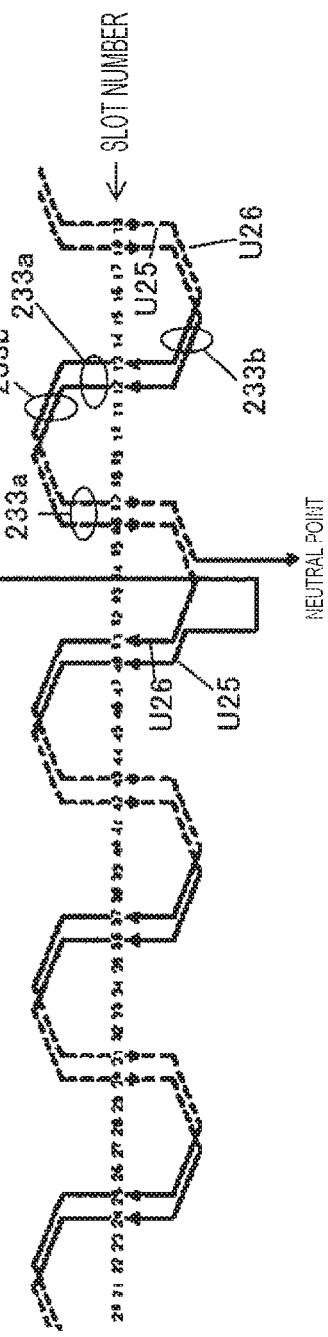

FIG. 28(a) illustrates winding coils U21 and 22 of a U2-phase winding group. FIG. 8(b) illustrates winding coils U23 and U24 of the U2-phase winding group. FIG. 8(c) illustrates winding coils U25 and U26 of the U2-phase winding group.

As illustrated in FIGS. 27(a) to 27(c) and 28(a) to 28(c), each winding coil U11 to U26 includes a slot conductor 233a inserted into a slot and a jumper conductor 233b that connects the same side ends of the slot conductors 233a inserted into different slots to each other to form a coil end 241 (refer to FIG. 5). For example, in the case of the slot conductor 233a inserted into the slot 237 of the slot number 05 illustrated in FIG. 27(a), the upper end in the drawing is connected to the upper end of the slot conductor 233a inserted into the slot 237 of the slot number 47 through the jumper conductor 233b that forms an upper coil end. Reversely, the lower end is connected to the lower end of the slot conductor 233a inserted into the slot 237 of the slot number 11 through the jumper conductor 233b that forms a lower coil end. In this manner, the slot conductors 233a are connected to each other through the jumper conductor 233b to form a wave-wound winding coil.

Similar to the first embodiment, according to this embodiment, six slot conductors 233a are inserted into a single slot side by side from the inner circumference side to the outer circumference side, and they will be referred to as layers 1, 2, 3, 4, 5, and 6 in order from the inner circumference side. In FIGS. 27(a) to 27(c) and FIGS. 28(a) to 28(c), the solid line portions of the winding coils U15, U16, U21, and U22 belong to the layer 1, and the dashed line portions belong to the layer 2. The solid line portions of the winding coils U13, U14, U23, and U24 belong to the layer 3, and the dashed line portions belong to the layer 4. The solid line portions of the winding coils U11, U12, U25, and U26 belong to the layer 5, and the dashed line portions belong to the layer 6.

All of the winding coils U11 to U16 and U21 to U26 of the second embodiment illustrated in FIGS. 27(a) to 27(c) and FIGS. 28(a) to 28(c) are wound in a wave winding shape having a normal slot pitch as described in the first embodiment. They will be described below in more details with reference to FIGS. 29(a) to 29(c) and 30A to 30C.

Note that the winding coils U11 to U26 may be formed as a continuous conductor or may be formed to connect the segment coils by welding or the like after the segment coil is inserted into the slot. If the segment coils are used, the coil ends 241 positioned in both axial ends of the ends of the stator core 232 can be formed in advance before the segment coil is inserted into the slot 237, so that it is possible to easily provide an appropriate insulation interval between different phases or between the same phases. As a result, it is possible to suppress a partial discharge caused by a surge voltage generated by a switching operation of the IGBT 21, and this is effective in insulation.

The conductor used in the winding coil may have a plurality of shapes such as a rectangular shape, a circular shape, or a narrow shape. However, in order to increase a space factor for high output power and high efficiency, the rectangular shape is desirable.

Figure 29A:
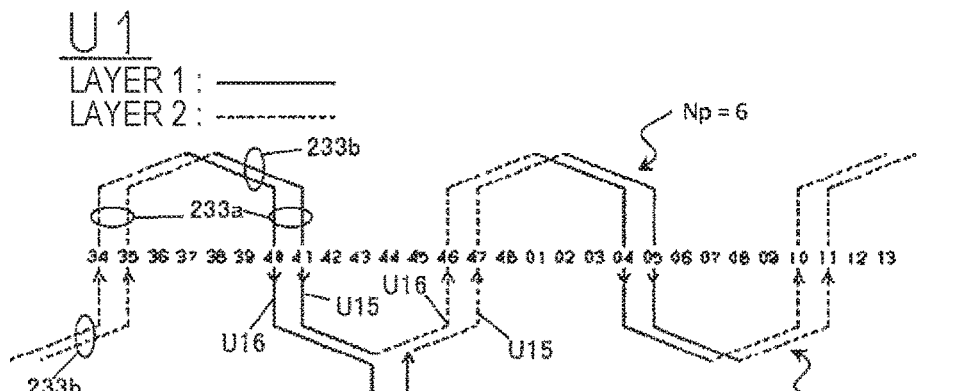
FIGS. 29A to 29C are partial enlarged view illustrating the U1-phase winding group according to the second embodiment.
Figure 29B:
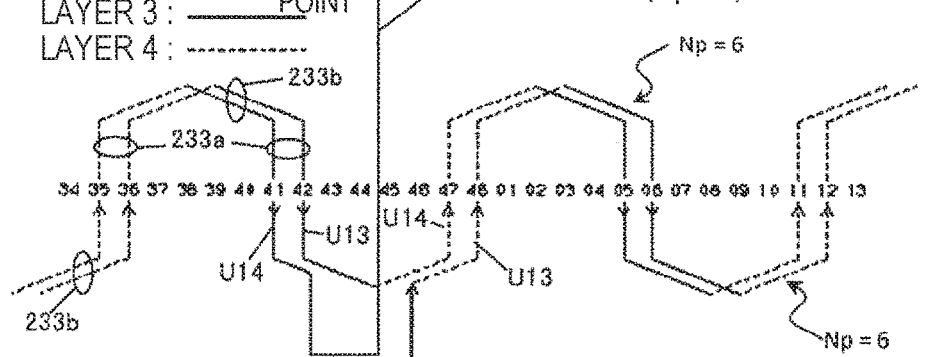
Figure 29C:
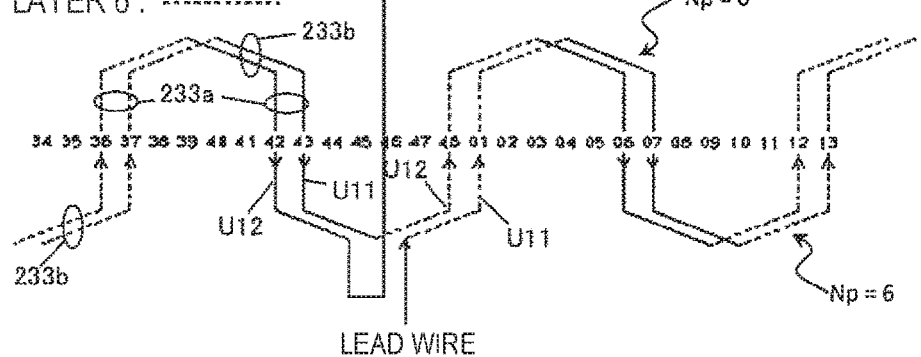
Figure 30A:
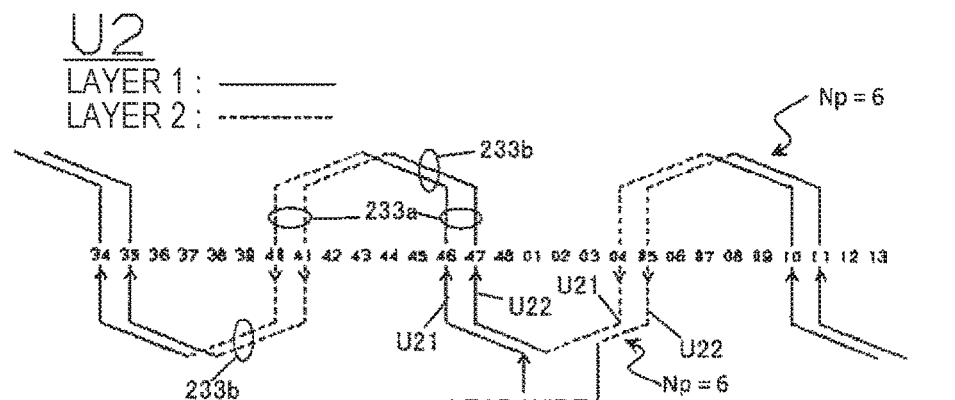
FIGS. 30A to 30C are partial enlarged view illustrating the U2-phase winding group according to the second embodiment.
Figure 30B:
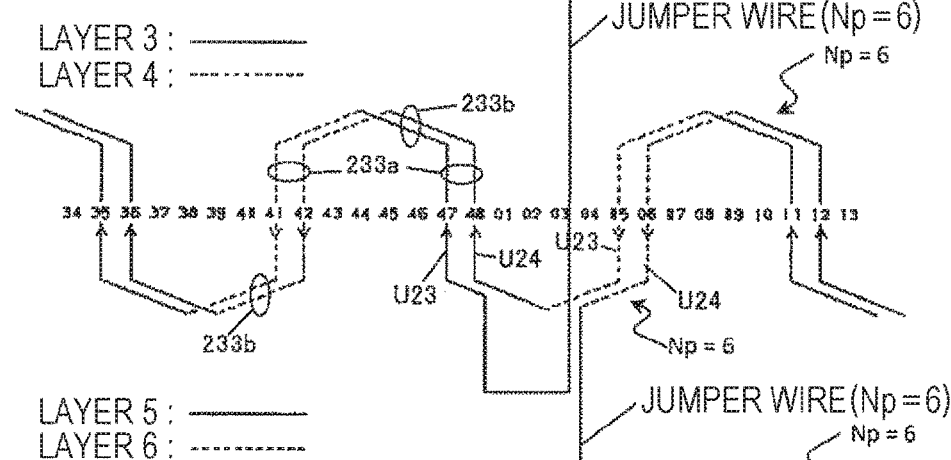
Figure 30C:
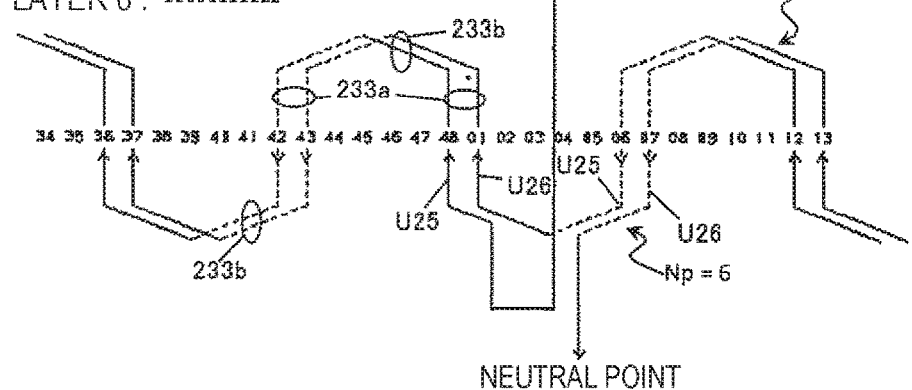

FIGS. 29(a) to 29(c) are partial enlarged views illustrating the U1-phase winding group of FIGS. 27(a) to 27(c). FIGS. 30A to 30C are partial enlarged views illustrating the U2-phase winding group of FIGS. 28(a) to 28(c). In FIGS. 29(a) to 29(c) and 30A to 30C, a part of the phase winding groups corresponding to four poles including the jumper wire are illustrated. Hereinafter, a method of winding the U1-phase winding group will be described with reference to FIGS. 29(a) to 29(c), and a method of winding the U2-phase winding group will be described with reference to FIGS. 30A to 30C.

As illustrated in FIG. 29(c), the stator winding group U1 enters the layer 6 of the slot number 01 from the lead wire and strides over six slots through the jumper conductor 233b, and the slot conductor 233a then enters the layer 5 of the slot number 07. Then, the slot conductor 233a strides six slots from the layer 5 of the slot number 07 and enters the layer 6 of the slot number 13.

In this manner, the stator winding is wound around the stator core 232 by a single turn up to the layer 5 of the slot number 43 in a wave winding shape with a normal slot pitch by setting a striding span of the jumper conductor 233b to a slot pitch "Np=6" in both the lead wire side (lower side in the drawing) and the opposite side (upper side in the drawing). The stator winding corresponding to an approximately single turn up to here is the winding coil U11 of FIG. 6. All of the winding coils according to the second embodiment are wound in a wave winding shape with a normal slot pitch. However, the inserted slot position is deviated from each other in the circumferential direction of the stator core 232. This will be described below in more details.

Then, the stator winding extracted from the layer 5 of the slot number 43 strides over five slots and enters the layer 6 of the slot number 48. The winding from the layer 6 of the slot number 48 is similar to the winding coil U12 of FIG. 6. The winding coil U12 is also wound in a wave winding shape having a normal slot pitch. That is, the striding span of the jumper conductor 233b is set to a slot pitch "Np=6" in both the lead wire side (lower side in the drawing) and the opposite side (upper side in the drawing), so that the stator winding is wound around the stator core 232 by a single turn up to the layer 5 of the slot number 42 in a wave winding shape. The stator winding corresponding to an approximately single turn up to hear is the winding coil U12.

Note that, since the winding coil U12 is wound to deviate by a single slot pitch from the winding coil U11, a phase difference of an electric angle corresponding to a single slot pitch is generated. In this embodiment, a single slot pitch corresponds to an electric angle of 30°. Referring to FIG. 6, there is a deviation of 30° between the winding coils U11 and U12.

As illustrated in FIGS. 29(b) and 29(c), the stator winding extracted from the layer 5 of the slot number 42 enters the layer 4 of the slot number 48 through a jumper wire striding over six slots. The winding from the layer 4 of the slot number 48 corresponds to the winding coil U13 of FIG. 6. The winding coil U13 is also wound in a wave winding shape. That is, the striding span of the jumper conductor 233b is set to a slot pitch "Np=6" in both the lead wire side and the opposite side, so that the stator winding is wound around the stator core 232 by a single turn up to the layer 3 of the slot number 42 in a wave winding shape. The stator winding up to here for an approximately single turn is the winding coil U13.

Then, the stator winding extracted from the layer 3 of the slot number 42 enters the layer 4 of the slot number 47 by striding over five slots. The winding from the layer 4 of the slot number 47 corresponds to the winding coil U14 of FIG. 6. The winding coil U14 is also wound in a wave winding shape having a normal slot pitch. That is, the striding span of the jumper conductor 233b is set to a slot pitch "Np=6" in both the lead wire side and the opposite side, so that the stator winding is wound around the stator core 232 by a single turn up to the layer 3 of the slot number 41 in a wave winding shape. The stator winding up to here for an approximately single turn is the winding coil U14.

Note that, since the winding coil U14 is wound to deviate by a single slot pitch from the winding coil U13, a phase difference of an electric angle corresponding to a single slot pitch is generated. In this embodiment, a single slot pitch corresponds to an electric angle of 30°. Referring to FIG. 6, there is a deviation of 30° between the winding coils U13 and U14.

As illustrated in FIGS. 29(a) and 29(b), the stator winding extracted from the layer 3 of the slot number 41 enters the layer 2 of the slot number 47 through a jumper wire striding over six slots. The winding from the layer 2 of the slot number 47 corresponds to the winding coil U15 of FIG. 6. The winding coil U15 is also wound in a wave winding shape having a normal slot pitch. That is, the striding span of the jumper conductor 233*b* is set to a slot pitch "Np=6" in both the lead wire side the opposite side, so that the stator winding is wound around the stator core 232 by a single turn up to the layer 1 of the slot number 41 in a wave winding shape. The stator winding up to here for an approximately single turn is the winding coil U15.

Then, the stator winding extracted from the layer 1 of the slot number 41 enters the layer 2 of the slot number 47 by striding over six slots. The winding from the layer 2 of the slot number 47 corresponds to the winding coil U16 of FIG. 6. The winding coil U16 is also wound in a wave winding shape having a normal slot pitch. That is, the striding span of the jumper conductor 233*b* is set to a slot pitch "Np=7" in the lead wire side and is set to a slot pitch "Np=5" in the opposite side, so that the stator winding is wound around the stator core 232 by a single turn up to the layer 1 of the slot number 40 in a wave winding shape. The stator winding up to here for an approximately single turn is the winding coil U16.

Note that, since the winding coil U16 is wound to deviate by a single slot pitch from the winding coil U15, a phase difference of an electric angle corresponding to a single slot pitch is generated. In this embodiment, a single slot pitch corresponds to an electric angle of 30°. Referring to FIG. 6, there is a deviation of 30° between the winding coils U15 and U16.

Since all of the winding coils U11 to U16 are wound in a wave winding shape having a normal slot pitch and have the same striding span of the jumper conductor 233*b*, the same crossing magnetic flux amount is generated. However, since the inserted slot positions deviate from each other in the circumferential direction of the stator core 232, a phase difference is generated. Specifically, the winding coils U11, U13, and U15 are inserted into the slots 237 of the slot numbers 07, 06, and 05. The winding coils U12, U14, and U16 neighboring to the winding coils U11, U13, and U15, respectively, are inserted into the slots 237 of the slot numbers 06, 05, and 04, respectively. In this manner, the inserted slot positions deviate from each other in the circumferential direction of the stator core 232. For this reason, a phase difference is generated between the winding coils.

Similar to each layer of the stator winding group U1, all of the winding coils of the stator winding group U2 of FIGS. 30A to 30C are also wound in a wave winding shape having a normal slot pitch. The winding coil U21 is wound in a wave winding shape having a normal slot pitch from the layer 1 of the slot number 46 to the layer 2 of the slot number 04, and the winding coil U22 is wound in a wave winding shape having a normal slot pitch from the layer 1 of the slot number 47 up to the layer 2 of the slot number 05. Then, the stator winding enters the layer 3 of the slot number 47 from the layer 2 of the slot number 05 through the jumper wire and is wound as the winding coil U23 in a wave winding shape having a normal slot pitch up to the layer 4 of the slot number 05. Then, the stator winding is wound in a wave winding shape having a normal slot pitch from the layer 3 of the slot number 48 up to the layer 4 of the slot number 06, so that the winding coil U24 is formed. Then, the stator winding enters the layer 5 of the slot number 48 from the layer 4 of the slot number 06 through the jumper wire and is wound as a winding coil U25 in a wave winding shape having a normal slot pitch up to the layer 6 of the slot number 06. Then, the stator winding is wound in a wave winding shape having a normal slot pitch from the layer 5 of the slot number 01 up to the layer 6 of the slot number 07, so that a winding coil U26 is formed.

As described above, the stator winding group U1 includes the winding coils U11, U12, U13, U14, U15, and U16, and a voltage obtained by synthesizing each phase is induced in the stator winding group U1. Similarly, in the stator winding group U2, a voltage obtained by synthesizing phases of the winding coils U21, U22, U23, U24, U25, and U26 is induced. While the stator winding group U1 is connected to the stator winding group U2 in parallel as illustrated in FIG. 6, there is no phase difference between the voltages induced from the stator winding groups U1 and U2, and there is no worry about an imbalance current such as a circulation current even in the parallel connection. Naturally, there is no problem in a series connection.

Figure 31:
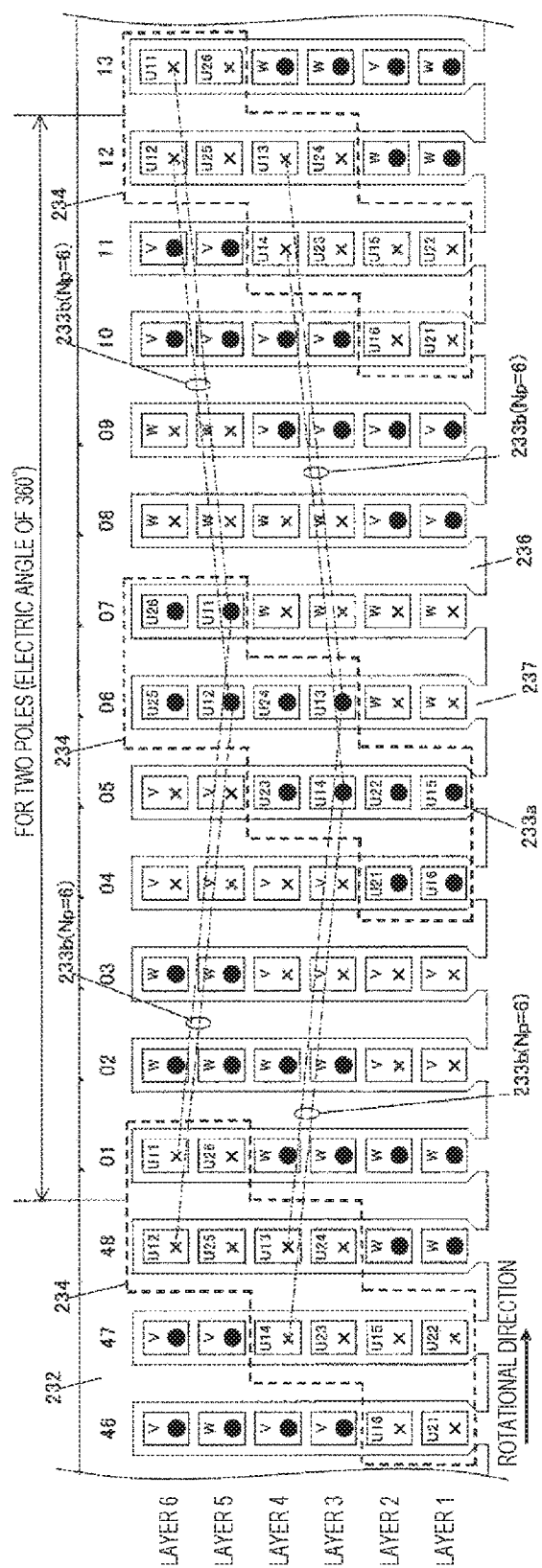
FIG. 31 is a layout of the slot conductor 233a according to the second embodiment.

FIG. 31 is a diagram generally illustrating a layout of the slot conductor 233*a* in the stator core 232 for the slot numbers 46 to 13 of FIGS. 27 to 30C. Note that a rotational direction of the rotor is directed from the left to the right in the drawing. According to this embodiment, twelve slots 237 are arranged for two poles, that is, at an electric angle of 360°. For example, the slot conductors 233*a* of the slot numbers 01 to 12 in FIG. 31 correspond to two poles. For this reason, the number of slots per pole N is "6," and the number of slots per pole per phase NSPP is "2" (=6/3). Six slot conductors 233*a* of the stator winding 238 are inserted into each slot 237.

While each slot conductor 233*a* is illustrated as a rectangular shape, the reference signs U11 to U26, V, and W inside the rectangle refer to the U-phase, V-phase, and W-phase, respectively, a cross mark "x" denotes a direction from the lead wire side to the opposite side, and a black circle mark "●" denotes a direction opposite thereto. In addition, the slot conductor 233*a* positioned in the innermost circumference side of the slot 237 (in the slot opening side) will be referred to as the layer 1, and the slot conductors 233*a* will be referred to as the layers 2, 3, 4, 5, an 6 in order toward the outer circumference side (in the slot bottom side). Furthermore, the reference numerals 01 to 12 denote the slot numbers as in FIGS. 27 to 30C. Note that only the slot conductors 233*a* of the U-phase are denoted by reference signs "U11 to U26" that represent the winding coils, and the slot conductors 233*a* of the V-phase and the W-phase are denoted by reference signs "V" and "W" that represent the phases.

In FIG. 31, all of twelve slot conductors 233*a* surrounded by the dashed line 234 belong to the slot conductor group 234 consisting of the U-phase slot conductors 233*a*. Hereinafter, a specific example will be described. For example, the slot conductor group 234 in the center includes the slot conductors 233*a* of the winding coils U25, U26, U12, and U11 arranged in the layers 6 and 5 of the slot numbers 06 and 07, the slot conductors 233*a* of the winding coils U23, U24, U14, and U13 arranged in the layers 4 and 2 of the slot numbers 05 and 06, and the slot conductors 233*a* of the winding coils U21, U22, U16, and U15 arranged in the layers 2 and 1 of the slot numbers 04 and 05.

Figure 32:
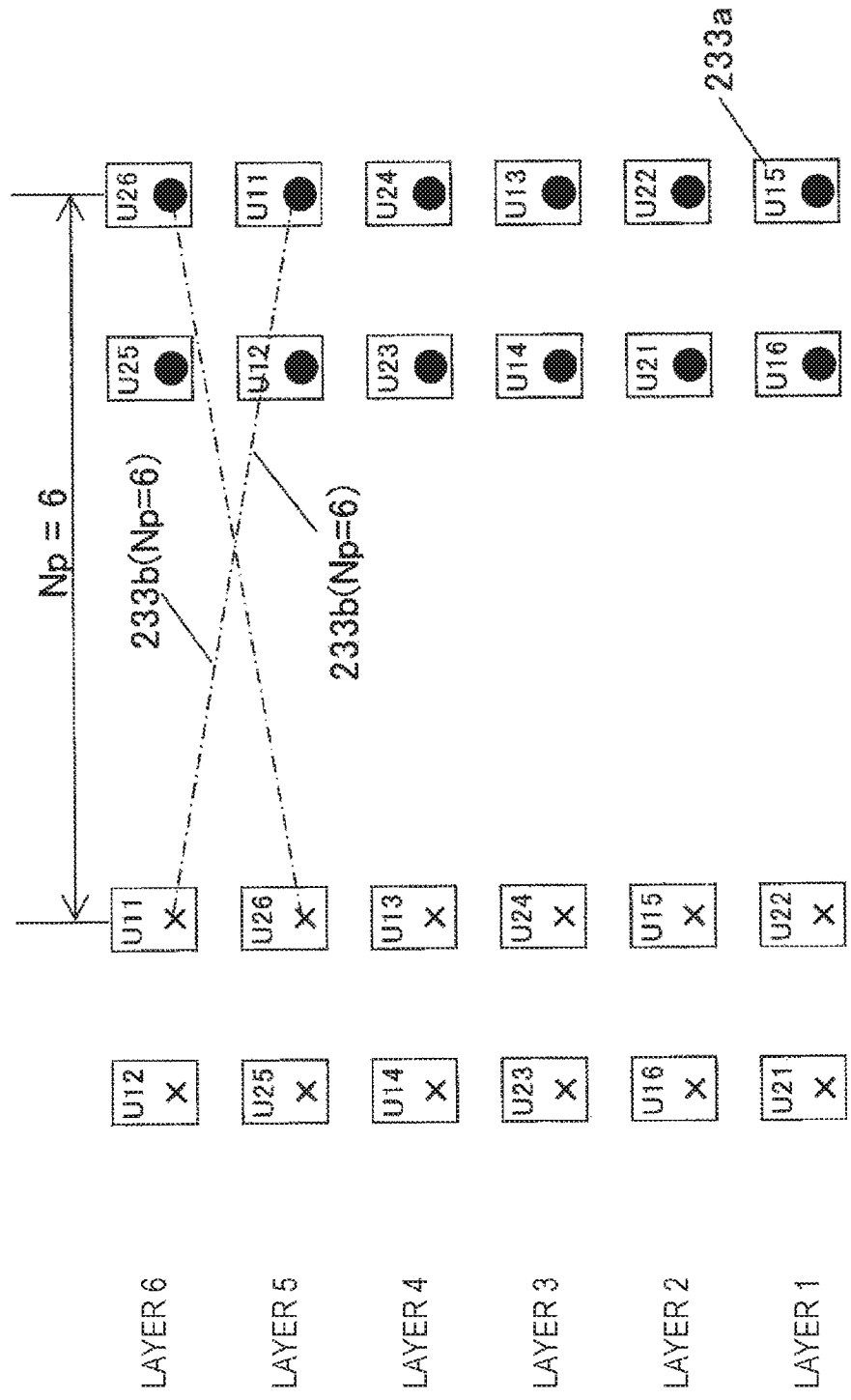
FIG. 32 is a schematic diagram illustrating a layout of a general slot conductor (Comparative Example 1).

In general, the number of slots per pole N is set to "6," the number of slots per pole per phase NSPP is set to "2," and the number of the layers of the slot conductors 233*a* in the slot 237 is set to "6," a configuration of arranging the U-phase slot conductors 233*a* is employed in many cases as illustrated in FIG. 32 (this similarly applies to the V-phase and the W-phase). In this case, an interval between the left slot conductor group and the right slot conductor group in the drawing becomes a slot pitch of "6" (Np=6), that is, the normal slot pitch when the number of slots per pole N is set to "6." Meanwhile, the winding coils of the same phase are arranged not to deviate in the circumferential direction of the stator core 232. Note that FIG. 32 is an updated version of FIG. 11.

Figure 33:
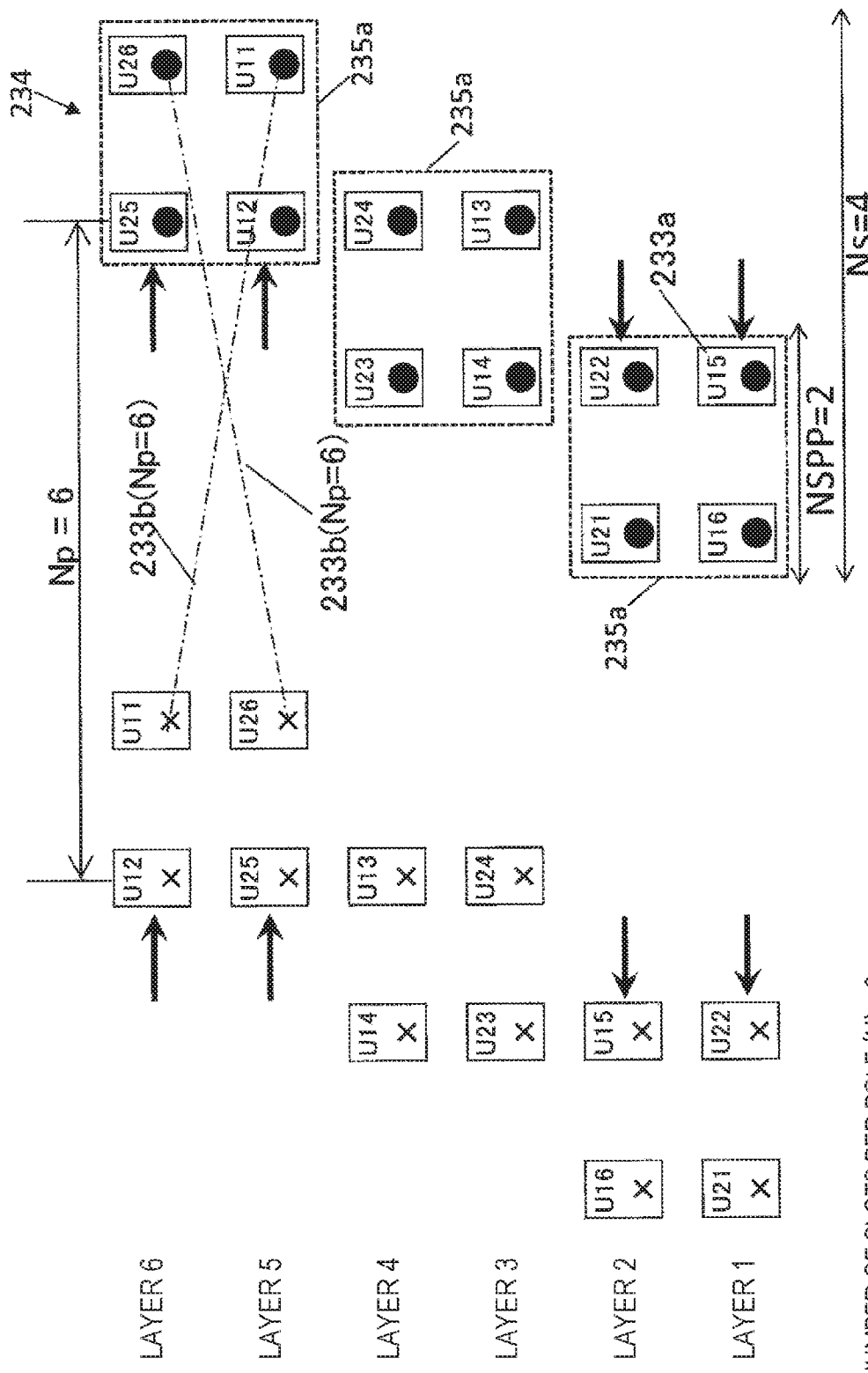
FIG. 33 is a schematic diagram illustrating a layout of a slot conductor 233a according to the second embodiment.

Meanwhile, in the configuration according to this embodiment, as illustrated in FIG. 33, four slot conductors 233a of the layers 2 and 1 of FIG. 32 are deviated by a single slot pitch oppositely to the rotational direction of the rotor (in the left direction in the drawing), and four slot conductors 233a of the layers 5 and 6 are deviated by a single slot pitch in the rotational direction (in the right direction in the drawing). In the second embodiment, since two layers connected to each other through the jumper conductor 233b are deviated from each other, only a normal slot pitch is generated, but no irregular slot pitch is generated. Therefore, a striding span of the jumper conductor 233b used to connected the slot conductors 233a of the winding coils U11 of the layers 6 and 5 becomes a slot pitch of "6" (Np=6). Similarly, a striding span of the jumper conductor 233b used to connect the winding coils U26 of the layers 5 and 6 becomes a slot pitch of "6" (Np=6). This similarly applies to other winding coils.

In this case, each slot conductor 233a corresponding to the V-phase and the W-phase as well as the U-phase is deviated similarly by a single slot pitch. Therefore, as illustrated in FIG. 31, slot conductor groups 234 having the same shape are formed for each of the U-phase, the V-phase, and the W-phase. That is, a slot conductor group consisting of the U-phase slot conductors 233a indicated by the cross marks, a slot conductor group consisting of the W-phase slot conductors 233a indicated by the black circle marks, a slot conductor group consisting of the V-phase slot conductors 233a indicated by the cross marks, a slot conductor group consisting of the U-phase slot conductors 233a indicated by the black circle marks, a slot conductor group consisting of the W-phase slot conductors 233a indicated by the cross marks, and a slot conductor group consisting of the V-phase slot conductors 233a indicated by the black circle marks are arranged in order in the rotational direction of the rotor.

According to this embodiment, as illustrated in FIG. 31, assuming that the number of slots per pole is set to "N(=6)," only winding coils having a normal slot pitch obtained by connecting the slot conductors 233a such that the jumper conductor 233b strides slots with a slot pitch "Np=N(=6)" are provided in both coil ends. As defined in the first embodiment, assuming that the number of layers of the winding coils having a normal slot pitch is set to "2×NL1," according to this embodiment, all of the layers are layers of the winding coils having a normal slot pitch. Therefore, the number of all layers is expressed as "2×NL1." According to this embodiment, since the number of all layers is "6," a relationship "NL1=3" is established.

As described above, the stator winding of each phase includes a slot conductor group 234 consisting of a plurality of slot conductors 233a inserted into a predetermined number of slots Ns continuously arranged along the circumferential direction of the stator core, and a jumper conductor 233b that connects the coil end sides of a plurality of slot conductors 233a. The slot conductors 233a are inserted into the respective slots 237 such that the slot and the layer are adjacent to each other. The predetermined number of slots Ns is set to "Ns=NSPP+NL1−1," where "NSPP" denotes the number of slots per pole per phase, and the number of layers is set to "2×NL1." According to this embodiment, as illustrated in FIG. 33, since the number of slots per pole per phase is set to "NSPP=2," and the number of layers is set to "NL1=3," the number of slots becomes "Ns=4."

The slot conductor group 234 according to this embodiment will be further described with reference to FIG. 33. The slot conductor group 234 can be divided into slot conductor sub-groups 235. Each slot conductor sub-group 235 includes an inner circumferential layer and an outer circumferential layer that neighbor to each other in the radial direction of the stator core 232 and are connected to each other through the jumper conductor 233b. Note that, according to this embodiment, all of the slot conductor sub-groups 235 are first slot conductor sub-groups 235a relating to the winding coil having a normal slot pitch. In FIG. 33, the slot conductor sub-group 235a is indicated by the dashed line. The slot conductor sub-group 235 and the first slot conductor sub-group 235a are defined similar to those of the first embodiment. The slot conductor sub-group 235 includes an inner circumferential layer and an outer circumferential layer that neighbor to each other in the radial direction of the stator core 232 and are connected to the jumper conductor 233b. Hereinafter, this will be described in more details with reference to FIG. 33.

According to this embodiment, the layer 1 (first inner circumferential layer) and the layer 2 (first outer circumferential layer) constitute a first first slot conductor sub-group 235a. The layer 3 (first inner circumferential layer) and the layer 4 (first outer circumferential layer) constitute a second first slot conductor sub-group 235a. The layer 5 (first inner circumferential layer) and the layer 6 (first outer circumferential layer) constitute a third first slot conductor sub-group 235a. Therefore, as described above, the slot conductor group 234 has a total of three (NL1=3) first slot conductor sub-groups 235a.

In a single first slot conductor sub-group 235a, the slot conductor of the inner circumferential layer and the slot conductor of the outer circumferential layer are arranged such that both circumferential ends of the stator core 232 are aligned with each other.

A positional relationship between the first slot conductor sub-groups 235a will be described. A plurality of the first slot conductor sub-groups 235a are arranged to deviate by a single slot pitch in the circumferential direction of the stator core. This arrangement rule will be referred to as a rule B. For example, the first slot conductor sub-group 235a consisting of the layers 1 and 2 and the first slot conductor sub-group 235a consisting of the layers 3 and 4 are arranged to deviate by a single slot pitch in the circumferential direction of the stator core. Therefore, the slot conductor 233a of the winding coil U22 and the slot conductor 233a of the winding coil U14 are arranged in the same slot 237.

In this configuration according to this embodiment, the aforementioned relationship "Ns=NSPP+NL1−1" is satisfied.

Here, functional effects of the rotary electric machine according to this embodiment illustrated in FIG. 31 or the like will be described in comparison with the functional effects of the rotary electric machine obtained by using the winding method of FIG. 32 (hereinafter, referred to as Comparative Example 1) and the functional effects of the rotary electric machine obtained by using the winding method of FIG. 22(a) described in PTL 1 (Japanese Unexamined Patent Application No. 2012-29370) (hereinafter, referred to as Comparative Example 2). Note that, in Comparative Example 2, a deviating direction of the slot conductors of the winding coil relating to the irregular slot pitch is reversed to that of the rotary electric machine of this embodiment. However, this relationship depends on definition, and the deviating direction may also be the same in both cases.

FIGS. 34 to 37 illustrate the functional effects of the rotary electric machine according to this embodiment in comparison with the functional effects of Comparative Example 1.

Figure 34:
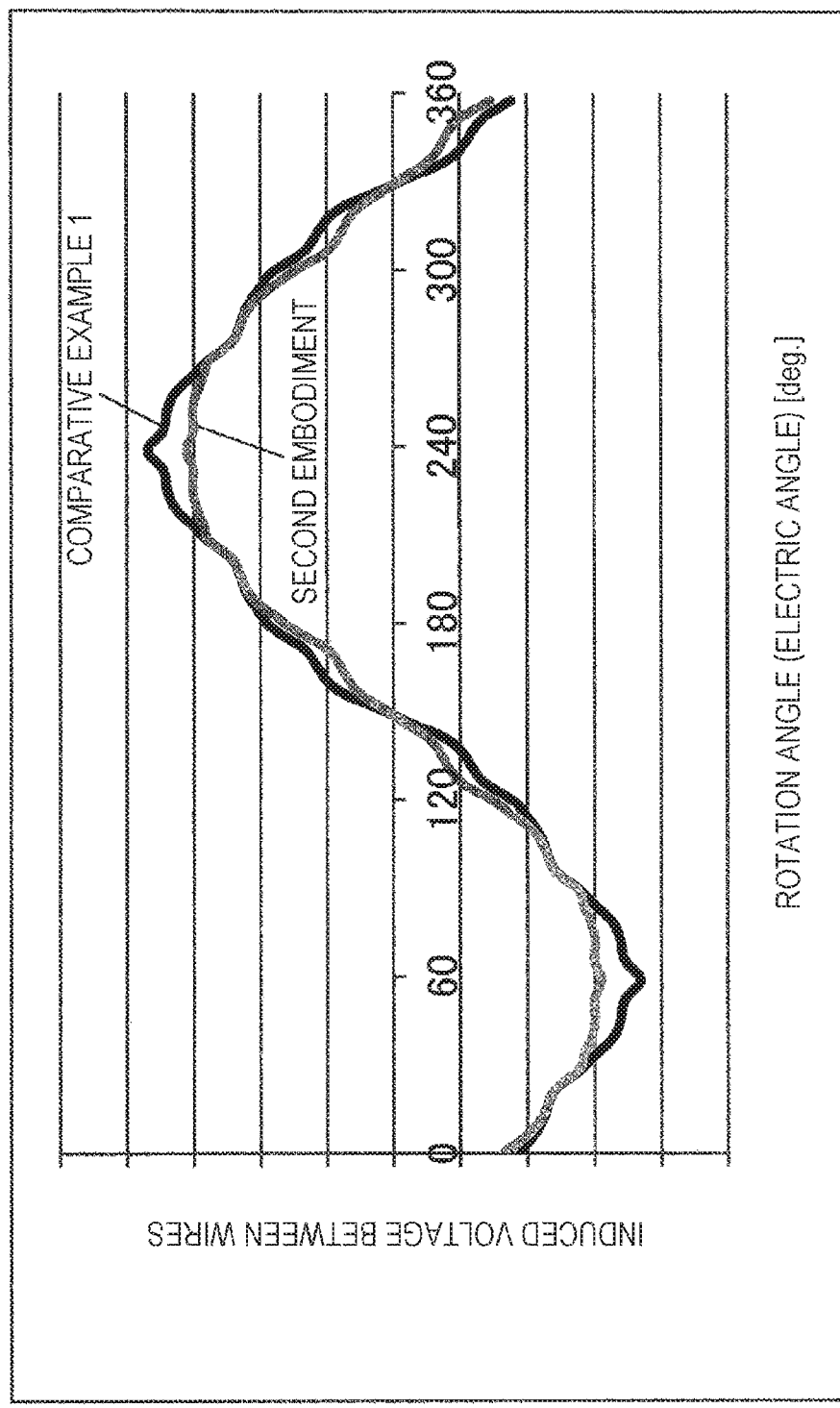
FIG. 34 is a diagram illustrating induced voltage waveforms of the second embodiment and Comparative Example 1.
Figure 35:
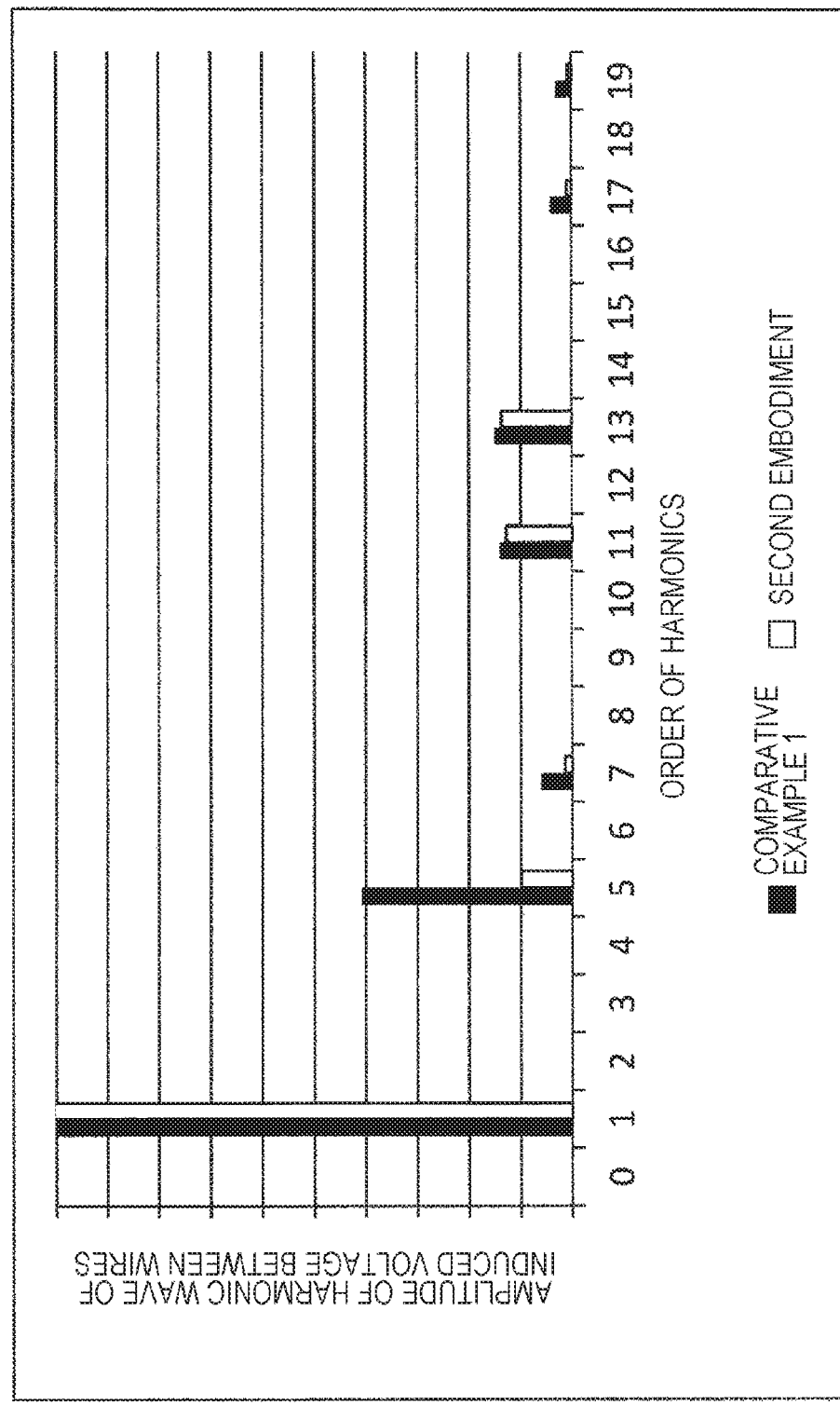
FIG. 35 is a diagram illustrating a harmonic analysis result for the induced voltage waveforms of the second embodiment and Comparative Example 1.

FIG. 34 is a diagram illustrating an induced voltage waveform of the rotary electric machine according to this embodiment and an induced voltage waveform of the rotary electric machine of Comparative Example 1. In addition, FIG. 35 illustrates a harmonic analysis result for each induced voltage waveform of FIG. 34.

As illustrated in FIG. 34, it is recognized that the induced voltage waveform of the rotary electric machine according to this embodiment is close to a sinusoidal wave, compared to the induced voltage waveform of the rotary electric machine of Comparative Example 1. In addition, as illustrated in the harmonic analysis result of FIG. 35, it is recognized that, according to this embodiment, it is possible to reduce, particularly, the fifth and seventh harmonic components, compared to Comparative Example 1.

Figure 36:
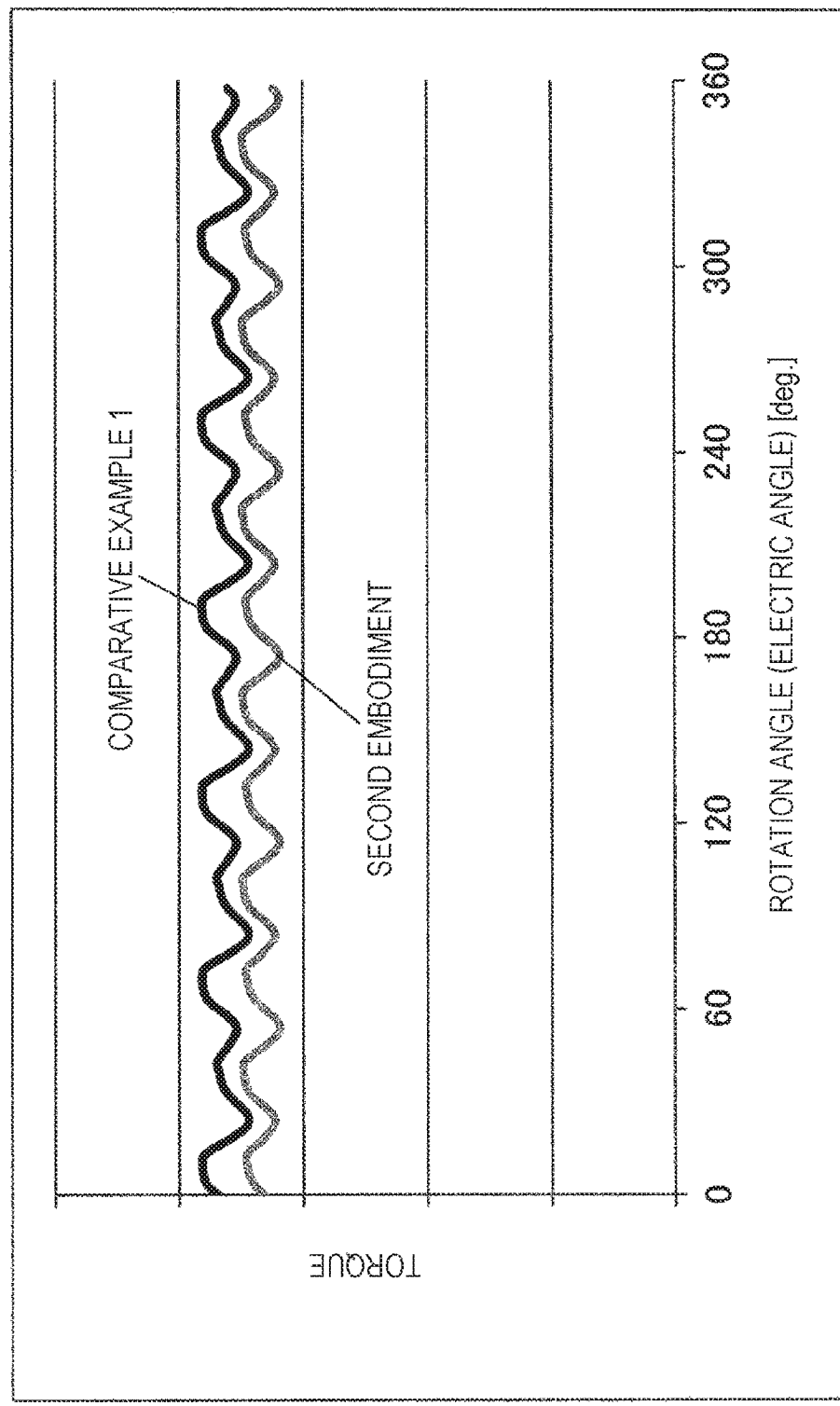
FIG. 36 is a diagram illustrating torque waveforms of the second embodiment and Comparative Example 1.
Figure 37:
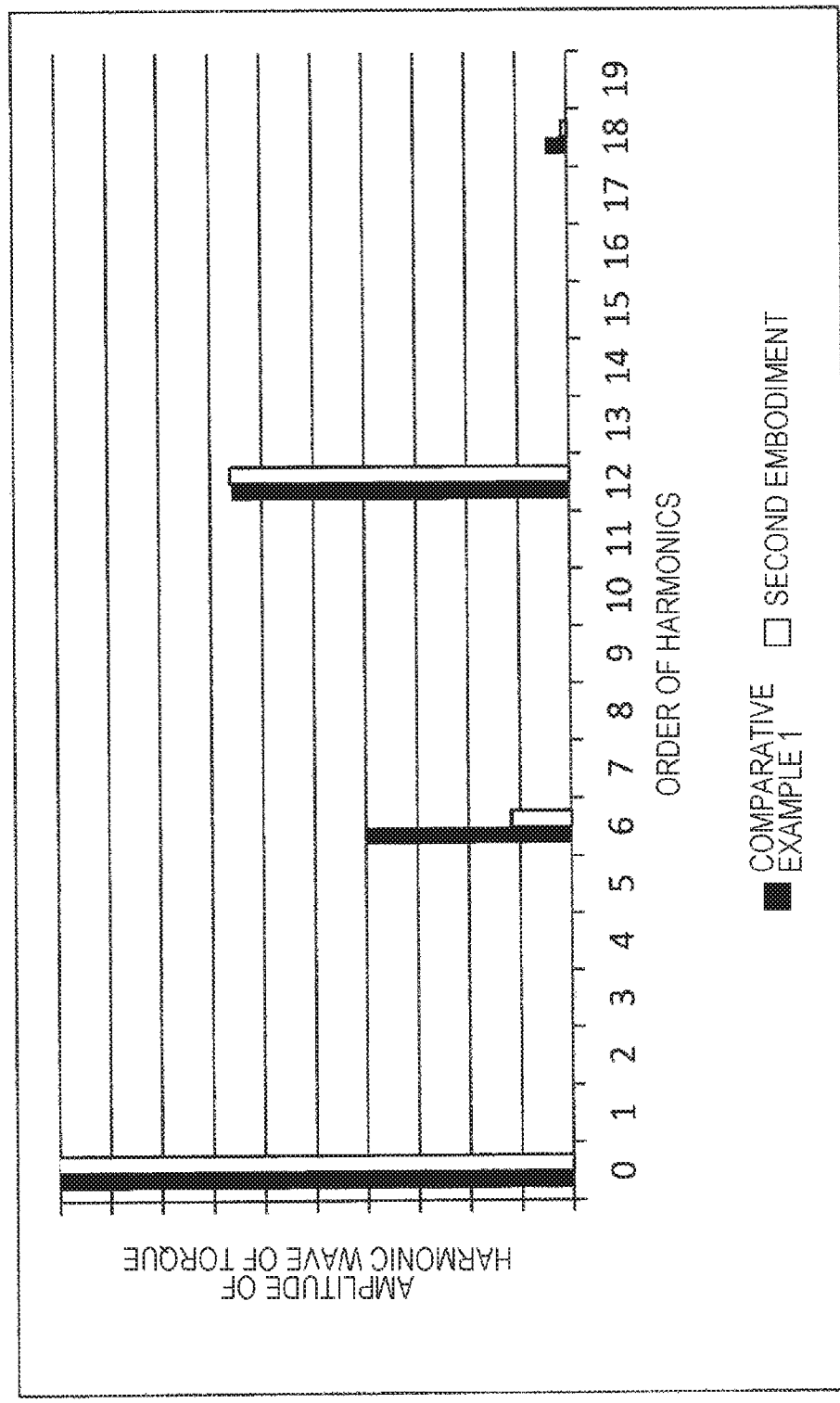
FIG. 37 is a diagram illustrating a harmonic analysis result for the torque waveforms of the second embodiment and Comparative Example 1.

FIG. 36 illustrates torque waveforms of the rotary electric machine according to this embodiment and the rotary electric machine of Comparative Example 1 when an AC current flows. In addition, FIG. 37 illustrates a harmonic analysis result of each torque waveform of FIG. 36. As illustrated in the harmonic analysis result of FIG. 37, it is recognized that, particularly, a torque ripple in the sixth harmonic component can be reduced. This means that the induced voltage, that is, the fifth and seventh components of the crossing magnetic flux are reduced by arranging the coils as illustrated in FIGS. 27 to 31.

Figure 38:
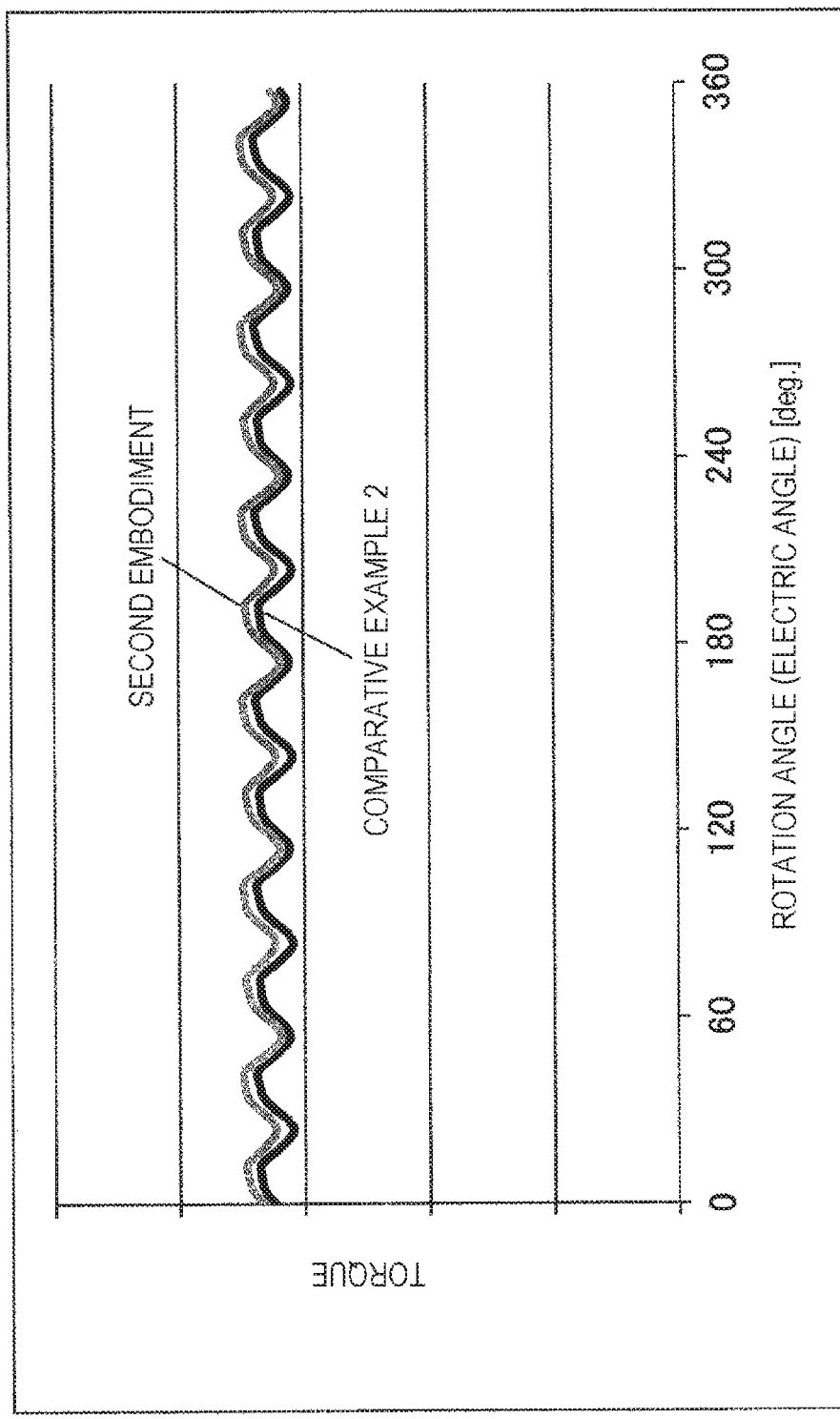
FIG. 38 is a diagram illustrating torque waveforms of the second embodiment and Comparative Example 2.
Figure 39:
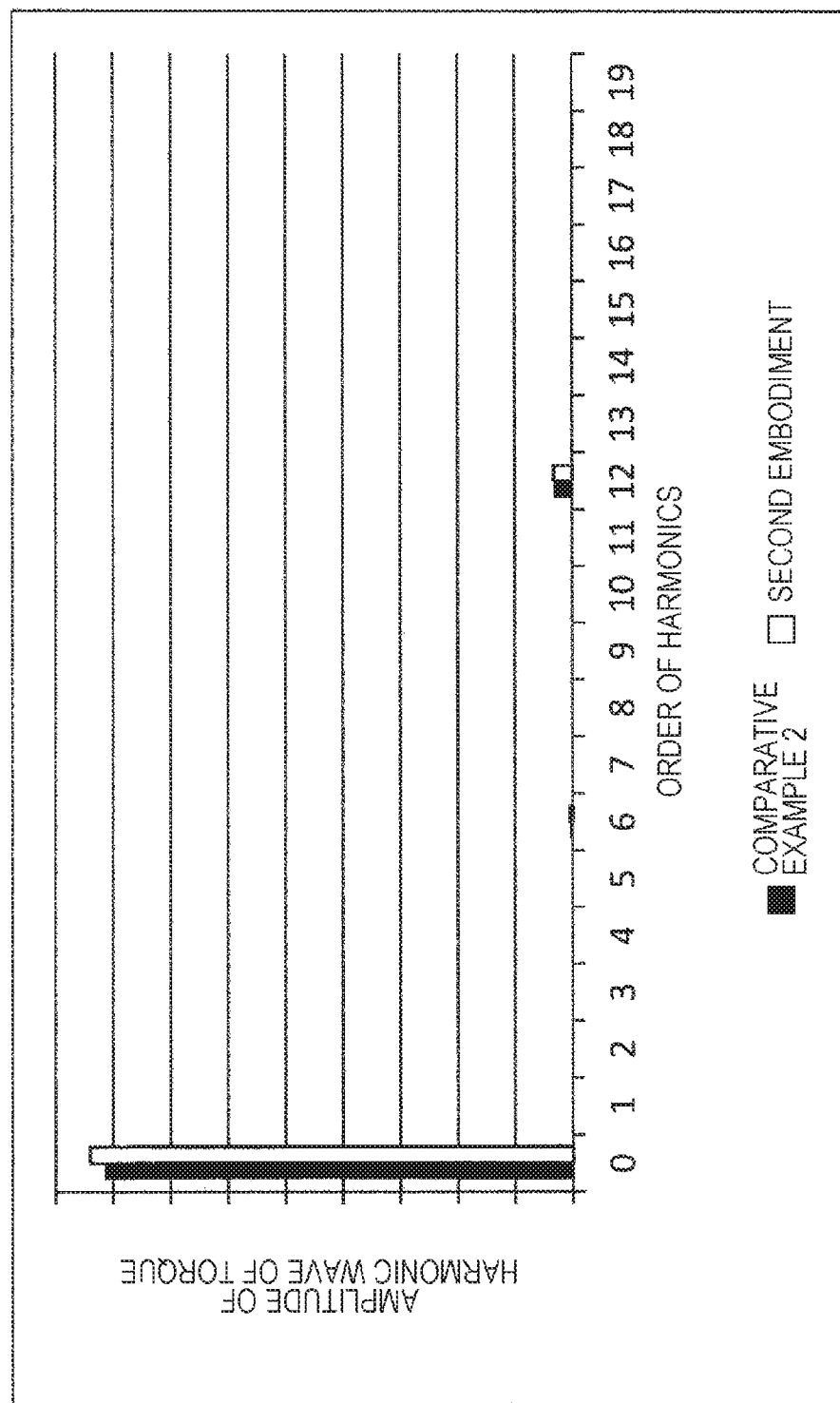
FIG. 39 is a diagram illustrating a harmonic analysis result for the torque waveforms of the second embodiment and Comparative Example 2.

FIGS. 38 and 39 illustrate functional effects of this embodiment in comparison with the functional effects of Comparative Example 2.

FIG. 38 illustrates torque waveforms of the rotary electric machine according to this embodiment and the rotary electric machine of Comparative Example 2 when an AC current flows. In addition, FIG. 39 illustrates a harmonic analysis result of each torque waveform of FIG. 38. As illustrated in FIGS. 38 and 39, it is recognized that, according to this embodiment, an average torque is higher than that of Comparative Example 2.

As described above in relation to the functional effects, according to this embodiment, it is possible to obtain a rotary electric machine having a smaller torque ripple and a lower noise relative to Comparative Example 1 and a higher average torque relative to Comparative Example 2. In this sense, using the rotary electric machine according to this embodiment, it is possible to obtain a high-torque low-noise rotary electric machine. Furthermore, a vehicle provided with such a rotary electric machine can provide a high torque and a low noise.

In this manner, according to the second embodiment, it is possible to obtain the same functional effects as those of the first embodiment.

The rotary electric machine according to the second embodiment has the following configurations and the following functional effects.

(1) The stator winding of each phase of the rotary electric machine 200 includes a plurality of slot conductors 233a inserted into a plurality of slots 237 and a jumper conductor 233b that connects both ends of the slot conductors 233a in the coil end 241 (this similarly applies to the rotary electric machine 202). In addition, as illustrated in FIGS. 29(a) to 29(c), 30A to 30C, and the like, the slot conductors 233a are connected to each other with the jumper conductor 233b having a normal slot pitch in the layers 1 to 6, that is, in all of the layers.

The jumper conductor 233b having a normal slot pitch connects the slot conductors 233a such that, assuming that the number of slots per pole is set to "N", the jumper conductor 233b strides the slots 237 with a slot pitch "Np=N" in one of the coil ends 241, and strides the slots 237 with a slot pitch "Np=N" in the other coil end 241.

The stator winding 238 has a plurality of slot conductor groups 234 provided with a plurality of slot conductors 233a having the same phase.

A plurality of slot conductors 233a of the slot conductor group 234 are inserted into a predetermined number (Ns) of slots continuously arranged along the circumferential direction of the stator core 232 such that the slot 237 and the layer are adjacent to each other.

The predetermined number Ns is set to "Ns=NSPP+NL1−1," where "NSPP" denotes the number of slots per pole per phase, and the number of layers is set to "2× NL1."

As a result, according to this embodiment, it is possible to obtain a high-torque low-noise rotary electric machine. In addition, a vehicle provided with such a rotary electric machine can provide a high torque and a low noise.

(2) Specifically, the following configuration may be possible.

The slot conductor group 234 has "NL1" first slot conductor sub-groups 235a consisting of the inner circumferential layer and the outer circumferential layer that neighbor to each other in the radial direction of the stator core 232 and are connected to the jumper conductor 233b.

The slot conductor of the inner circumferential layer and the slot conductor of the outer circumferential layer are arranged such that both circumferential ends of the stator core 232 are aligned with each other.

The "NL1" slot conductor sub-groups are arranged to deviate by a single slot pitch in the circumferential direction of the stator core.

Using the specific configuration (2) described above, according to this embodiment, it is possible to obtain a high-torque low-noise rotary electric machine. In addition, a vehicle provided with such a rotary electric machine can provide a high torque and a low noise.

Modifications of Second Embodiments

Figure 40:
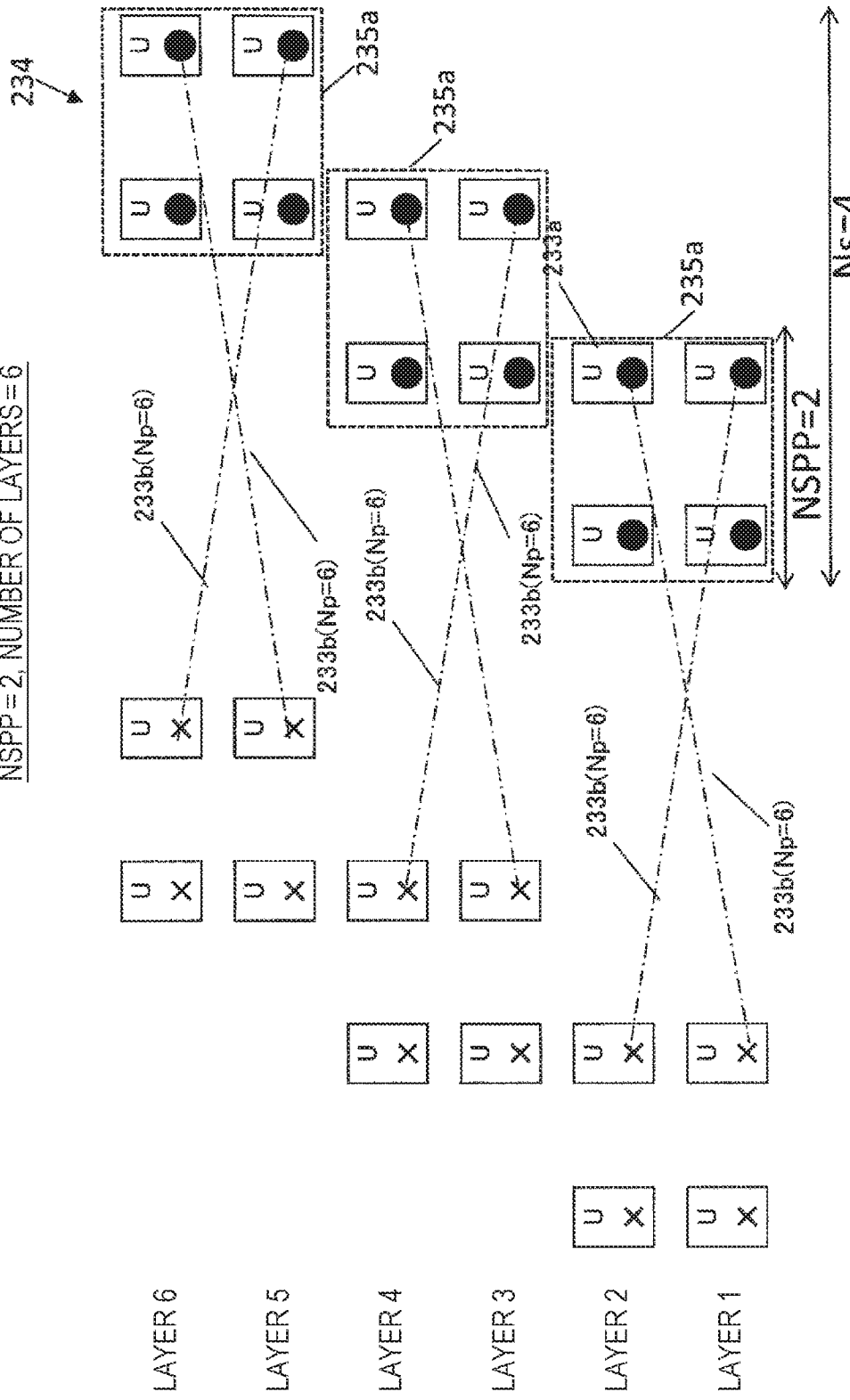
FIG. 40 is a schematic diagram illustrating a layout of the slot conductor 233a according to the second embodiment.

FIG. 40 is a diagram illustrating a slot conductor group 234 (234H) of the rotary electric machine of the second embodiment, which is similar to FIG. 33. The second embodiment may be modified as described below by way of example. A modification of the second embodiment will be described with reference to FIG. 40.

<Modification 7>

Figure 41:
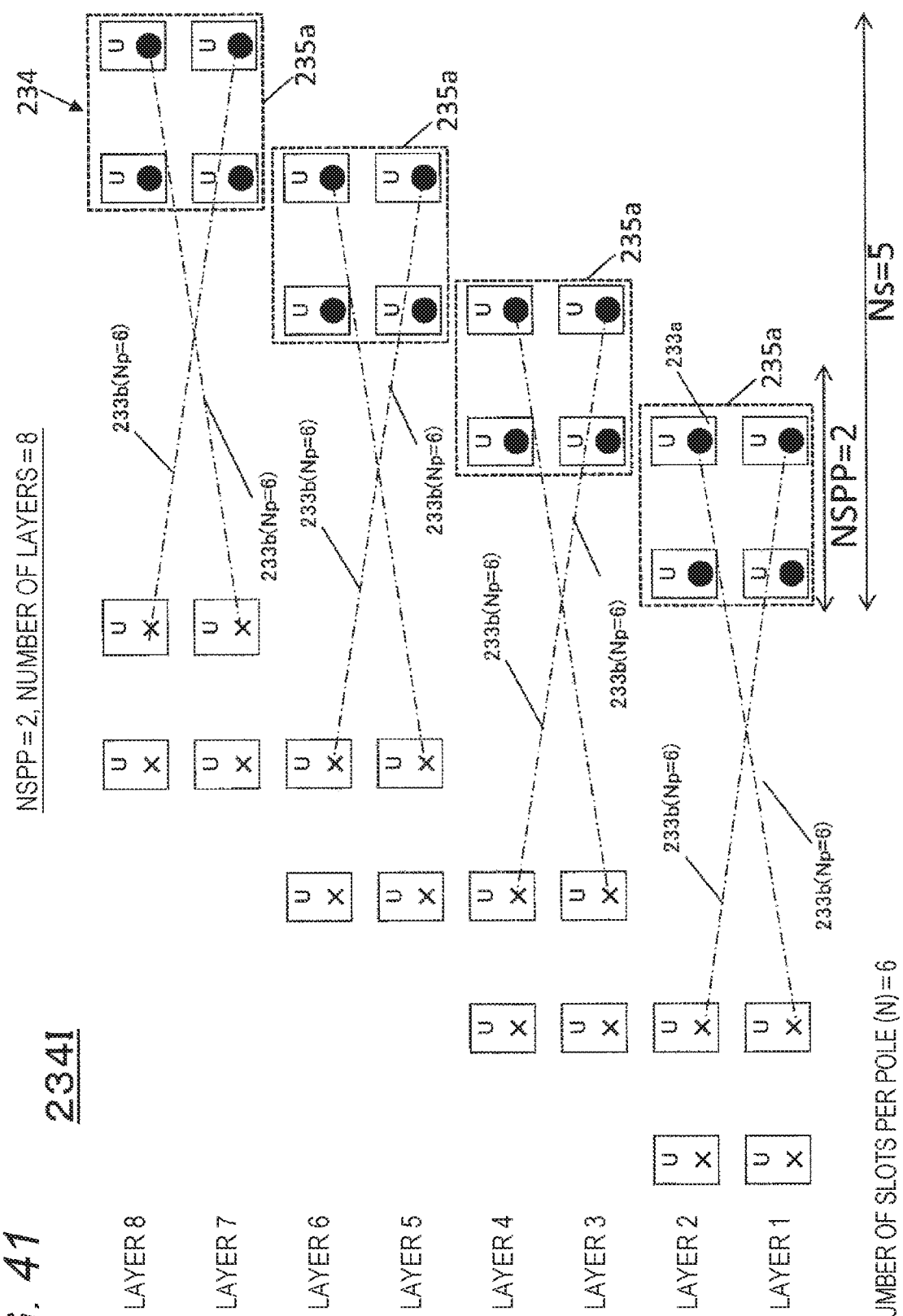
FIG. 41 is a schematic diagram illustrating a layout of the slot conductor 233a according to a modification (Modification 7) of the second embodiment.

FIG. 41 is a diagram illustrating a slot conductor group 234 (234I) of a rotary electric machine according to Modification 7. In Modification 7, the number of slots per pole is set to "N=6," the number of slots per phase per pole is set to "NSPP=2," and the number layers is set to "8." In Modification 7, all of the layers 1 to 8 consist of winding coils having a normal slot pitch (NL1=4). In this modification, the number of layers increases by two, compared to the second embodiment. As a result, the first slot conductor sub-group 235a also increases by one. Similarly, in this modification, the arrangement of the first slot conductor sub-groups 235a complies with the rule B described above. Since a predetermined number (Ns=5) of slots are continuously arranged along the circumferential direction of the stator core, it is recognized that the relationship "Ns=NSPP+NL1−1" is satisfied similar to the second embodiment. Even in this modification, by setting the number of slots per pole per phase to "NSPP=2" and setting the number of layers to "8," it is possible to obtain a smaller torque ripple and a lower noise relative to the comparative example corresponding to Comparative Example 1. In addition, by setting the number of slots per pole per phase to "NSPP=2" and setting the number of layers to "8," it is possible to obtain a higher average torque relative to the comparative example corresponding to Comparative Example 2.

<Modification 8>

Figure 42:
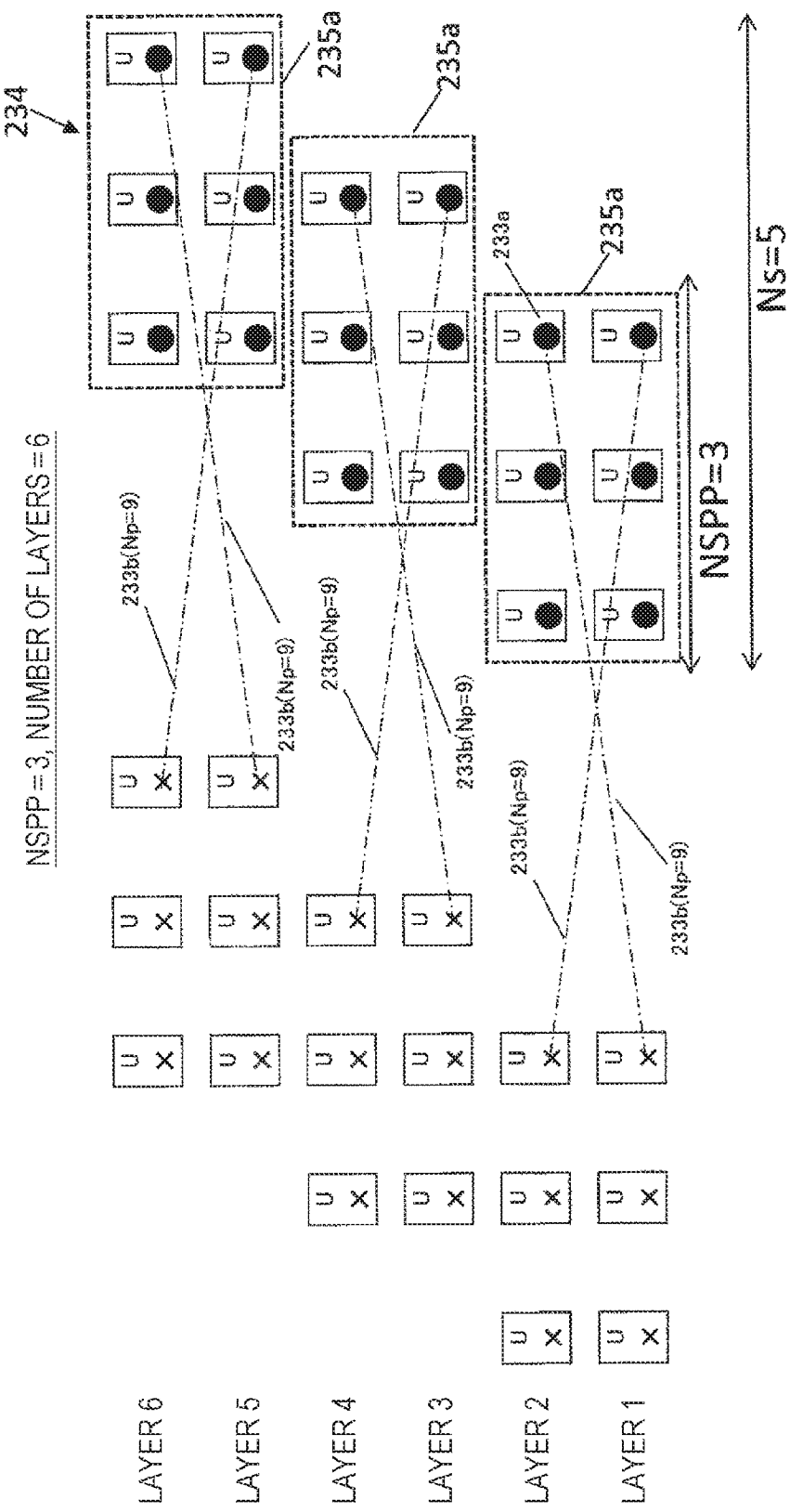
FIG. 42 is a schematic diagram illustrating a layout of the slot conductor 233a according to a modification (Modification 8) of the second embodiment.

FIG. 42 is a diagram illustrating a slot conductor group 234 (234J) of a rotary electric machine according to Modification 8. In Modification 8, the number of slots per pole is set to "N=9," the number of slots per pole per phase is set to "NSPP=3," and the number of layers is set to "6." In Modification 8, all of the layers 1 to 6 are winding coils having a normal slot pitch (NL1=3). In this modification, the number of slots per pole per phase increases by one and becomes "NSPP=3," compared to the second embodiment. Even in this modification, the arrangement of the first slot conductor sub-groups 235a complies with the rule B described above. Since a predetermined number (Ns=5) of slots are continuously arranged along the circumferential direction of the stator core, it is recognized that the relationship "Ns=NSPP+NL1−1" is satisfied similar to the second embodiment. Even in this modification, by setting the number of slots per pole per phase to "NSPP=3" and setting the number of layers to "6," it is possible to obtain a smaller torque ripple and a lower noise relative to the comparative example corresponding to Comparative Example 1. In addition, by setting the number of slots per pole per phase to "NSPP=3" and setting the number of layers to "6," it is possible to obtain a higher average torque relative to the comparative example corresponding to Comparative Example 2.

Third Embodiment

A third embodiment will now be described. In the following description, elements similar to those of the first embodiment (for example, the configurations of FIGS. 1 to 6) will not be described for simplicity purposes.

FIGS. 43(a) to 43(c) and 44(a) to 44(c) are diagrams illustrating a specific connection of the U-phase coil of the stator winding 238. The stator core 232 is provided with forty eight slots 237 (refer to FIG. 4), and the reference numerals 01, 02, . . . , 47, and 48 in FIGS. 43(a) to 43(c) and 44(a) to 44(c) denote the slot numbers.

Figures 43A, 43B, 43C:
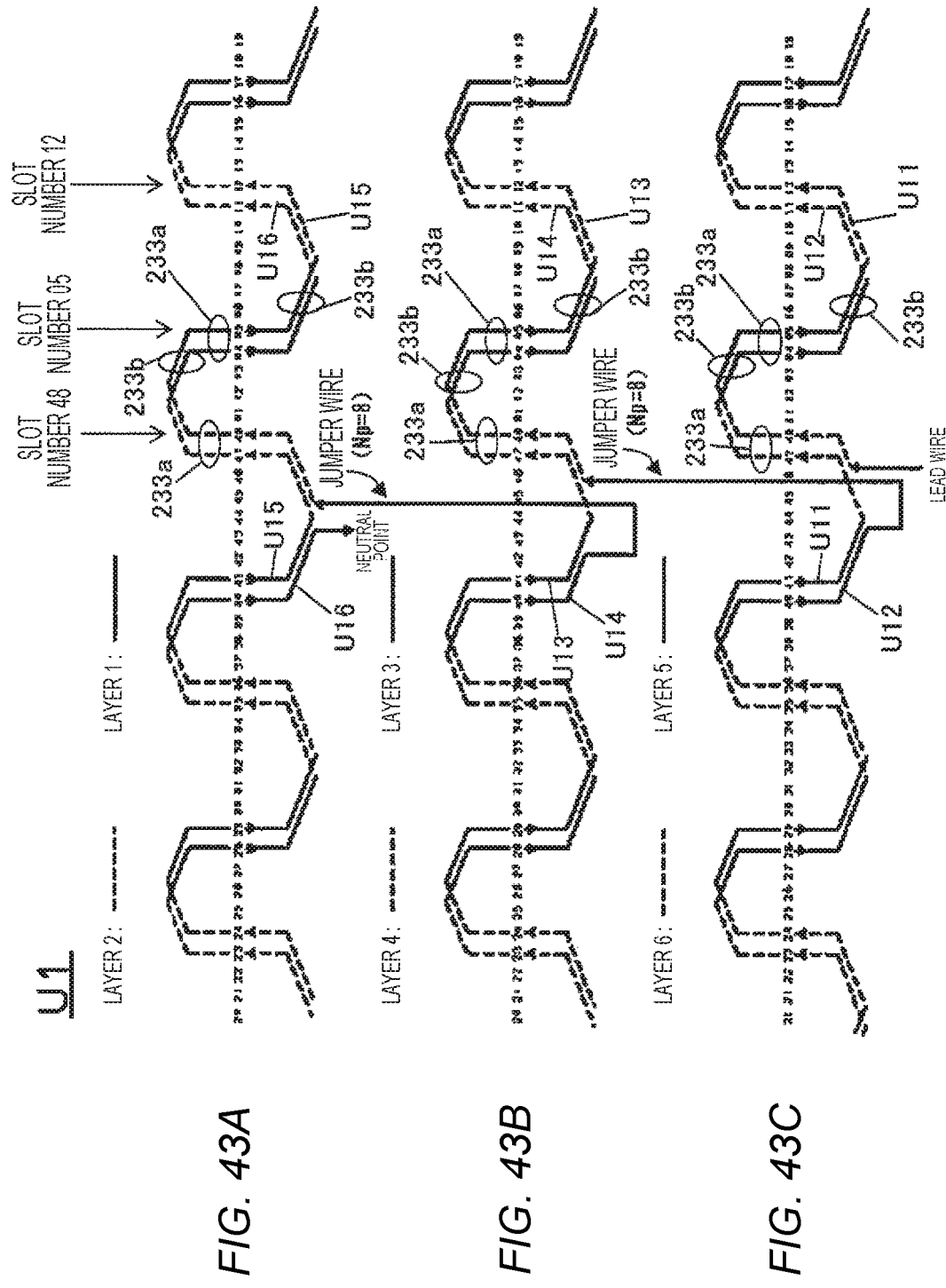
FIGS. 43A to 43C are diagrams illustrating a U1-phase winding group according to a third embodiment.

FIG. 43(a) illustrates winding coils U15 and U16 of a U1-phase winding group. FIG. 43(b) illustrates winding coils U13 and U14 of the U1-phase winding group. FIG. 43(c) illustrates winding coils U11 and 12 of the U1-phase winding group.

Figures 44A, 44B, 44C:
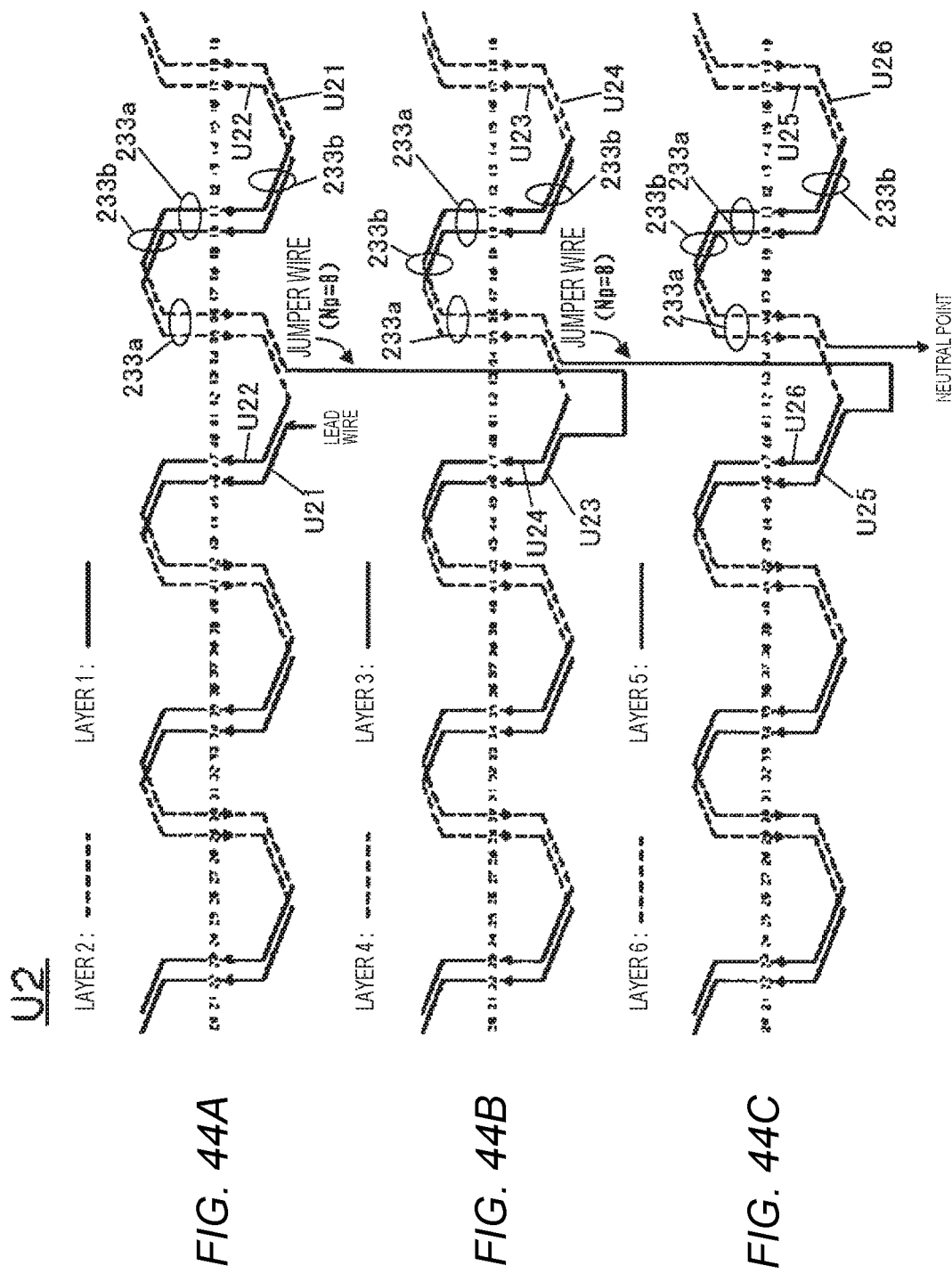
FIGS. 44A to 44C are diagrams illustrating a U2-phase winding group according to the third embodiment.

FIG. 44(a) illustrates winding coils U21 and 22 of a U2-phase winding group. FIG. 44(b) illustrates winding coils U23 and U24 of the U2-phase winding group. FIG. 44(c) illustrates winding coils U25 and U26 of the U2-phase winding group.

As illustrated in FIGS. 43(a) to 43(c) and 44(a) to 44(c), each winding coil U11 to U26 includes a slot conductor 233a inserted into a slot and a jumper conductor 233b that connects the same side ends of the slot conductors 233a inserted into different slots to each other to form a coil end 241 (refer to FIG. 5). For example, in the case of the slot conductor 233a inserted into the slot 237 of the slot number 05 illustrated in FIG. 43(a), the upper end in the drawing is connected to the upper end of the slot conductor 233a inserted into the slot 237 of the slot number 48 through the jumper conductor 233b that forms an upper coil end. Reversely, the lower end is connected to the lower end of the slot conductor 233a inserted into the slot 237 of the slot number 12 through the jumper conductor 233b that forms a lower coil end. In this manner, the slot conductors 233a are connected to each other through the jumper conductor 233b to form a wave-wound winding coil.

As described below, according to this embodiment, six slot conductors 233a are inserted into a single slot side by side from the inner circumference side to the outer circumference side, and they will be referred to as layers 1, 2, 3, 4, 5, and 6 in order from the inner circumference side. In FIGS. 43(a) to 43(c) and FIGS. 44(a) to 44(c), the solid line portions of the winding coils U15, U16, U21, and U22 belong to the layer 1, and the dashed line portions belong to the layer 2. The solid line portions of the winding coils U13, U14, U23, and U24 belong to the layer 3, and the dashed line portions belong to the layer 4. The solid line portions of the winding coils U11, U12, U25, and U26 belong to the layer 5, and the dashed line portions belong to the layer 6.

All of the winding coils U11 to U16 and U21 to U26 of the third embodiment illustrated in FIGS. 43(a) to 43(c) and FIGS. 44(a) to 44(c) are wound in a wave winding shape having an irregular slot pitch as described in the first embodiment. They will be described below in more details with reference to FIGS. 45(a) to 45(c) and 46A to 46C.

Note that the winding coils U11 to U26 may be formed as a continuous conductor or may be formed to connect the segment coils by welding or the like after the segment coil is inserted into the slot. If the segment coils are used, the coil ends 241 positioned in both axial ends of the ends of the stator core 232 can be formed in advance before the segment coil is inserted into the slot 237, so that it is possible to easily provide an appropriate insulation interval between different phases or between the same phases. As a result, it is possible to suppress a partial discharge caused by a surge voltage generated by a switching operation of the IGBT 21, and this is effective in insulation.

The conductor used in the winding coil may have a plurality of shapes such as a rectangular shape, a circular shape, or a narrow shape. However, in order to increase a space factor for high output power and high efficiency, the rectangular shape is desirable.

Figure 45A:
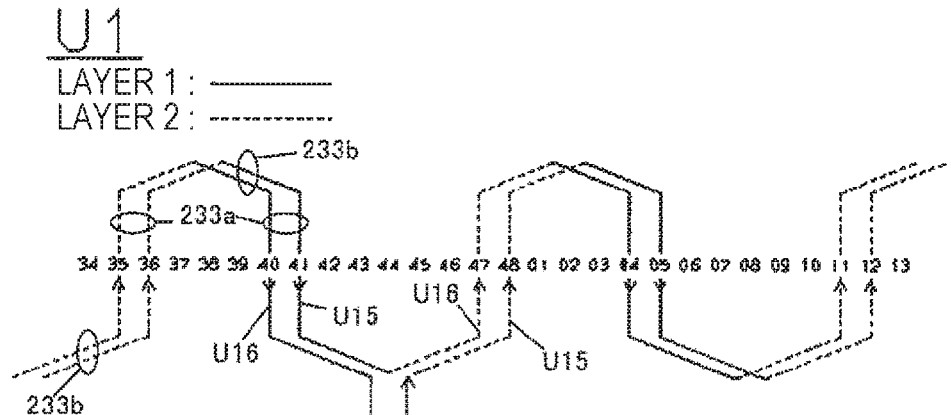
FIGS. 45A to 45C are partial enlarged views illustrating the U1-phase winding group according to the third embodiment.
Figure 45B:
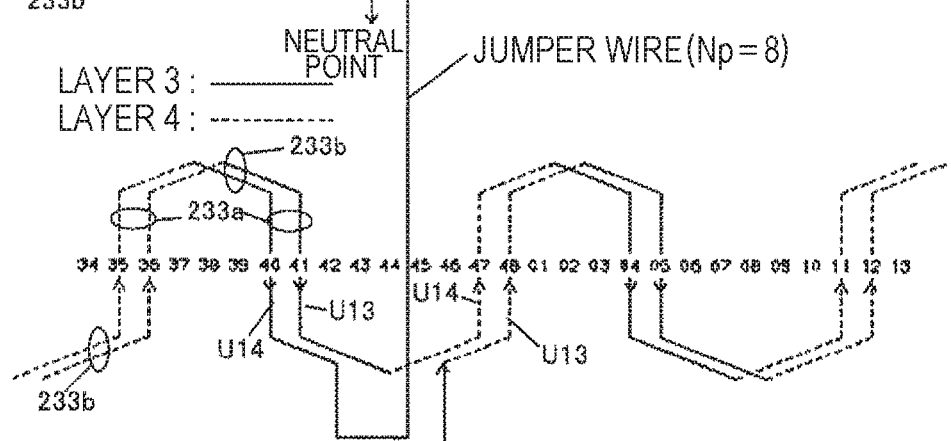
Figure 45C:
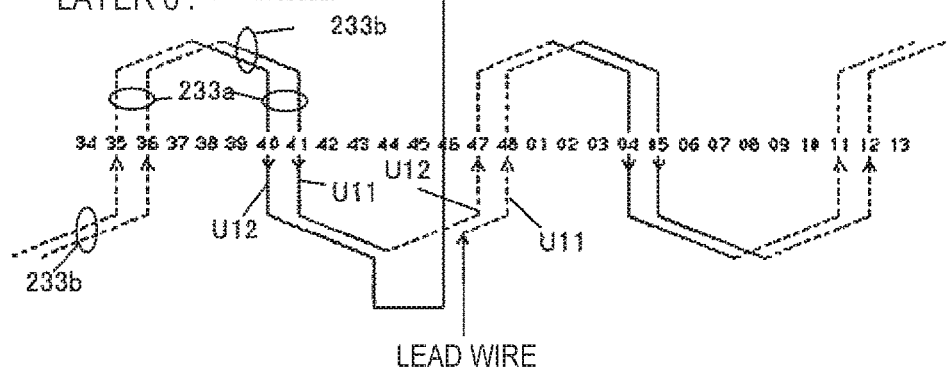
Figure 46A:
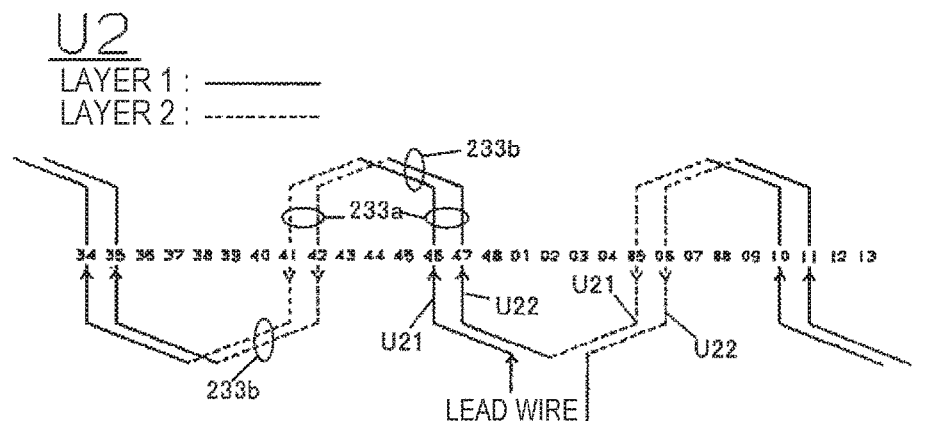
FIGS. 46A to 46C are partial enlarged views illustrating the U2-phase winding group according to the third embodiment.
Figure 46B:
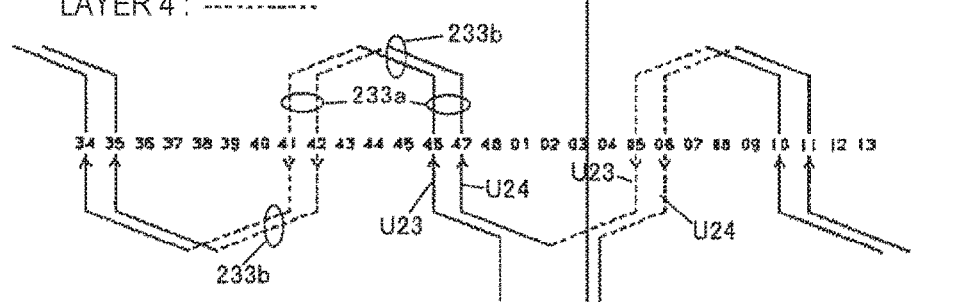
Figure 46C:
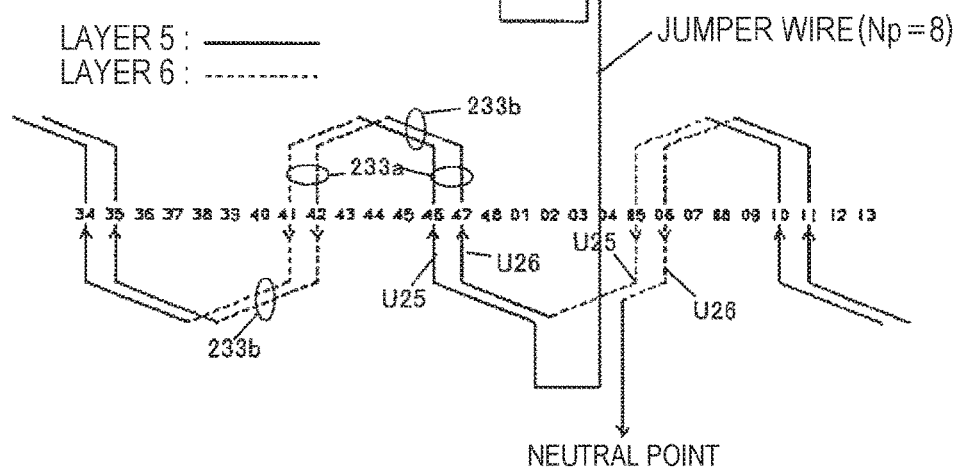

FIGS. 45(a) to 45(c) are partial enlarged views illustrating the U1-phase winding group of FIGS. 43(a) to 43(c). FIGS. 46A to 46C are partial enlarged views illustrating the U2-phase winding group of FIGS. 44(a) to 44(c). In FIGS. 45(a) to 45(c) and 46A to 46C, a part of the phase winding groups corresponding to four poles including the jumper wire are illustrated. Hereinafter, a method of winding the U1-phase winding group will be described with reference to FIGS. 45(a) to 45(c), and a method of winding the U2-phase winding group will be described with reference to FIGS. 46A to 46C.

As illustrated in FIG. 45(c), the stator winding group U1 enters the layer 6 of the slot number 48 from the lead wire and strides over five slots through the jumper conductor 233b, and the slot conductor 233a then enters the layer 5 of the slot number 05. Then, the slot conductor 233a strides seven slots from the layer 5 of the slot number 05 and enters the layer 6 of the slot number 12.

In this manner, the stator winding is wound around the stator core 232 by a single turn in a wave winding shape having an irregular slot pitch up to the layer 5 of the slot number 41, such that a striding span of the jumper conductor 233b in the coil end side (lower side in the drawing) where the lead wire is extracted becomes a slot pitch "Np=7," and a striding span of the jumper conductor 233b in the opposite coil end side (upper side in the drawing) becomes a slot pitch "Np=5." The stator winding corresponding to an approximately single turn up to here is the winding coil U11 of FIG. 6.

Then, the stator winding extracted from the layer 5 of the slot number 41 enters the layer 6 of the slot number 47 by striding over six slots. The winding from the layer 6 of the slot number 47 corresponds to the winding coil U12 of FIG. 6. The winding coil U12 is also wound in a wave winding shape having an irregular slot pitch. That is, the striding span of the jumper conductor 233b is set to a slot pitch "Np=7" in the lead wire side, and is set to a slot pitch "Np=5" in the opposite side, so that the stator winding is wound around the stator core 232 by a single turn up to the layer 5 of the slot number 40 in a wave winding shape. The stator winding corresponding to an approximately single turn up to here is the winding coil U12.

Note that, since the winding coil U12 is wound to deviate by a single slot pitch from the winding coil U11, a phase difference of an electric angle corresponding to a single slot pitch is generated. In this embodiment, a single slot pitch corresponds to an electric angle of 30°. Referring to FIG. 6, there is a deviation of 30° between the winding coils U11 and U12.

As illustrated in FIGS. 45(b) and 45(c), the stator winding extracted from the layer 5 of the slot number 40 enters the layer 4 of the slot number 48 through a jumper wire striding over eight slots. The winding from the layer 4 of the slot number 48 corresponds to the winding coil U13 of FIG. 6. The winding coil U13 is also wound in a wave winding shape having an irregular slot pitch. That is, the striding span of the jumper conductor 233b is set to a slot pitch "Np=7" in the lead wire side, and is set to a slot pitch "Np=5" in the opposite side, so that the stator winding is wound around the stator core 232 by a single turn up to the layer 3 of the slot number 41 in a wave winding shape. The stator winding up to here for an approximately single turn is the winding coil U13.

Then, the stator winding extracted from the layer 3 of the slot number 41 enters the layer 4 of the slot number 47 by striding over six slots. The winding from the layer 4 of the slot number 47 corresponds to the winding coil U14 of FIG. 6. The winding coil U14 is also wound in a wave winding shape having an irregular slot pitch. That is, the striding span of the jumper conductor 233b is set to a slot pitch "Np=7" in the lead wire side, and is set to a slot pitch "Np=5" in the opposite side, so that the stator winding is wound around the stator core 232 by a single turn up to the layer 3 of the slot number 40 in a wave winding shape. The stator winding up to here for an approximately single turn is the winding coil U14.

Note that, since the winding coil U14 is wound to deviate by a single slot pitch from the winding coil U13, a phase difference of an electric angle corresponding to a single slot pitch is generated. In this embodiment, a single slot pitch corresponds to an electric angle of 30°. Referring to FIG. 6, there is a deviation of 30° between the winding coils U13 and U14.

As illustrated in FIGS. 45(a) and 45(b), the stator winding extracted from the layer 3 of the slot number 40 enters the layer 2 of the slot number 48 through a jumper wire striding over eight slots. The winding from the layer 2 of the slot number 48 corresponds to the winding coil U15 of FIG. 6. The winding coil U15 is also wound in a wave winding shape having an irregular slot pitch. That is, the striding span of the jumper conductor 233b is set to a slot pitch "Np=7" in the lead wire side and is set to a slot pitch "Np=5" in the opposite side, so that the stator winding is wound around the stator core 232 by a single turn up to the layer 1 of the slot number 41 in a wave winding shape. The stator winding up to here for an approximately single turn is the winding coil U15.

Then, the stator winding extracted from the layer 1 of the slot number 41 enters the layer 2 of the slot number 47 by striding over six slots. The winding from the layer 2 of the slot number 47 corresponds to the winding coil U16 of FIG. 6. The winding coil U16 is also wound in a wave winding shape having an irregular slot pitch. That is, the striding span of the jumper conductor 233b is set to a slot pitch "Np=7" in the lead wire side and is set to a slot pitch "Np=5" in the opposite side, so that the stator winding is wound around the stator core 232 by a single turn up to the layer 1 of the slot number 40 in a wave winding shape. The stator winding up to here for an approximately single turn is the winding coil U16.

Note that, since the winding coil U16 is wound to deviate by a single slot pitch from the winding coil U15, a phase difference of an electric angle corresponding to a single slot pitch is generated. In this embodiment, a single slot pitch corresponds to an electric angle of 30°. Referring to FIG. 6, there is a deviation of 30° between the winding coils U15 and U16.

The stator winding group U2 of FIGS. 46A to 46C is also wound with the same striding span as that of each layer of the stator winding group U1. The winding coil U21 is wound in a wave winding shape having an irregular slot pitch from the layer 1 of the slot number 46 to the layer 2 of the slot number 05, and the winding coil U22 is wound in a wave winding shape having an irregular slot pitch from the layer 1 of the slot number 47 up to the layer 2 of the slot number 06. Then, the stator winding enters the layer 3 of the slot number 46 from the layer 2 of the slot number 06 through the jumper wire and is wound as the winding coil U23 in a wave winding shape having an irregular slot pitch up to the layer 4 of the slot number 05. Then, the stator winding is wound in a wave winding shape having an irregular slot pitch from the layer 3 of the slot number 47 up to the layer 4 of the slot number 06, so that the winding coil U24 is formed. Then, the stator winding enters the layer 5 of the slot number 46 from the layer 4 of the slot number 06 through the jumper wire and is wound as a winding coil U25 in a wave winding shape having an irregular slot pitch up to the layer 6 of the slot number 05. Then, the stator winding is wound in a wave winding shape having an irregular slot pitch from the layer 5 of the slot number 47 up to the layer 6 of the slot number 06, so that a winding coil U26 is formed.

As described above, the stator winding group U1 includes the winding coils U11, U12, U13, U14, U15, and U16, and a voltage obtained by synthesizing each phase is induced in the stator winding group U1. Similarly, in the stator winding group U2, a voltage obtained by synthesizing phases of the winding coils U21, U22, U23, U24, U25, and U26 is induced. While the stator winding group U1 is connected to the stator winding group U2 in parallel as illustrated in FIG. 6, there is no phase difference between the voltages induced from the stator winding groups U1 and U2, and there is no worry about an imbalance current such as a circulation current even in the parallel connection. Naturally, there is no problem in a series connection.

Figure 47:
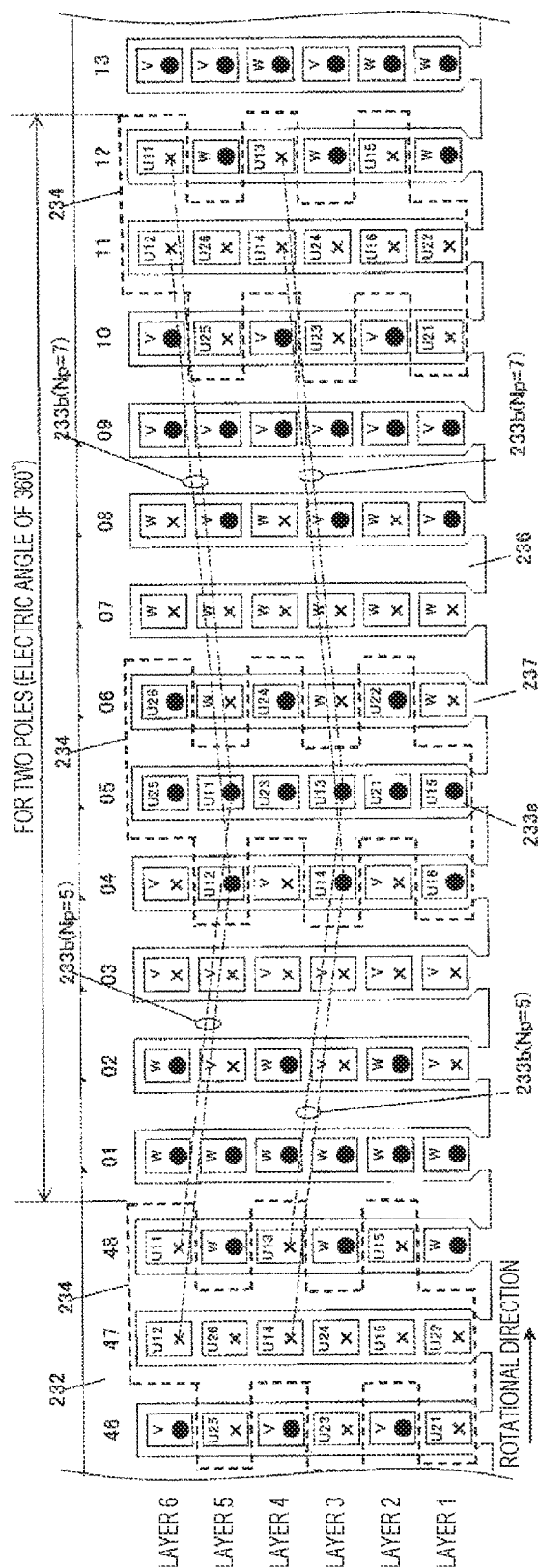
FIG. 47 is a layout of the slot conductor 233a according to the third embodiment.

FIG. 47 is a diagram generally illustrating a layout of the slot conductor 233a in the stator core 232 for the slot numbers 46 to 13 of FIGS. 43 to 46C. Note that a rotational direction of the rotor is directed from the left to the right in the drawing. According to this embodiment, twelve slots 237 are arranged for two poles, that is, at an electric angle of 360°. For example, the slot conductors 233a of the slot numbers 01 to 12 in FIG. 47 correspond to two poles. For this reason, the number of slots per pole N is "6," and the number of slots per pole per phase NSPP is "2" (=6/3). Six slot conductors 233a of the stator winding 238 are inserted into each slot 237.

While each slot conductor 233a is illustrated as a rectangular shape, the reference signs U11 to U26, V, and W inside the rectangle refer to the U-phase, V-phase, and W-phase, respectively, a cross mark "x" denotes a direction from the lead wire side to the opposite side, and a black circle mark "●" denotes a direction opposite thereto. In addition, the slot conductor 233a positioned in the innermost circumference side of the slot 237 (in the slot opening side) will be referred to as the layer 1, and the slot conductors 233a will be referred to as the layers 2, 3, 4, 5, an 6 in order toward the outer circumference side (in the slot bottom side). Furthermore, the reference numerals 01 to 12 denote the slot numbers as in FIGS. 43 to 46C. Note that only the slot conductors 233a of the U-phase are denoted by reference signs "U11 to U26" that represent the winding coils, and the slot conductors 233a of the V-phase and the W-phase are denoted by reference signs "V" and "W" that represent the phases.

In FIG. 47, all of twelve slot conductors 233a surrounded by the dashed line 234 belong to the slot conductor group 234 consisting of the U-phase slot conductors 233a. Hereinafter, a specific example will be described. For example, the slot conductor group 234 in the center includes the slot conductors 233a of the winding coils U25 and U26 arranged in the layer 6 of the slot numbers 05 and 06, the slot conductors 233a of the winding coils U12 and U11 arranged in the layer 5 of the slot numbers 04 and 05, the slot conductors 233a of the winding coils U23 and U22 arranged in the layer 4 of the slot numbers 05 and 06, the slot conductors 233a of the winding coils U14 and U13 arranged in the layer 3 of the slot numbers 04 and 05, the slot conductors 233a of the winding coils U21 and U22 arranged in the layer 2 of the slot numbers 05 and 06, and the slot conductors 233a of the winding coils U16 and U15 arranged in the layer 1 of the slot numbers 04 and 05.

Figure 48:
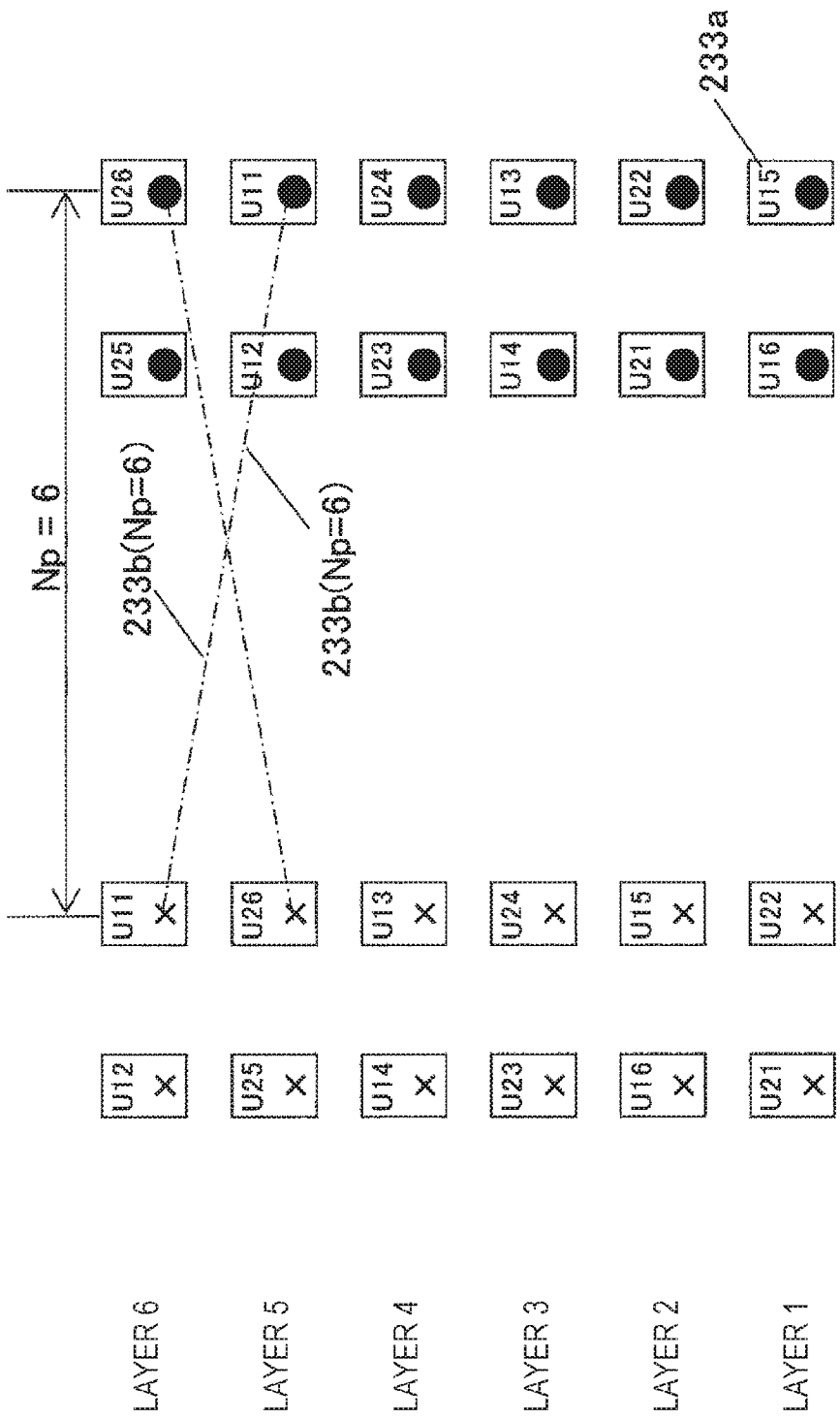
FIG. 48 is a schematic diagram illustrating a layout of a general slot conductor (Comparative Example 1).

In general, if the number of slots per pole N is set to "6," the number of slots per pole per phase NSPP is set to "2," and the number of the layers of the slot conductors 233a in the slot 237 is set to "6," a configuration of arranging the U-phase slot conductors 233a is employed in many cases as illustrated in FIG. 48 (this similarly applies to the V-phase and the W-phase). In this case, an interval between the left slot conductor group and the right slot conductor group in the drawing becomes a slot pitch of "6" (Np=6), that is, the normal slot pitch when the number of slots per pole N is set to "6." Meanwhile, the winding coils of the same phase are arranged not to deviate in the circumferential direction of the stator core 232. Note that FIG. 48 is an updated version of FIG. 11.

Figure 49:
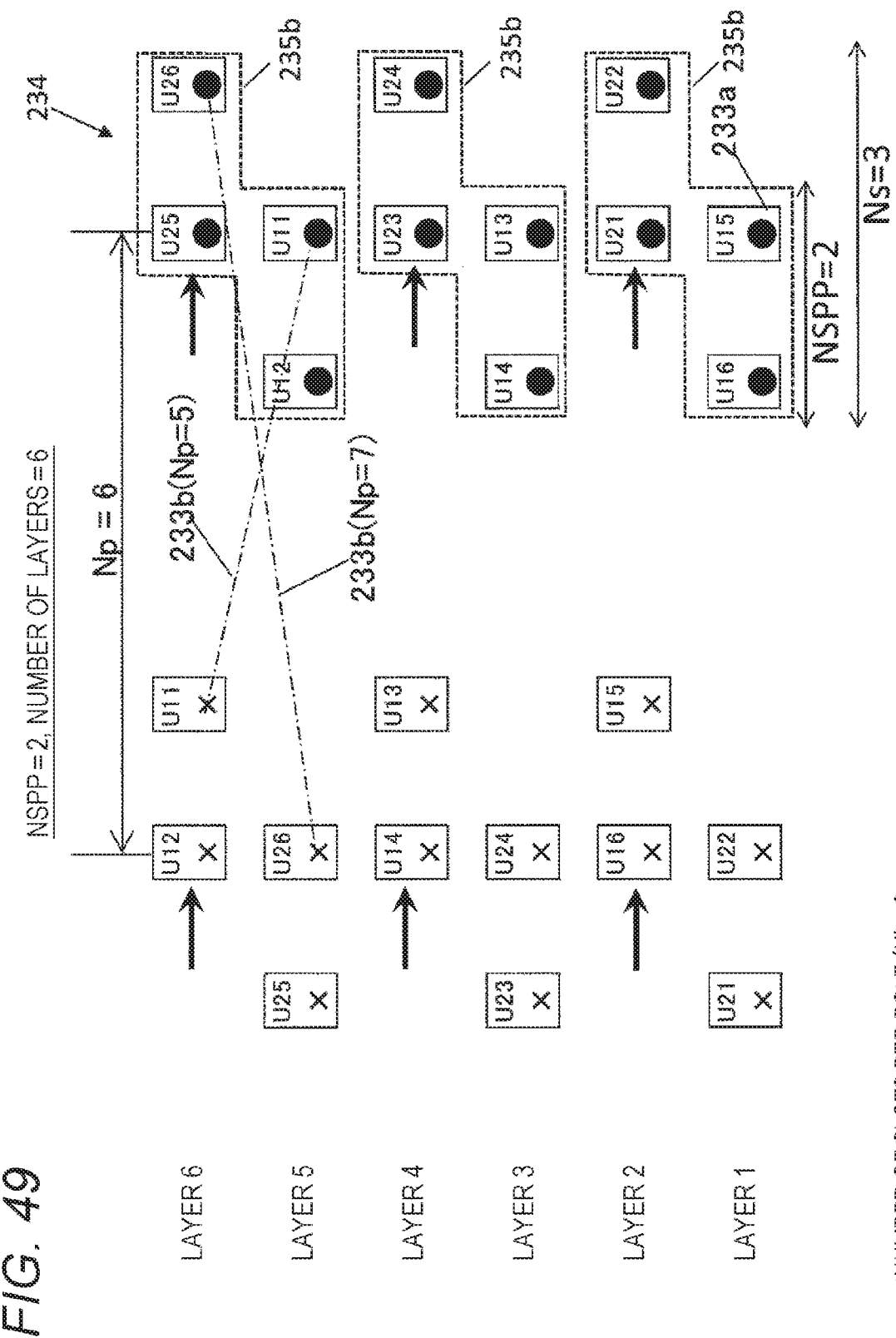
FIG. 49 is a schematic diagram illustrating a layout of a slot conductor 233a according to a third embodiment.

Meanwhile, in the configuration according to this embodiment, as illustrated in FIG. 49, two slot conductors 233a of the layers 2, 4, and 6 of FIG. 48 are deviated by a single slot pitch oppositely to the rotational direction of the rotor (in the right direction of the drawing). For this reason, as illustrated in FIG. 49, a striding span of the jumper conductor 233b used to connect the slot conductors 233a of the winding coils U11 of the layers 6 and 5 becomes a slot pitch of "5" (Np=5), and a striding span of the jumper conductor 233b used to connect the winding coils U26 of the layers 5 and 6 becomes a slot pitch of "7" (Np=7). The striding span of the slot conductor 233a of the winding coil U12 is equal to that of the winding coil U11. The striding span of the slot conductor 233a of the winding coil U25 is equal to that of the winding coil U26. In addition, the winding coils of the layers 4 and 3 and the winding coils of the layers 2 and 1 also have an irregular slot pitch in this manner.

In this case, each slot conductor 233a corresponding to the V-phase and the W-phase as well as the U-phase is deviated similarly by a single slot pitch. Therefore, as illustrated in FIG. 47, slot conductor groups 234 having the same shape are formed for each of the U-phase, the V-phase, and the W-phase. That is, a slot conductor group consisting of the U-phase slot conductors 233a indicated by the cross marks, a slot conductor group consisting of the W-phase slot conductors 233a indicated by the black circle marks, a slot conductor group consisting of the V-phase slot conductors 233a indicated by the cross marks, a slot conductor group consisting of the U-phase slot conductors 233a indicated by the black circle marks, a slot conductor group consisting of the W-phase slot conductors 233a indicated by the cross marks, and a slot conductor group consisting of the V-phase slot conductors 233a indicated by the black circle marks are arranged in order in the rotational direction of the rotor.

According to this embodiment, as illustrated in FIG. 47, assuming that the number of slots per pole is set to "N(=6)," only winding coils having an irregular slot pitch are provided by connecting the slot conductors 233a to each other such that the jumper conductor 233b strides slots with a slot pitch "Np=N+1 (=7)" in one of the coil ends and strides slots with a slot pitch "Np=N−1 (=5)" in the other coil end. The winding coil having a normal slot pitch shown in the first embodiment or the like is not provided.

As described above, the stator winding of each phase includes a slot conductor group 234 consisting of a plurality of slot conductors 233a inserted into a predetermined number (Ns) of slots continuously arranged along the circumferential direction of the stator core, and a jumper conductor 233b that connects the coil end sides of a plurality of slot conductors 233a. The slot conductors 233a are inserted into the respective slots 237 such that the slot and the layer are adjacent to each other. The predetermined number of slots Ns is set to "Ns=NSPP+1," where "NSPP" denotes the number of slots per pole per phase. According to this embodiment, as illustrated in FIG. 49, since the number of slots per pole per phase is set to "NSPP=2," the number of slots becomes "Ns=3."

The slot conductor group 234 according to this embodiment will be further described with reference to FIG. 49. The slot conductor group 234 can be divided into slot conductor sub-groups 235 as indicated by the dashed lines in FIG. 13. The slot conductor sub-group 235 includes an inner circumferential layer and an outer circumferential layer that neighbor to each other in a radial direction of the stator core 232 and are connected to the jumper conductor 233b. The slot conductor sub-group 235 according to this embodiment includes only three second slot conductor sub-groups 235b (refer to the first embodiment). The second slot conductor sub-group 235b of FIG. 49 is similar to that of FIG. 13. Therefore, an internal configuration of the second slot conductor sub-group 235b will not be described here.

The slot conductor group 234 according to this embodiment has three second slot conductor sub-groups 235b. The second slot conductor sub-groups 235b are arranged such that both circumferential ends of the stator core 232 are aligned with each other. This rule will be referred to as a rule C. That is, the slot conductors 233a of the winding coils U12, U14, and U16 are arranged in the same slot, and the slot conductors 233a of the winding coils U25, U22, U23, U13, U21, and U15 are arranged in the same slot. In addition, the slot conductors 233a of the winding coils U26, U24, and U22 are arranged in the same slot. If only the second slot conductor sub-groups 235b are arranged as described above, the aforementioned relationship "Ns=NSPP+1" is satisfied.

Here, functional effects of the rotary electric machine according to this embodiment illustrated in FIG. 47 or the like will be described in comparison with the functional effects of the rotary electric machine obtained by using the winding method of FIG. 48 (hereinafter, referred to as Comparative Example 1) and the functional effects of the rotary electric machine obtained by using the winding method of FIG. 22(a) described in PTL 1 (Japanese Unexamined Patent Application No. 2012-29370) (hereinafter, referred to as Comparative Example 2). Note that, in Comparative Example 2, a deviating direction of the slot conductors of the winding coil relating to the irregular slot pitch is reversed to that of the rotary electric machine of this embodiment. However, this relationship depends on definition, and the deviating direction may also be the same in both cases.

FIGS. 50 to 53 illustrate the functional effects of the rotary electric machine according to this embodiment in comparison with the functional effects of Comparative Example 1.

Figure 50:
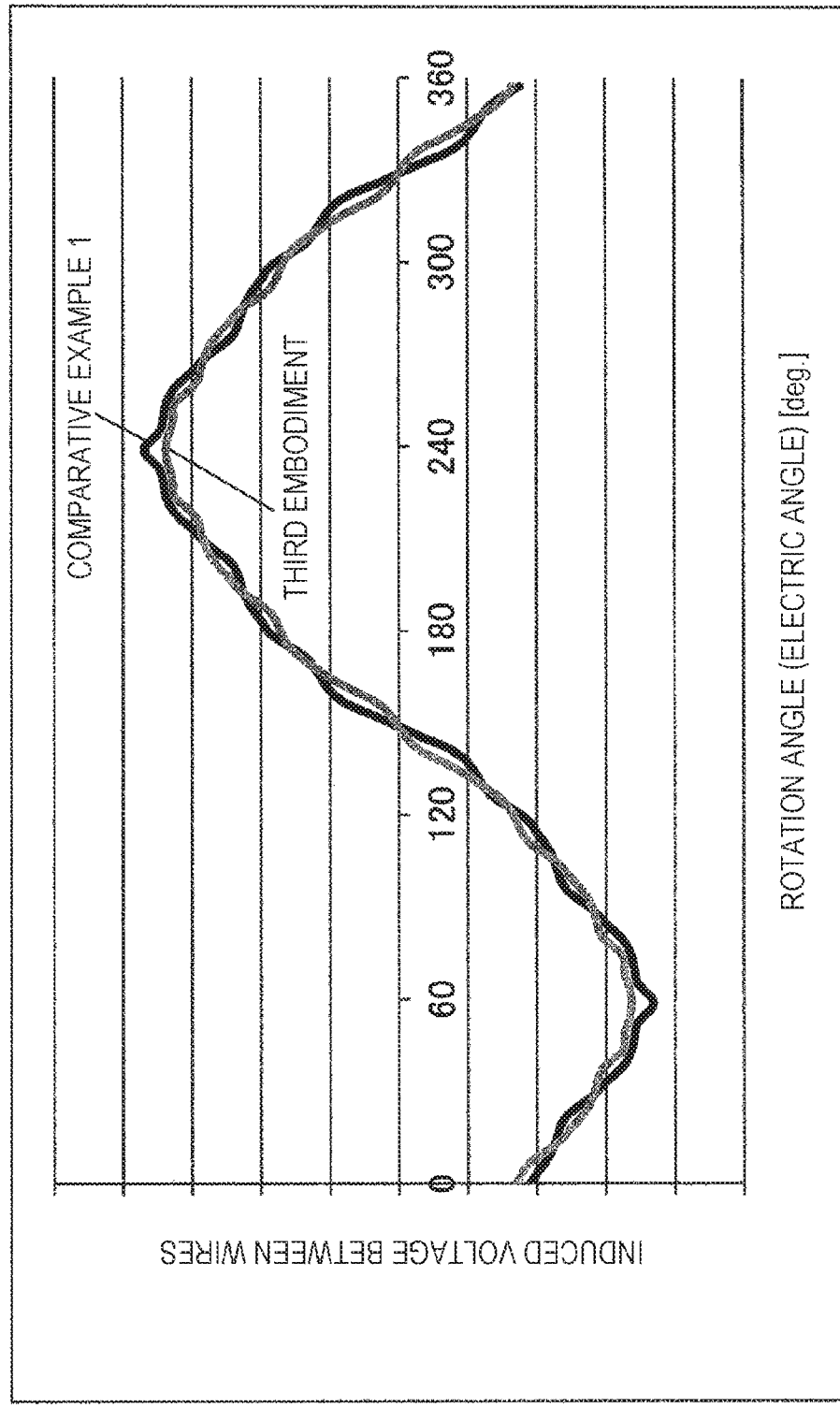
FIG. 50 is a diagram illustrating induced voltage waveforms of the third embodiment and Comparative Example 1.

FIG. 50 is a diagram illustrating an induced voltage waveform of the rotary electric machine according to this embodiment and an induced voltage waveform of the rotary electric machine of Comparative Example 1. In addition, FIG. 51 illustrates a harmonic analysis result for each induced voltage waveform of FIG. 50.

Figure 51:
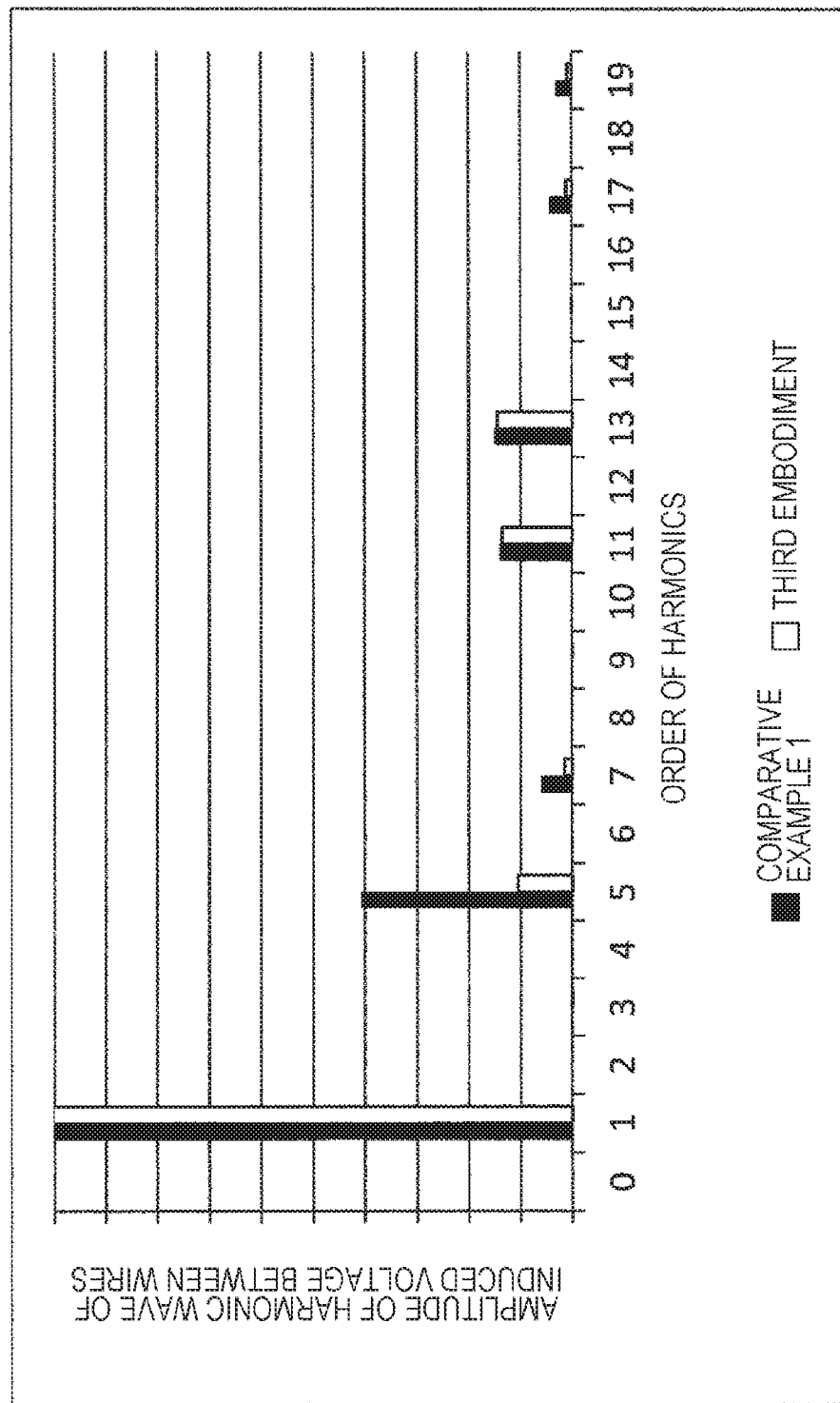
FIG. 51 is a diagram illustrating a harmonic analysis result for the induced voltage waveforms of the third embodiment and Comparative Example 1.

As illustrated in FIG. 51, it is recognized that the induced voltage waveform of the rotary electric machine according to this embodiment is close to a sinusoidal wave, compared to the induced voltage waveform of the rotary electric machine of Comparative Example 1. In addition, as illustrated in the harmonic analysis result of FIG. 51, it is recognized that, according to this embodiment, it is possible to reduce, particularly, the fifth and seventh harmonic components, compared to Comparative Example 1.

Figure 52:
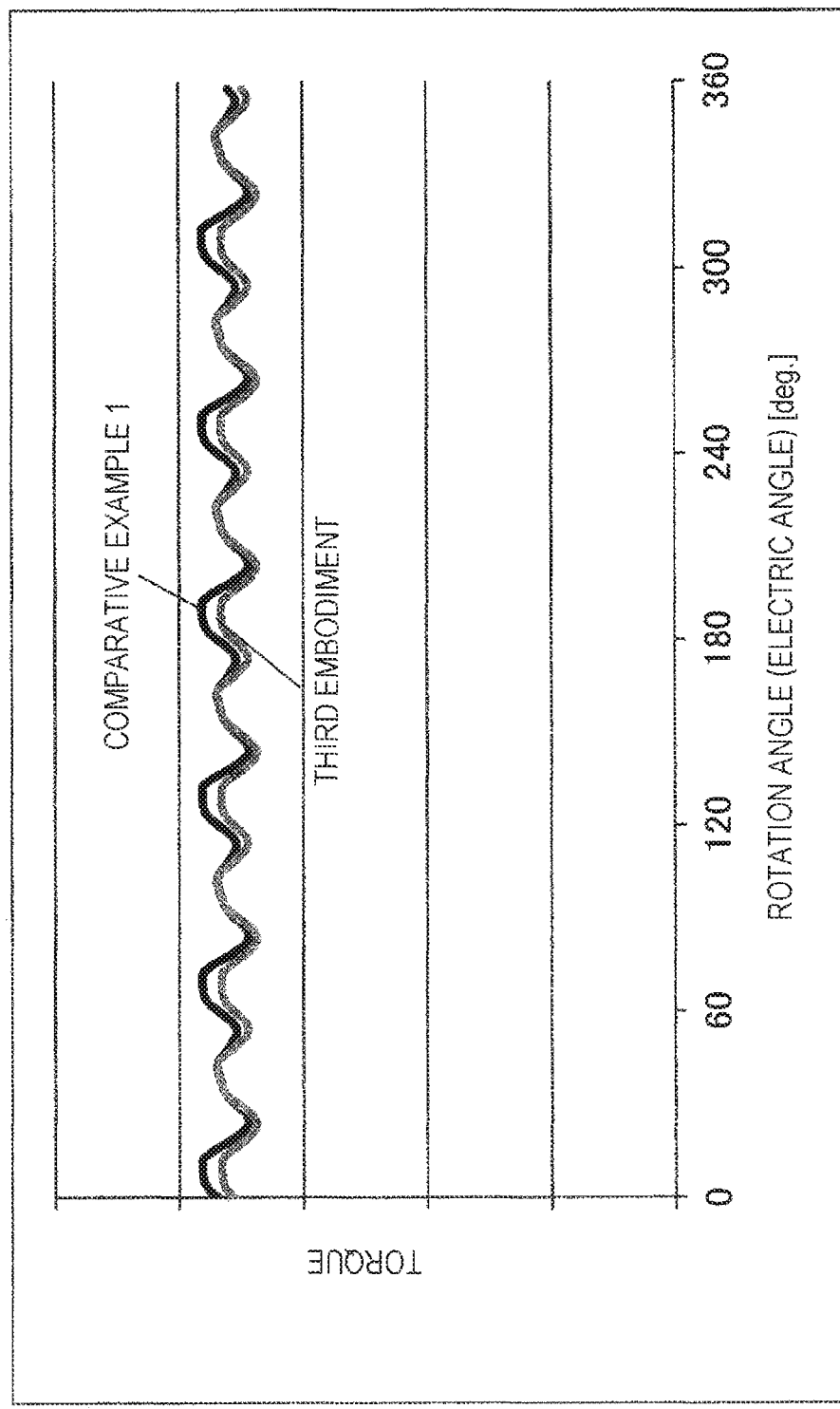
FIG. 52 is a diagram illustrating torque waveforms of the third embodiment and Comparative Example 1.
Figure 53:
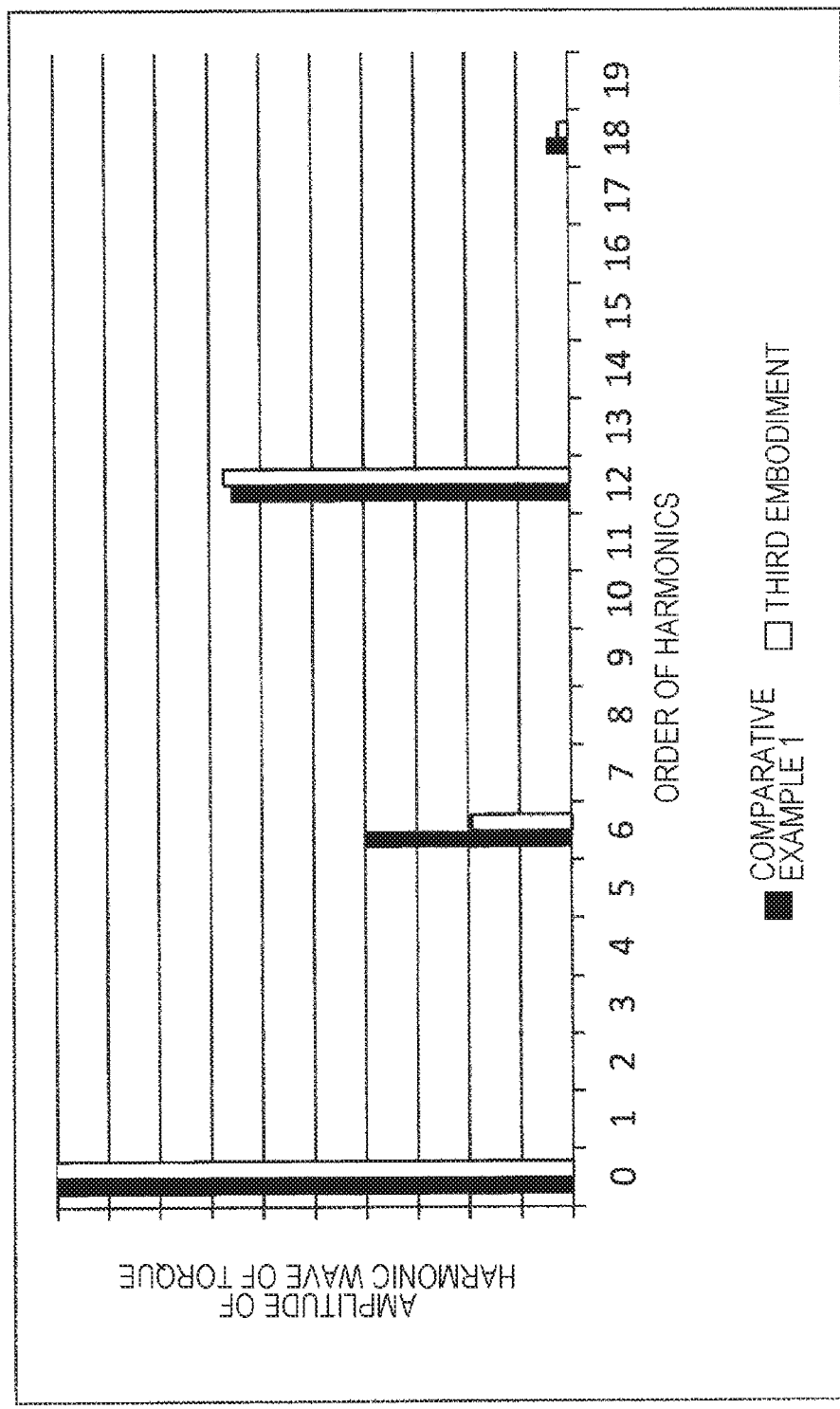
FIG. 53 is a diagram illustrating a harmonic analysis result for torque waveforms of the third embodiment and Comparative Example 1.

FIG. 52 illustrates torque waveforms of the rotary electric machine according to this embodiment and the rotary electric machine of Comparative Example 1 when an AC current flows. In addition, FIG. 53 illustrates a harmonic analysis result of each torque waveform of FIG. 52. As illustrated in the harmonic analysis result of FIG. 53, it is recognized that, particularly, a torque ripple in the sixth harmonic component can be reduced. This means that the induced voltage, that is, the fifth and seventh components of the crossing magnetic flux are reduced by arranging the coils as illustrated in FIGS. 43 to 47.

Figure 54:
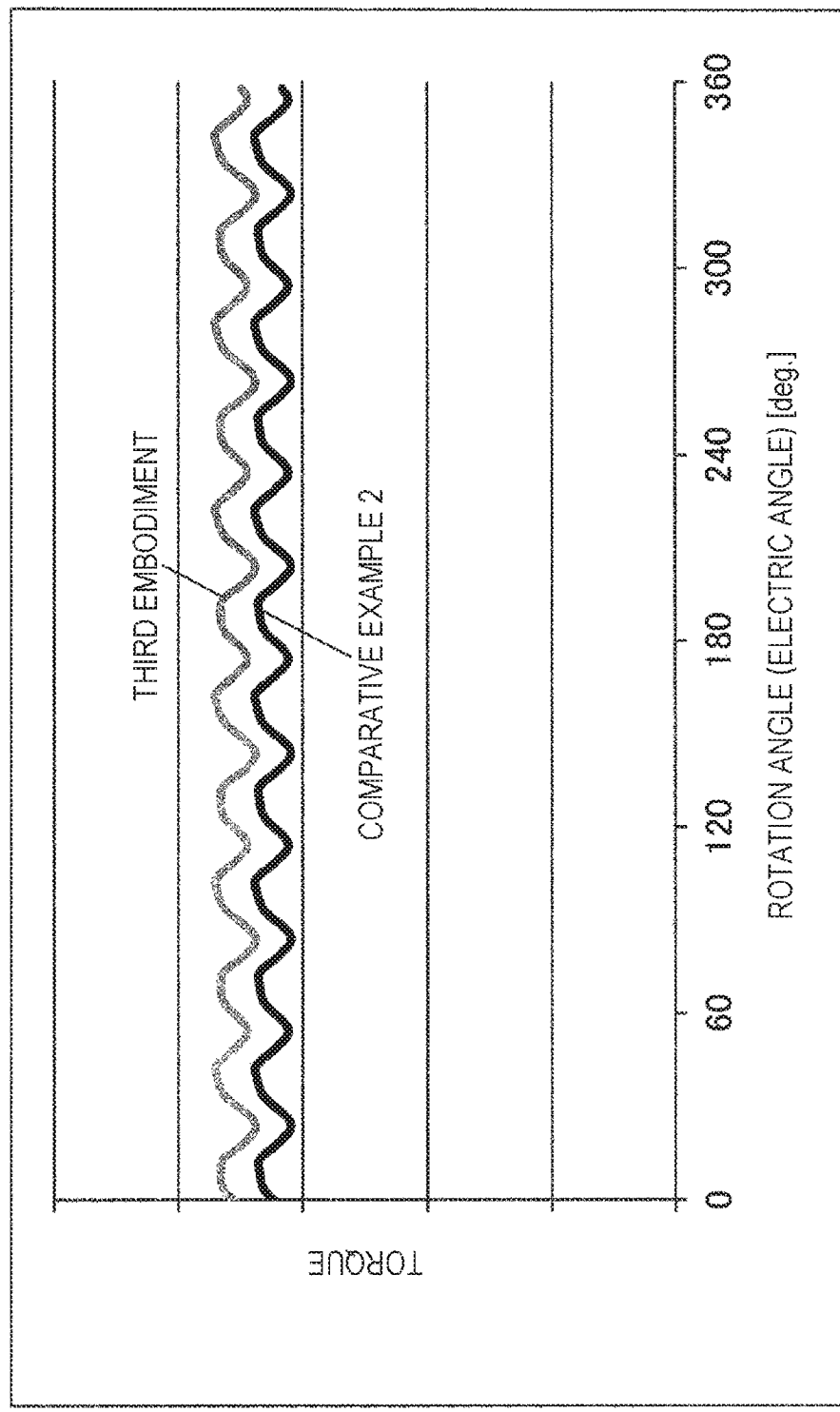
FIG. 54 is a diagram illustrating torque waveforms of the third embodiment and Comparative Example 2.
Figure 55:
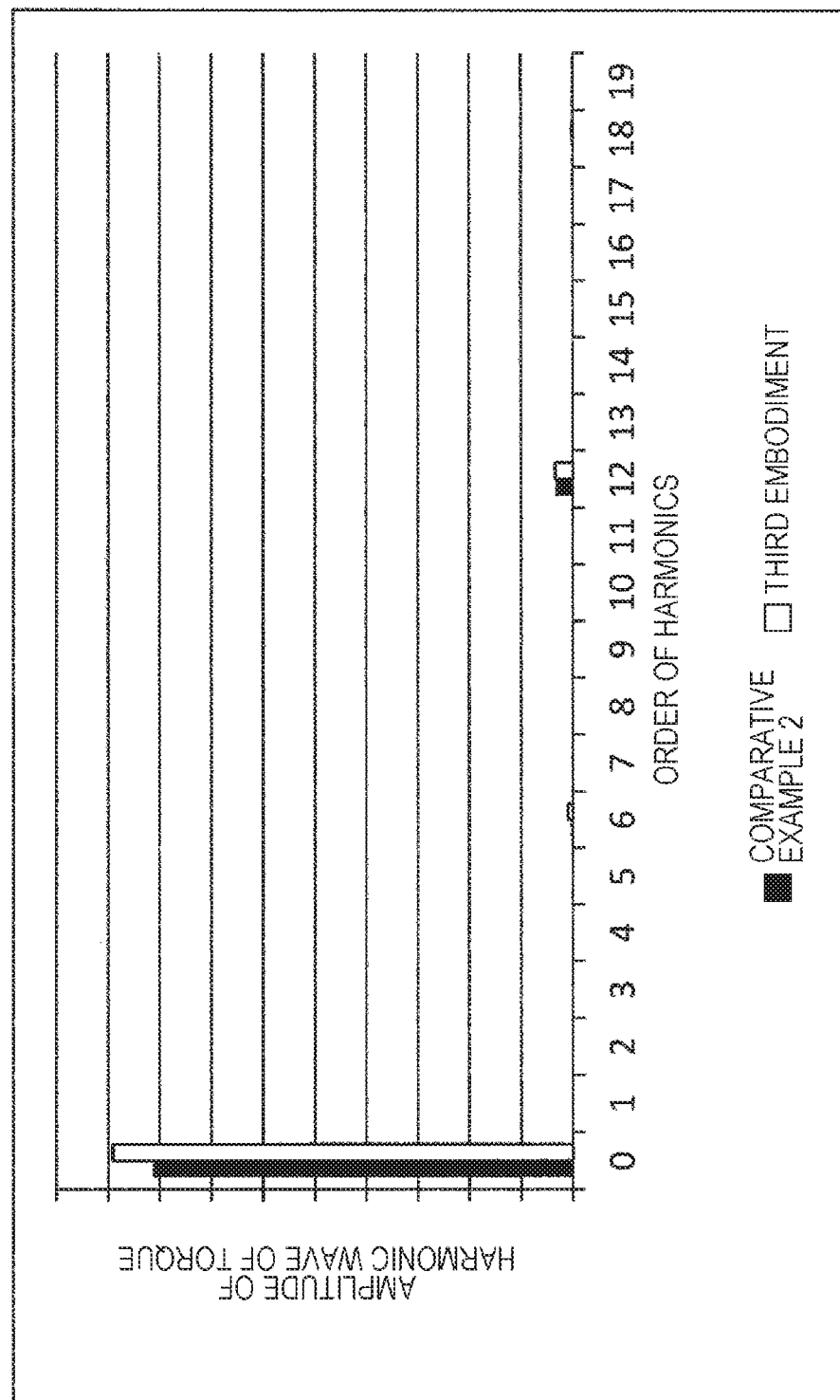
FIG. 55 is a diagram illustrating a harmonic analysis result for the torque waveforms of the third embodiment and Comparative Example 2.

FIGS. 54 and 55 illustrate the functional effects of this embodiment in comparison with the functional effects of Comparative Example 2.

FIG. 54 illustrates torque waveforms of the rotary electric machine according to this embodiment and the rotary electric machine of Comparative Example 2 when an AC current flows. In addition, FIG. 55 illustrates a harmonic analysis result of each torque waveform of FIG. 54. As illustrated in FIGS. 54 and 55, it is recognized that, according to this embodiment, an average torque is higher than that of Comparative Example 2.

As described above in relation to the functional effects, according to this embodiment, it is possible to obtain a rotary electric machine having a smaller torque ripple and a lower noise relative to Comparative Example 1 and a higher average torque relative to Comparative Example 2. In this sense, using the rotary electric machine according to this embodiment, it is possible to obtain a high-torque low-noise rotary electric machine. Furthermore, a vehicle provided with such a rotary electric machine can provide a high torque and a low noise.

The rotary electric machine according to the third embodiment has the following configurations and the following functional effects.

(1) The stator winding of each phase of the rotary electric machine 200 includes a plurality of slot conductors 233a inserted into a plurality of slots 237 and a jumper conductor 233b that connects both ends of the slot conductors 233a in the coil end 241 (this similarly applies to the rotary electric machine 202). In addition, as illustrated in FIGS. 45(a) to 45(c), 46A to 46C, and the like, the slot conductors 233a are connected to each other with the jumper conductor 233b having an irregular slot pitch in the layers 1 to 6, that is, in all of the layers.

The jumper conductor 233b having an irregular slot pitch connects the slot conductors 233a such that, assuming that the number of slots per pole is set to "N", the jumper conductor 233b strides the slots 237 with a slot pitch "Np=N+1" in one of the coil ends 241, and strides the slots 237 with a slot pitch "Np=N−1" in the other coil end 241.

The stator winding 238 has a plurality of slot conductor groups 234 consisting of a plurality of slot conductors 233a having the same phase.

A plurality of slot conductors 233a of the slot conductor group 234 are inserted into a predetermined number (Ns) of slots continuously arranged along the circumferential direction of the stator core 232 such that the slot and the layer are adjacent to each other.

The predetermined number Ns is set to "Ns=NSPP+1," where "NSPP" denotes the number of slots per pole per phase.

As a result, according to this embodiment, it is possible to obtain a high-torque low-noise rotary electric machine. In addition, a vehicle provided with such a rotary electric machine can provide a high torque and a low noise.

(2) Specifically, the following configuration may be possible.

The slot conductor group 234 has "NL2" second slot conductor sub-groups 235b consisting of the inner circumferential layer and the outer circumferential layer that neighbor to each other in the radial direction of the stator core 232 and are connected to the jumper conductor 233b.

The slot conductor of the inner circumferential layer and the slot conductor of the outer circumferential layer are arranged to deviate from each other by a single slot pitch in the circumferential direction of the stator core.

The "NL2" second slot conductor sub-groups 235b are arranged such that both circumferential ends of the stator core are aligned with each other.

Using the specific configuration (2) described above, according to this embodiment, it is possible to obtain a high-torque low-noise rotary electric machine. In addition, a vehicle provided with such a rotary electric machine can provide a high torque and a low noise.

Modifications of Third Embodiment

Figure 56:
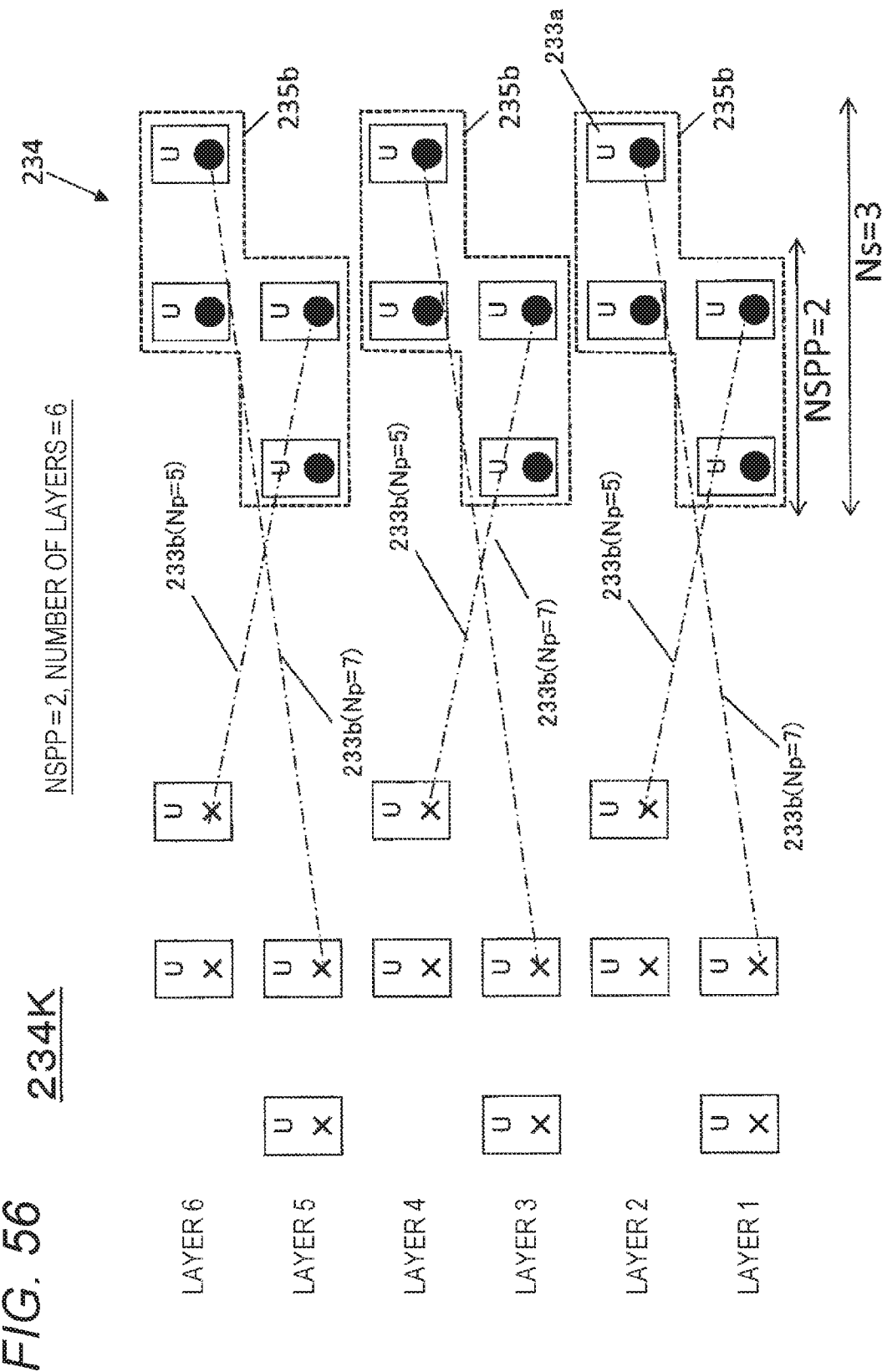
FIG. 56 is a schematic diagram illustrating a layout of the slot conductor 233a according to the third embodiment.

FIG. 56 is a diagram illustrating a slot conductor group 234 (234K) of the rotary electric machine of the third embodiment, which is similar to FIG. 49. The third embodiment may be modified as described below by way of example. A modification of the third embodiment will be described with reference to FIG. 56.

<Modification 9>

Figure 57:
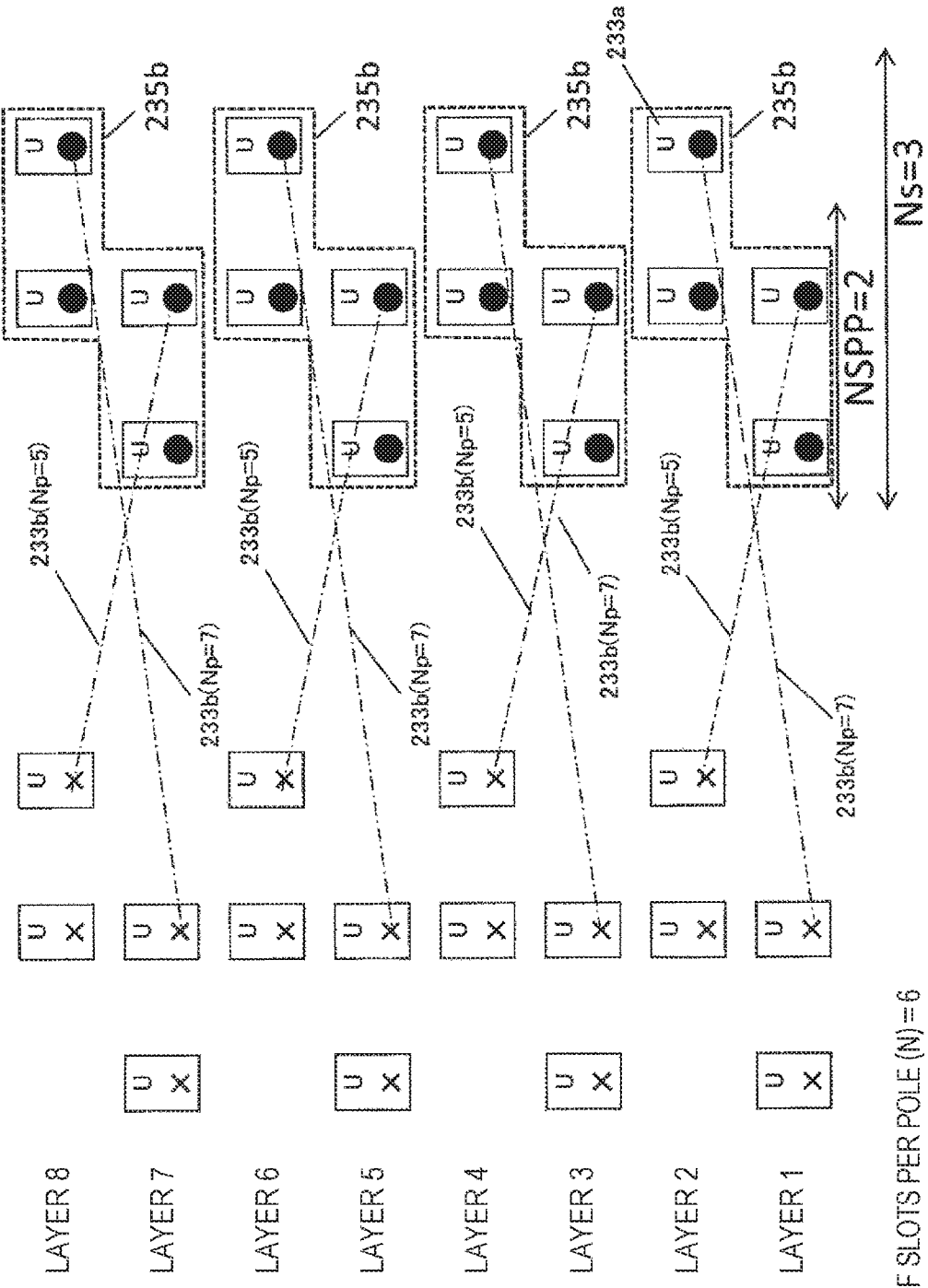
FIG. 57 is a schematic diagram illustrating a layout of the slot conductor 233a according to a modification (Modification 9) of the third embodiment.

FIG. 57 is a diagram illustrating a slot conductor group 234 (234L) of a rotary electric machine according to Modification 9. In Modification 9, the number of slots per pole is set to "N=6," the number of slots per phase per pole is set to "NSPP=2," and the number layers is set to "8." In Modification 9, all of the layers 1 to 8 consist of winding coils having an irregular slot pitch. In this modification, the number of layers increases by two, compared to the third embodiment. As a result, the second slot conductor subgroup 235b increases by one. A plurality of second slot conductor sub-groups 235b are arranged in accordance with the aforementioned rule C. Since a predetermined number (Ns=3) of slots are continuously arranged along the circumferential direction of the stator core, the aforementioned relationship "Ns=NSPP+1" is satisfied. This relationship is satisfied for the following reasons. If the second slot conductor sub-groups 235b are arranged in accordance with the rule C, no deviation is generated between the second slot conductor sub-groups 235b. Therefore, regardless of the number of the second slot conductor sub-groups 235b, the aforementioned relationship does not depend on the number of the second slot conductor sub-groups 235b (NL2). Even in this modification, by setting the number of slots per pole per phase to "NSPP=2" and setting the number of layers to "8," it is possible to obtain a smaller torque ripple and a lower noise relative to the comparative example corresponding to Comparative Example 1. In addition, by setting the number of slots per pole per phase to "NSPP=2" and setting the number of layers to "8," it is possible to obtain a higher average torque relative to the comparative example corresponding to Comparative Example 2.

<Modification 10>

Figure 58:
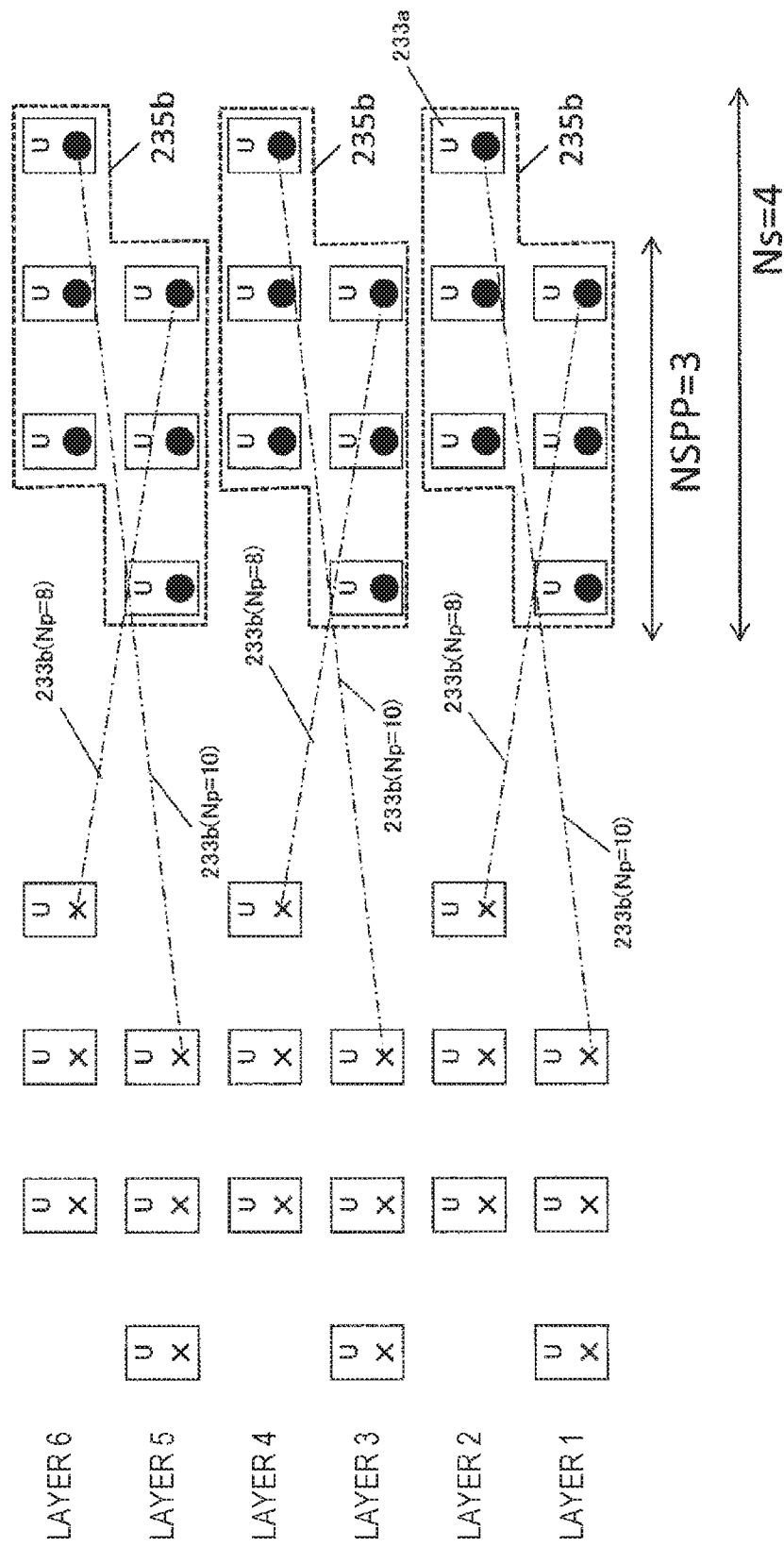
FIG. 58 is a schematic diagram illustrating a layout of the slot conductor 233a according to a modification (Modification 10) of the third embodiment.

FIG. 58 is a diagram illustrating a slot conductor group 234 (234M) of a rotary electric machine according to Modification 10. In Modification 10, the number of slots per pole is set to "N=9," the number of slots per pole per phase is set to "NSPP=3," and the number of layers is set to "6." In Modification 10, all of the layers 1 to 6 are winding coils having an irregular slot pitch (NL2=3). In this modification, the number of slots per pole per phase increases by one and becomes "NSPP=3," compared to the third embodiment. Even in this modification, the arrangement of the second slot conductor sub-groups 235b complies with the rule C described above. Since a predetermined number (Ns=4) of slots are continuously arranged along the circumferential direction of the stator core, it is recognized that the relationship "Ns=NSPP+1" is satisfied similar to the third embodiment. Even in this modification, by setting the number of slots per pole per phase to "NSPP=3" and setting the number of layers to "6," it is possible to obtain a smaller torque ripple and a lower noise relative to the comparative example corresponding to Comparative Example 1. In addition, by setting the number of slots per pole per phase to "NSPP=3" and setting the number of layers to "6," it is possible to obtain a higher average torque relative to the comparative example corresponding to Comparative Example 2.

In the first to third embodiments, the number of slots per pole per phase NSPP is set to "2" or "3," and the number of layers is set to "6" or "8" by way of example. However, the present invention is not limited thereto. The same effects can be obtained even when the number of slots per pole per phase NSPP is set to "3" or greater, or the number of layers is set to an even number equal to or greater than "8."

Note that, by setting the number of layers, that is, the number of slot conductors provided in a single slot 237 (the number of slot conductors) to "6" or greater, freedom in a layout of the coil is improved. As a result, it is possible to more reduce the harmonics or a torque ripple caused by the harmonics.

It would be appreciated that the present invention is not limited to the aforementioned description. Instead, the scope of the present invention encompasses all other possible aspects conceived from the spirit and scope of the present invention.

REFERENCE SIGNS LIST 100 vehicle
120 engine
180 battery
200, 202 rotary electric machine
230 stator
232 stator core
233a slot conductor
233b jumper conductor
234, 234A to 234M slot conductor group
235 slot conductor sub-group
235a first slot conductor sub-group
235b second slot conductor sub-group
237 slot
238 stator winding
241 coil end
250 rotor
600 power converter
U11 to U16, U21 to U26, V11 to V16, V21 to V26, W11 to W16, W21 to W26 winding coils

The invention claimed is:

1. A rotary electric machine comprising:
a stator core provided with a plurality of slots;
stator windings of a plurality of phases provided with a plurality of wave-wound winding coils, each having a slot conductor inserted into each slot of the stator core and included in any one of a plurality of layers and a jumper conductor that connects the same side ends of the slot conductors inserted into different slots to form a coil end; and
a rotor rotatably supported to the stator core by interposing a vacancy,
wherein the winding coils include a first winding coil having a first jumper conductor as the jumper conductor and a second winding coil having a second jumper conductor as the jumper conductor,
the first jumper conductor connects the slot conductors to each other by striding the slots with a slot pitch of "Np=N" in one of the coil ends and striding the slots with a slot pitch of "Np=N" in the other coil end, where "N" denotes the number of slots per pole,
the second jumper conductor connects the slot conductors to each other by striding the slots with a slot pitch of "Np=N+1" in one of the coil ends and striding the slots with a slot pitch of "Np=N−1" in the other coil end, where "N" denotes the number of slots per pole, and
the stator winding has a plurality of slot conductor groups having a plurality of slot conductors of the same phase.

2. The rotary electric machine according to claim 1, wherein the plurality of slot conductors of the slot conductor group are inserted into a predetermined number (Ns) of slots continuously arranged in a circumferential direction of the stator core such that the slot and the layer are adjacent to each other, and
the predetermined number (Ns) is set to "Ns=NSPP+ NL2," where "NSPP" denotes the number of slots per pole per phase, and the number of layers (NL) relating to the second winding coil is set to "2×NL2."

3. The rotary electric machine according to claim 2, wherein the slot conductor group is divided into a plurality of slot conductor sub-groups,
the slot conductor sub-groups neighboring in a radial direction of the stator core are arranged such that both circumferential ends of the stator core in the adjacent side are aligned with each other,
the plurality of slot conductor sub-groups include "NL1" first slot conductor sub-groups having a first inner circumferential layer and a first outer circumferential layer that neighbor to each other in a radial direction of the stator core and are connected to the first jumper conductor and "NL2" second slot conductor sub-groups having a second inner circumferential layer and a second outer circumferential layer that neighbor to each other in the radial direction of the stator core and are connected to the second jumper conductor,
the slot conductors of the first inner circumferential layer and the slot conductors of the first outer circumferential layer are arranged such that both circumferential ends of the stator core are aligned with each other, and
the slot conductors of the second inner circumferential layer and the slot conductors of the second outer circumferential layer are arranged to deviate from each other by a single slot pitch in a circumferential direction of the stator core.

4. The rotary electric machine according to claim 1, wherein the winding coil is formed by connecting a plurality of segment conductors.

5. The rotary electric machine according to claim 1, wherein the slot conductor is a rectangular wire.

6. The rotary electric machine according to claim 1, wherein the stator winding has a plurality of Y connections, and voltages induced in the coils of each phase of each Y connection have no phase difference.

7. A vehicle comprising:
the rotary electric machine according to claim 1;
a battery that supplies DC power; and
a converter that converts DC power of the battery into AC power and supplies the AC power to the rotary electric machine,
wherein a torque of the rotary electric machine is used as a driving force.

8. A rotary electric machine comprising:
a stator core provided with a plurality of slots;
stator windings of a plurality of phases provided with a plurality of wave-wound winding coils, each having a slot conductor inserted into each slot of the stator core and included in any one of a plurality of layers and a jumper conductor that connects the same side ends of the slot conductors inserted into different slots to form a coil end; and
a rotor rotatably supported to the stator core by interposing a vacancy,
wherein the winding coils include a first winding coil having a first jumper conductor as the jumper conductor and a second winding coil having a second jumper conductor as the jumper conductor,
the first jumper conductor connects the slot conductors to each other by striding the slots with a slot pitch of "Np=N" in one of the coil ends and striding the slots with a slot pitch of "Np=N" in the other coil end, where "N" denotes the number of slots per pole,
the second jumper conductor connects the slot conductors to each other by striding the slots with a slot pitch of "Np=N+1" in one of the coil ends and striding the slots with a slot pitch of "Np=N−1" in the other coil end, where "N" denotes the number of slots per pole,
the stator winding has a plurality of slot conductor groups having a plurality of slot conductors of the same phase,
the plurality of slot conductors of the slot conductor group are inserted into a predetermined number (Ns) of slots continuously arranged in a circumferential direction of the stator core such that the slot and the layer are adjacent to each other,
the predetermined number (Ns) is set to "Ns=NSPP+NL2," where "NSPP" denotes the number of slots per pole per phase, and NL denotes the number of layers, the number of layers relating to the second winding coil being set to "2×NL2,"
the slot conductor group is divided into a plurality of slot conductor sub-groups,
the slot conductor sub-groups neighboring in a radial direction of the stator core are arranged such that both circumferential ends of the stator core in the adjacent side are aligned with each other,
the plurality of slot conductor sub-groups include "NL1" first slot conductor sub-groups having a first inner circumferential layer and a first outer circumferential layer that neighbor to each other in a radial direction of the stator core and are connected to the first jumper conductor and "NL2" second slot conductor sub-groups having a second inner circumferential layer and a second outer circumferential layer that neighbor to each other in the radial direction of the stator core and are connected to the second jumper conductor,
the slot conductors of the first inner circumferential layer and the slot conductors of the first outer circumferential layer are arranged such that both circumferential ends of the stator core are aligned with each other, and
the slot conductors of the second inner circumferential layer and the slot conductors of the second outer circumferential layer are arranged to deviate from each other by a single slot pitch in a circumferential direction of the stator core.

9. The rotary electric machine according to claim 8, wherein the winding coil is formed by connecting a plurality of segment conductors.

10. The rotary electric machine according to claim 8, wherein the slot conductor is a rectangular wire.

11. The rotary electric machine according to claim 8, wherein the stator winding has a plurality of Y connections, and voltages induced in the coils of each phase of each Y connection have no phase difference.

12. A vehicle comprising:
the rotary electric machine according to claim 8;
a battery that supplies DC power; and
a converter that converts DC power of the battery into AC power and supplies the AC power to the rotary electric machine,
wherein a torque of the rotary electric machine is used as a driving force.

\* \* \* \* \*